(12) United States Patent
Gupta et al.

(10) Patent No.: US 12,449,776 B2
(45) Date of Patent: *Oct. 21, 2025

(54) SYSTEMS AND METHODS FOR DATA CONTROL IN A BUILDING MANAGEMENT SYSTEM

(71) Applicant: Tyco Fire & Security GmbH, Neuhausen am Rheinfall (CH)

(72) Inventors: Vivek V. Gupta, Menomonee Falls, WI (US); Daniel R. Gottschalk, Racine, WI (US); William R. Kuckuk, Hubertus, WI (US); Adam J. Scott, Grafton, WI (US); Mark T. Fischbach, New Berlin, WI (US); James J. Mertz, Wind Lake, WI (US); Yogesh N. Jalkote, Killari (IN); Sudhanshu Dixit, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 592 days.

This patent is subject to a terminal disclaimer.

(21) Appl. No.: 17/750,830

(22) Filed: May 23, 2022

(65) Prior Publication Data
US 2022/0373983 A1 Nov. 24, 2022

Related U.S. Application Data

(63) Continuation-in-part of application No. 17/374,135, filed on Jul. 13, 2021, now Pat. No. 12,200,043.

(30) Foreign Application Priority Data

May 24, 2021 (IN) .............................. 202121022969

(51) Int. Cl.
G05B 15/02 (2006.01)
H04L 67/12 (2022.01)
H04L 67/50 (2022.01)

(52) U.S. Cl.
CPC .............. *G05B 15/02* (2013.01); *H04L 67/12* (2013.01); *H04L 67/50* (2022.05); *G05B 2219/25011* (2013.01); *G05B 2219/2642* (2013.01)

(58) Field of Classification Search
CPC .......... G05B 15/02; G05B 2219/25011; G05B 2219/2642; H04L 67/12; H04L 67/50
See application file for complete search history.

(56) References Cited

U.S. PATENT DOCUMENTS

| | | |
|---|---|---|
| 7,643,891 B2 | 1/2010 | Rule et al. |
| 7,835,372 B2 | 11/2010 | Wang et al. |

(Continued)

FOREIGN PATENT DOCUMENTS

| | | |
|---|---|---|
| CA | 3108929 C | 7/2021 |
| CA | 3154167 A1 | 7/2021 |
| WO | WO-2022/171730 A1 | 8/2022 |

OTHER PUBLICATIONS

U.S. Appl. No. 17/374,135, filed Jul. 13, 2021, Johnson Controls Building Efficiency Products.

(Continued)

*Primary Examiner* — Charles R Kasenge
(74) *Attorney, Agent, or Firm* — Foley & Lardner LLP

(57) ABSTRACT

A building management system (BMS) includes building equipment operable to affect a physical state or condition of a building coupled to a gateway device configured to communicate building data from the building equipment to a cloud-based platform according to a data control template configured to control a data rate between the gateway device and the cloud-based platform. The cloud-based platform (Continued)

includes a hub to generate a virtual device twin comprising the data control template and configured to receive the building data and represent the gateway device on the cloud-based platform, as well as plurality of cloud applications configured to provide a building data output. The cloud-based platform is configured to communicate the building data output to and receive a command from at least one of a control application, an analytic application, or a monitor application. The gateway device further configured to operate according to the command.

20 Claims, 27 Drawing Sheets

(56) References Cited

U.S. PATENT DOCUMENTS

| | | | |
|---|---|---|---|
| 10,746,428 | B2 | 8/2020 | Przybylski et al. |
| 10,868,857 | B2 | 12/2020 | Park et al. |
| 10,880,107 | B2 | 12/2020 | Gamroth et al. |
| 11,050,581 | B1 * | 6/2021 | Kavathekar ........... H04L 12/282 |
| 11,307,538 | B2 | 4/2022 | Park et al. |
| 11,385,605 | B2 | 7/2022 | Wenzel et al. |
| 11,625,018 | B2 | 4/2023 | Krishnan et al. |
| 2002/0072391 | A1 | 6/2002 | Itoh et al. |
| 2006/0274745 | A1 * | 12/2006 | Wang .................... H04W 88/16 |
| | | | 370/389 |
| 2007/0016714 | A1 | 1/2007 | Huotari et al. |
| 2009/0312853 | A1 | 12/2009 | Kore et al. |
| 2011/0317548 | A1 | 12/2011 | Pustylnik |
| 2013/0238144 | A1 | 9/2013 | Shahapurkar et al. |
| 2014/0207290 | A1 | 7/2014 | Crawford et al. |
| 2014/0359524 | A1 * | 12/2014 | Sasaki ................. G06F 3/04842 |
| | | | 715/781 |
| 2016/0313749 | A1 | 10/2016 | Frenz |
| 2016/0327296 | A1 | 11/2016 | Leising et al. |
| 2017/0017247 | A1 | 1/2017 | Fassier et al. |
| 2017/0353245 | A1 | 12/2017 | Vardarajan |
| 2018/0232422 | A1 | 8/2018 | Park et al. |
| 2018/0232423 | A1 | 8/2018 | Park et al. |
| 2018/0232459 | A1 | 8/2018 | Park et al. |
| 2018/0278434 | A1 | 9/2018 | Maseng et al. |
| 2019/0109907 | A1 | 4/2019 | Duraisingh |
| 2019/0163215 | A1 | 5/2019 | Cheng et al. |
| 2019/0172165 | A1 | 6/2019 | Verteletskyi et al. |
| 2020/0050161 | A1 | 2/2020 | Noboa |
| 2020/0228621 | A1 | 7/2020 | Gamroth et al. |
| 2020/0233657 | A1 | 7/2020 | Duraisingh et al. |
| 2021/0282010 | A1 * | 9/2021 | Sugumar ............... H04W 80/02 |
| 2021/0382449 | A1 | 12/2021 | Krishnan et al. |
| 2021/0382451 | A1 | 12/2021 | Bharathi et al. |
| 2021/0382474 | A1 | 12/2021 | Krishnan et al. |
| 2022/0018567 | A1 | 1/2022 | Ock et al. |
| 2023/0013555 | A1 | 1/2023 | Kuckuk et al. |

OTHER PUBLICATIONS

Legrand, "Wattstopper—Wireless BACnet MS/TP Bridge," Catalog Number WBT900, No. 25174-2/17 rev. 1 (4 pages).

Luo et al., "Towards a Wireless Building Management System Requiring no Change to Upper-layer Protocols," The Hong Kong Polytechnic University, Harbin Institute of Technology, Building Integration Perfection Ltd., Nanchang University Jul. 30, 2012 (12 pages).

Press Release, "The new W-BACnet from Lumen Radio—an unparalleled wireless BACnet solution driving cost—and time savings for building automation," https://lumenradio.com/stories/the-new-w-bacnet-from-lumenradio-an-unparalleled-wireless-bacnet-solution-driving-cost-and-time-savings-for-building-automation/. Jan. 24, 2022 (5 pages).

U.S. Appl. No. 18/215,990, filed Jun. 29, 2023, Bari, Prasanna Manohar.

* cited by examiner

SYSTEMS AND METHODS FOR DATA CONTROL IN A BUILDING MANAGEMENT SYSTEM

CROSS-REFERENCE TO RELATED PATENT APPLICATIONS

This application is a continuation-in-part of U.S. patent application Ser. No. 17/374,135 filed Jul. 13, 2021, and claims the benefit of and priority to Indian Provisional Patent Application No. 202121022969 filed May 24, 2021, the entire disclosures of which are incorporated by reference herein.

BACKGROUND

The present disclosure relates generally to building management systems. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system including building equipment operable to affect a physical state or condition of a building and a gateway device coupled to the building equipment and configured to communicate building data from the building equipment to a cloud-based platform according to a data control template configured to control a data rate between the gateway device and the cloud-based platform. The cloud-based platform includes a hub configured to generate a virtual device twin, the virtual device twin configured to represent the gateway device on the cloud-based platform and comprising the data control template and receive the building data. The cloud-based data platform also includes a plurality of cloud applications, wherein the plurality of cloud applications are configured to receive the building data from the hub and process the building data to provide a building data output. The cloud-based platform is configured to communicate the building data output to at least one of a control application, an analytic application, or a monitor application, and receive a command from at least one of the control application, the analytic application, or the monitor application based on the building data output. The gateway device is further configured to operate according to the command.

Another implementation of the present disclosure is a method of controlling the data rate in a building management system (BMS), the method including operating building equipment to affect a physical state or condition of a building, and communicating, via the gateway device, building data from the building equipment to a platform external to the gateway device according to a data control template configured to control a data rate between the gateway device and the platform external to the gateway device. The method further includes generating, at a plurality of applications of the platform external to the gateway device, a building data output based on the building data, receiving, at the platform external to the gateway device, a command based on the building data output from at least one of a control application, an analytic application, or a monitor application, and operating the gateway device based on the command.

Another implementation of the present disclosure is a building management system (BMS) including building equipment operable to affect a physical state or condition of a building and a gateway device configured to identify building equipment coupled to the gateway device and generate an equipment list including the identified building equipment. The BMS further includes a cloud-based data platform coupled to the gateway device configured to determine if an equipment template library stored in the cloud-based data platform includes an equipment template associated with the building equipment listed in the equipment list. The gateway device is configured to only send the equipment template associated with the building equipment to the cloud-based data platform if the equipment template library does not include the equipment template associated with the building equipment.

DETAILED DESCRIPTION

Figure 1:
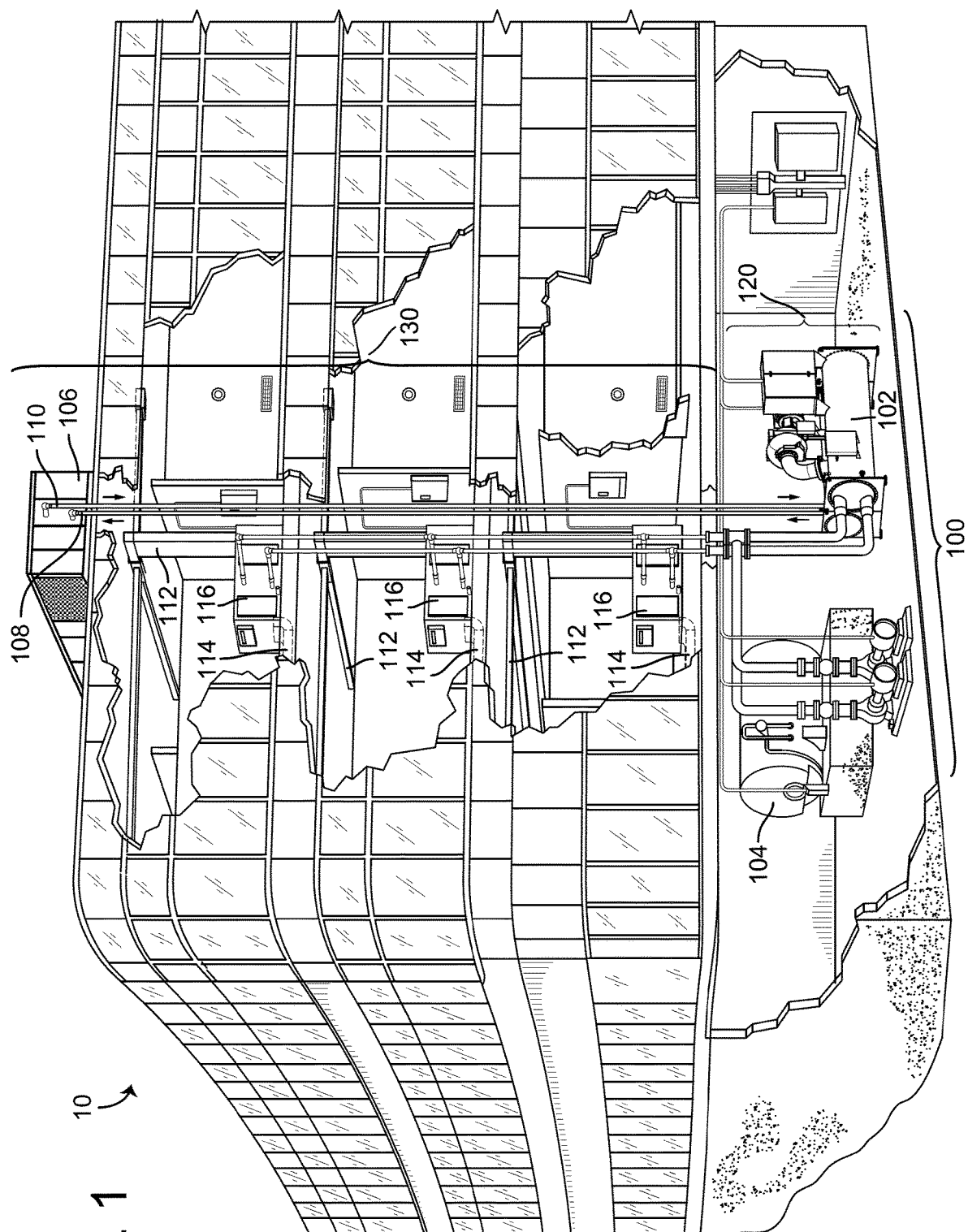
FIG. 1 is drawing of a building equipped with a heating, ventilating, and air conditioning (HVAC) system, according to some embodiments.

Referring generally to the FIGURES, a building management system (BMS) with automatic equipment discovery and equipment model distribution is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

In brief overview, the BMS described herein provides a system architecture that facilitates control of the BMS and devices within it over via a gateway device. Some devices of this network may be unable to communicate over an IP network and/or are not "Internet enabled." In this regard, only local control, i.e., commands sent over the building network for the devices may be available, i.e., commands can only be sent to the devices of the building via the building network. To allow the various devices of the building network access to the Internet or an IP based network, one or more gateways can be installed in the building which bridge the gap between the building networks and IP based networks (e.g., the Internet). By establishing a link between the building networks of the building and various IP based networks, local control of the building is extended to remote control of the building via the Internet as users can access the various devices of the building remotely, via the internet.

To properly enable the devices of the building to be controlled via the Internet, a logical network representation of the building network, the devices of the building, and the gateways (e.g., configuration data) can be maintained by a building server. The building server may be any Internet server which the gateways of the building communicate with. This remote building server may store and maintain a logical network representation of the gateways and the devices of the building. In this regard, the gateways of the building may pass equipment models and indications of the devices connected to the gateway to the building server. Further, the various connections between the gateways and the devices may be recorded by the building server, this data received by the remote building server via the gateways.

A equipment model, as referred to herein, may indicate a list of point objects of one or more devices that a particular gateway is responsible for collecting data from and/or sending control signals to. For example, an analog input may be a particular point object in an equipment model. The equipment model may indicate that the analog input is sampled every minute. In this regard, the gateway may sample the analog input every minute. In another example, the same equipment model may include a point object which is a "valve position point." A building server may send a command to the gateway which may be a command position (e.g., 45 degrees, 5 Volts, and/or 455 steps) which the gateway may send to the device with the "valve position point." As referred to herein, "collect" may refer to extracting data from a device.

The BMS described below can provide automatic equipment discovery and equipment model distribution for equipment connected to the gateways. Equipment discovery can occur across multiple different master slave token passing ("MS/TP") communications busses (e.g., wireless MS/TP buses, wired MS/TP buses, etc.) and across multiple different communications protocols (BACnet, MODbus, etc.). In some embodiments, equipment discovery is accomplished using active node tables, which provide status information for devices connected to each communications bus. For example, each communications bus can be monitored for new devices by monitoring the corresponding active node table for new nodes. When a new device is detected, the BMS can begin interacting with the new device (e.g., sending control signals, using data from the device) without user interaction.

Some devices in the BMS present themselves to the network using equipment models. An equipment model defines equipment object attributes, view definitions, schedules, trends, and the associated BACnet value objects (e.g., analog value, binary value, multistate value, etc.) that are used for integration with other systems. Some devices in the BMS store their own equipment models. Other devices in the BMS have equipment models stored externally (e.g., within other devices). For example, a gateway device can store the equipment model for a chiller. In some embodiments, the gateway device automatically creates the equipment model for the chiller and/or other devices on the MS/TP bus. Other gateway devices can also create equipment models for devices connected to their MS/TP buses. The equipment model for a device can be created automatically based on the types of data points exposed by the device on the MS/TP bus, device type, and/or other device attributes. Several examples of automatic equipment discovery and equipment model distribution are discussed in greater detail below. Throughout this disclosure, the terms "equipment model," "equipment model template," and "equipment template" are used interchangeably.

Building and HVAC System

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary airside system which can be used in HVAC system 100 are described in greater detail with reference to FIG. 2B.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Airside System

Figure 2:
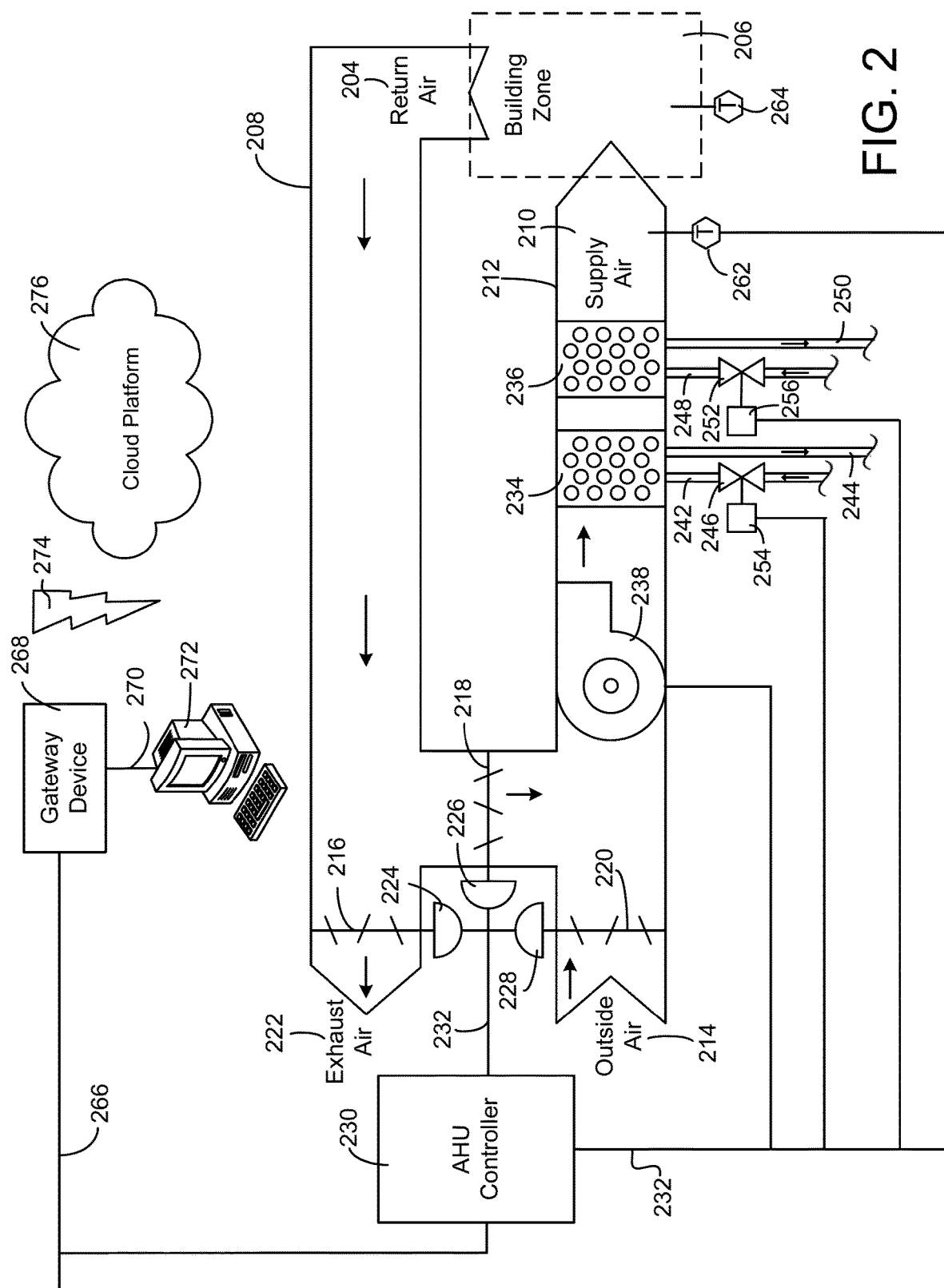
FIG. 2 is a block diagram of an airside system which can be used in the HVAC system of FIG. 1, according to some embodiments.

Referring now to FIG. 2, a block diagram of an airside system 200 is shown, according to an exemplary embodiment. In various embodiments, airside system 200 can supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. In some embodiments, referring to FIG. 3, airside system 200 can be used in BMS 300 as a third-party COBP rooftop unit 336. Airside system 200 can operate to heat or cool an airflow provided to building 10.

Airside system 200 is shown to include an economizer-type air handling unit (AHU) 202. Economizer-type AHUs vary the amount of outside air and return air used by the air handling unit for heating or cooling. For example, AHU 202 can receive return air 204 from building zone 206 via return air duct 208 and can deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 can communicate with an AHU controller 230 via a sensor/actuator (SA) bus 232. Actuators 224-228 can receive control signals from AHU controller 230 and can provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 2, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 can communicate with fan 238 via SA bus 232 to control a flow rate of supply air 210. In some embodiments, AHU controller 230 controls an amount of heating or cooling applied to supply air 210 by modulating a speed of fan 238.

Cooling coil 234 can receive a chilled fluid from waterside system 120 via piping 242 and can return the chilled fluid to waterside system 120 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230) to modulate an amount of cooling applied to supply air 210.

Heating coil 236 may receive a heated fluid from waterside system 120 via piping 248 and can return the heated fluid to waterside system 120 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 can communicate with AHU controller 230 via SA bus 232. Actuators 254-256 can receive control signals from AHU controller 230 and can provide feedback signals to AHU controller 230. In some embodiments, AHU controller 230 receives a measurement of the supply air temperature from a temperature sensor 262 positioned in supply air duct 212 (e.g., downstream of cooling coil 234 and/or heating coil 236).

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. In some embodiments, AHU controller 230 receives a measurement of the zone temperature from a temperature sensor 264 positioned within building zone 206. AHU controller 230 can control the temperature of supply air 210 and/or building zone 206 by activating or deactivating coils 234-236, adjusting a speed of fan 238, or a combination of both.

Still referring to FIG. 2, AHU controller 230 can be connected to gateway device 268 via system bus 266. System bus 266 can be a wired MS/TP bus, and can include any of a variety of communications hardware (e.g., wires, optical fiber, terminals, etc.) and/or communications software configured to facilitate communications between AHU controller 230 and gateway device 268. In some embodiments, system bus 266 can be a wireless MS/TP bus, and can include operating over a wireless MS/TP network such as a Zigbee 802.15.4 network. The wireless MS/TP bus can include a plurality of wireless bridge devices configured to build the MS/TP network and provide communication between AHU controller 230 and gateway device 268 in such a manner so that the devices are operationally unaware of the wireless connection. Gateway device 268 can communicate with client device 272 via data communications link 270 (e.g., BACnet IP, Ethernet, wired or wireless communications, etc.) and communicate with cloud platform 276 over internet connection 274. Internet connection 274 can be a wired or wireless connection (i.e. Ethernet, Wi-Fi, Cellular, etc.).

Figure 3:
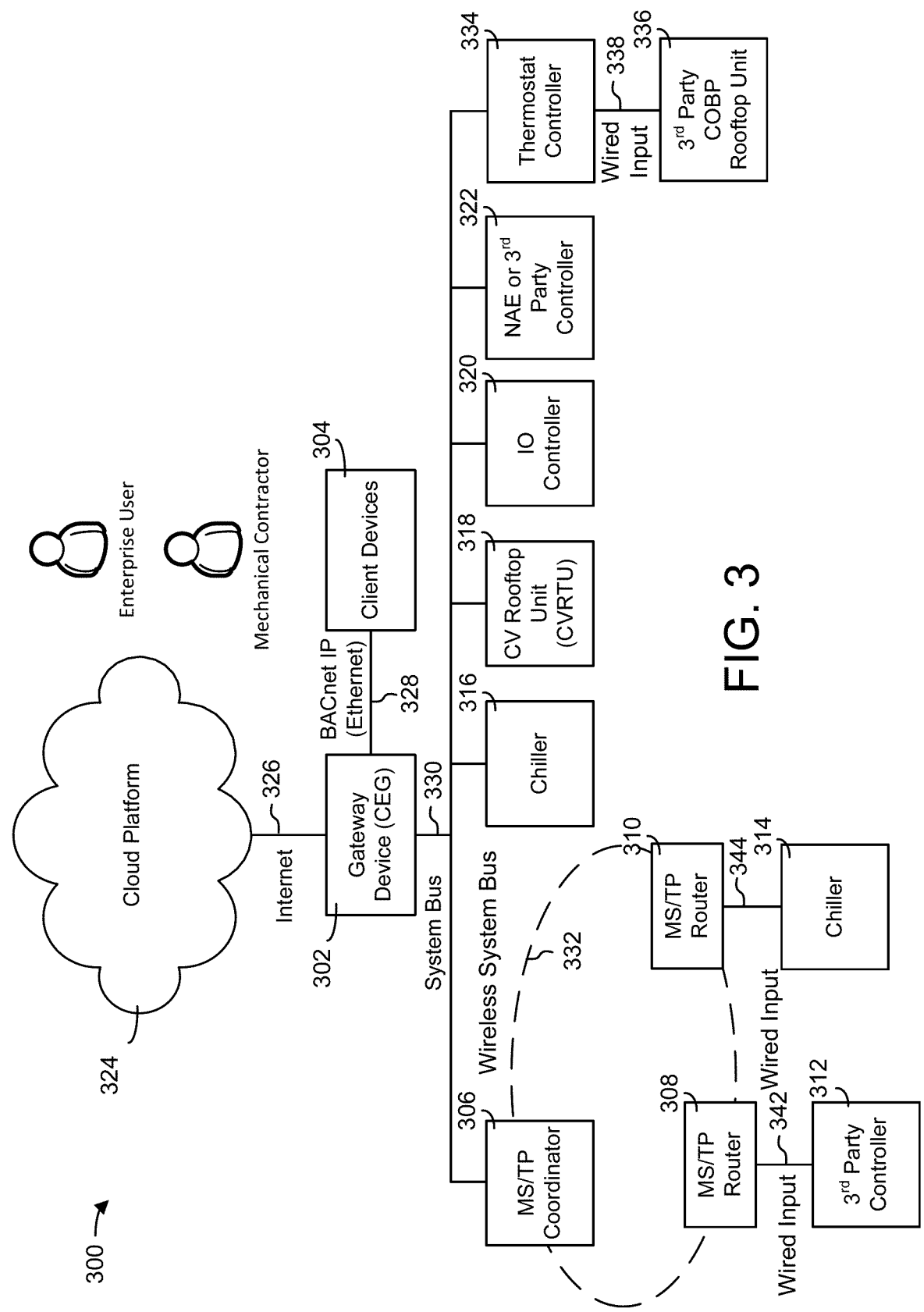
FIG. 3 is a block diagram of a building management system (BMS) which can be used to monitor and control the building and HVAC system of FIGS. 1-2, according to some embodiments.

Client device 272 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, airside system 200, BMS 300 of FIG. 3, and/or the various subsystems, and devices thereof. Client device 272 can be a computer workstation, a client terminal, a remote or local interface, or any other type of user interface device. Client device 272 can be a stationary terminal or a mobile device. For example, client device 272 can be a desktop computer, a computer server with a user interface, a laptop computer, a tablet, a smartphone, a PDA, or any other type of mobile or non-mobile device. System bus 266, gateway device 268, client device 272 and cloud platform 276 are explained in further detail below with reference to FIG. 3.

Building Management System with Cloud-Based Monitoring and Control

Referring now to FIG. 3, a block diagram of a building management system (BMS) 300 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 300 can be used to monitor and control the devices of HVAC system 100 and/or airside system 200 (e.g., HVAC equipment), and/or waterside system 120, as well as other types of BMS devices (e.g., BACnet MS/TP devices, lighting equipment, security equipment, etc.).

In brief overview, BMS 300 provides a system architecture that facilitates central control of smart and non-smart building equipment of BMS 300 from a networked location. In some embodiments, BMS 300 can provide automatic equipment discovery and equipment model distribution. Equipment discovery can occur across multiple different communications networks (e.g., system bus, wireless system bus, etc.) and across multiple different communications protocols (e.g., LONworks, MODbus, BACnet, etc.). For the purposes of simplicity, this disclosure will describe a building management system with reference to the BACnet protocol, but it should be understood by one of ordinary skill in the art that other building management protocols may be used. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 300 can begin interacting with the new device (e.g., sending control signals, using data from the device) without user interaction.

Some devices in BMS 300 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of points objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices. The equipment models and associated BACnet value objects and point objects can make up the building data that can be collected by BMS 300. For example, gateway device 302 can collect building data (e.g., output variables provided by the device) and communicate that building data to cloud platform 324 for processing and control of BMS 300.

In some embodiments, gateway device 302 automatically creates the equipment model for chiller 316 or other devices connected to it. Other gateway devices can also create equipment models for devices connected to them. The equipment model for a device can be created automatically based on the types of data points exposed by the device on the communications bus, device type, and/or other device attributes. In some embodiments, BMS 300 is configured to perform some or all of the operations described in U.S. patent application Ser. No. 16/844,328 filed Apr. 9, 2020, the entire disclosure of which is incorporated by reference herein.

Still referring to FIG. 3, BMS 300 is shown to include a gateway device 302 (i.e., a connected equipment gateway). Gateway device 302 can communicate with client devices 304 (e.g., user devices, desktop computers, laptop computers, mobile devices, etc.) via a data communication link 328 (e.g., BACnet IP, Ethernet, wired or wireless communication, etc.). Gateway device 302 can provide a user interface to client devices 304 via data communications link 328. The user interface may allow users to monitor and/or control BMS 300 via client devices 304. Several examples of the operations that may be performed by gateway devices facilitating communication between building equipment and cloud platforms are described in U.S. Pat. No. 10,868,857 filed Apr. 21, 2017 and U.S. patent application Ser. No. 16/844,328 filed Apr. 9, 2020. The entire disclosures of both these patent applications are incorporated by reference herein.

In some embodiments, gateway device 302 is connected to building equipment via a system bus 330. Building equipment can be devices of HVAC system 100 as well as other types of BMS devices (e.g., lighting equipment, security equipment, etc.) and/or any BACnet MS/TP master device. In some embodiments, building equipment are smart communicating equipment controllers, SC-EQ, manufactured by Johnson Controls, Inc. Further details of the SC-EQ device may be found in U.S. patent application Ser. No. 16/659,155 filed Oct. 21, 2019. The entire disclosure of U.S. patent application Ser. No. 16/659,155 is incorporated by reference herein.

System bus 330 can include any of a variety of communications hardware (e.g., wire, optical fiber, terminals, etc.) configured to facilitate communications between gateway device 302 and other devices connected to system bus 330. In some embodiments system bus 330 can additionally include and/or alternatively be replaced by a wireless system bus, shown as a wireless system bus 332.

Wireless system bus 332 can include a plurality of wireless bridge devices forming a multi-point to multi-point network. The wireless bridge devices of wireless system bus 332 are shown as MS/TP coordinator 306 and MS/TP routers 308 and 310. In some embodiments, MS/TP coordinator 306 is a component of gateway device 302. Still in others, MS/TP coordinator 306 is a separate device and may be connected to gateway device 302 using a RJ12 or MS/TP COM port. MS/TP routers 308 and 310 interface between building equipment (e.g., MS/TP devices) such as controller 312 and chiller 314 to allow them to be discovered by MS/TP coordinator 306 and posted on system bus 330 as if the devices were connected directly to system bus 330. The multi-point to multi-point network can be a mesh network created between a MS/TP coordinator 306 and MS/TP routers 308 and 310. For example, the mesh network may be an 802.15.4 based network such as ZIGBEE. Wireless system bus 332 may allow the gateway device 302 to communicate with devices connected to via the wireless system bus 332. Wireless system bus devices may include any BACnet MS/TP device and/or any device that can be connected to gateway device 302 over system bus 330. Referring still to FIG. 3, wireless system bus devices can include controller 312 and chiller 314. Wireless system bus 332 may be configured so that the wireless system bus devices act as if they were connected directly to system bus 330. In some embodiments, neither the wireless system bus devices nor gateway device 302 are aware of the intermediate network of MS/TP devices. In some embodiments, the gateway device 302 is connected to a mix of devices over both system bus 330 and wireless system bus 332. For example, system bus 330 and wireless system bus 332 can connect gateway device 302 with controller 312, chiller 314, chiller 316, a constant volume (CV) rooftop unit (RTU) 318, input/output (IO) controller 320, network automation engine (NAE) or third-party controller 322, and thermostat controller 334 connected over wired input 338 to third-party rooftop unit 336.

In some embodiments, gateway device 302 is connected to wireless system bus 332 via system bus 330. In other embodiments, gateway device 302 is connected directly to wireless system bus 332. In some embodiments, BMS 300 operates only using wireless system bus 332. In some embodiments BMS 300 can include both a wired system bus 330 and a wireless system bus 332, as shown in FIG. 3. Throughout this disclosure, the devices and building equipment connected to system bus 330 and wireless system bus 332 may be referred to together as system bus devices.

Gateway device 302 can be configured to communicate using a MS/TP protocol or any other communications protocol. Gateway device 302 can collect building data (e.g., equipment models, value objects, point objects, and/or any other data made available by building equipment) and communicate that data to cloud platform 324. Cloud platform 324 can process the data and direct gateway device 302 to collect specific data (e.g., listed value objects, point objects, etc.) from specific building equipment. Gateway device 302 can subscribe to the indicated objects and communicate the data to cloud platform 324 periodically.

Still referring to FIG. 3, gateway device 302 can be configured to communicate with cloud platform 324 via an internet communications link 326 (e.g., Wi-Fi, Ethernet, cellular, etc.) In some embodiments, internet communications link 326 may be provided by external network adapters attached to gateway device 302, as explained in further detail below. Gateway device 302 may be configured to connect the building equipment (e.g., chillers, controllers, RTUs, and/or other MS/TP devices) on the trunk (e.g., system bus 330, wireless system bus 332, etc.) to cloud platform 324. Gateway device 302 can facilitate the communication of building data from building equipment to cloud platform 324. The user interface may allow users to view the building data and/or monitor and control this connection to manage BMS 300, including the data rate between gateway device 302, the building equipment, and cloud platform 324. Gateway device 302 can be configured to automatically discover equipment in BMS 300 and automatically generate or obtain equipment models for the discovered equipment. Gateway device 302 can also be configured to gather more data from the equipment (e.g., equipment model templates) and to use the equipment model templates to drive features of gateway device 302. In some embodiments, gateway device 302 is configured similarly and performs in a similar manner to a gateway device described in commonly owned U.S. patent application Ser. No. 16/844,328 filed Apr. 9, 2020, the entire disclosure of which has been incorporated by reference herein.

Cloud platform 324 can include a variety of cloud-based services and/or applications configured to store, process, analyze, or otherwise consume the data collected from gateway device 302. Cloud platform 324 may be accessed by various users (e.g., enterprise users, mechanical contractors, cloud application users, etc.) via control applications. Some users can access and interact with gateway device 302 directly via client devices 304 (e.g., via a UI provided locally by gateway device 302), whereas other users can interact with cloud platform 324 (e.g., via a UI provided by cloud platform 324). Users can interact with cloud platform 324 via control applications configured to display the building data and provide a user with control of the gateway device 302. The features of cloud platform 324 and gateway device 302 are described in greater detail below.

Gateway device 302 can provide a user interface for any device containing an equipment model. Building equipment such as thermostat controller 334 can provide their equipment models to gateway device 302 via system bus 330. In some embodiments, gateway device 302 automatically creates equipment models for connected devices that do not contain an equipment model (e.g., non-smart equipment, legacy equipment, third-party equipment, etc.). For example, gateway device 302 can create an equipment model for any device that responds to a device tree request. In some embodiments, gateway device 302 can create an equipment model for any device that responds to a read object list attributes request. The equipment models created by gateway device 302 can be stored within gateway device 302 and/or transferred to cloud platform 324. Gateway device 302 can then provide a user interface for devices that do not contain their own equipment models using the equipment models created by gateway device 302. In some embodiments, gateway device 302 stores a view definition for each type of equipment connected via system bus 330 and wireless system bus 332 and uses the stored view definition to generate a user interface for the equipment.

Figure 4A:
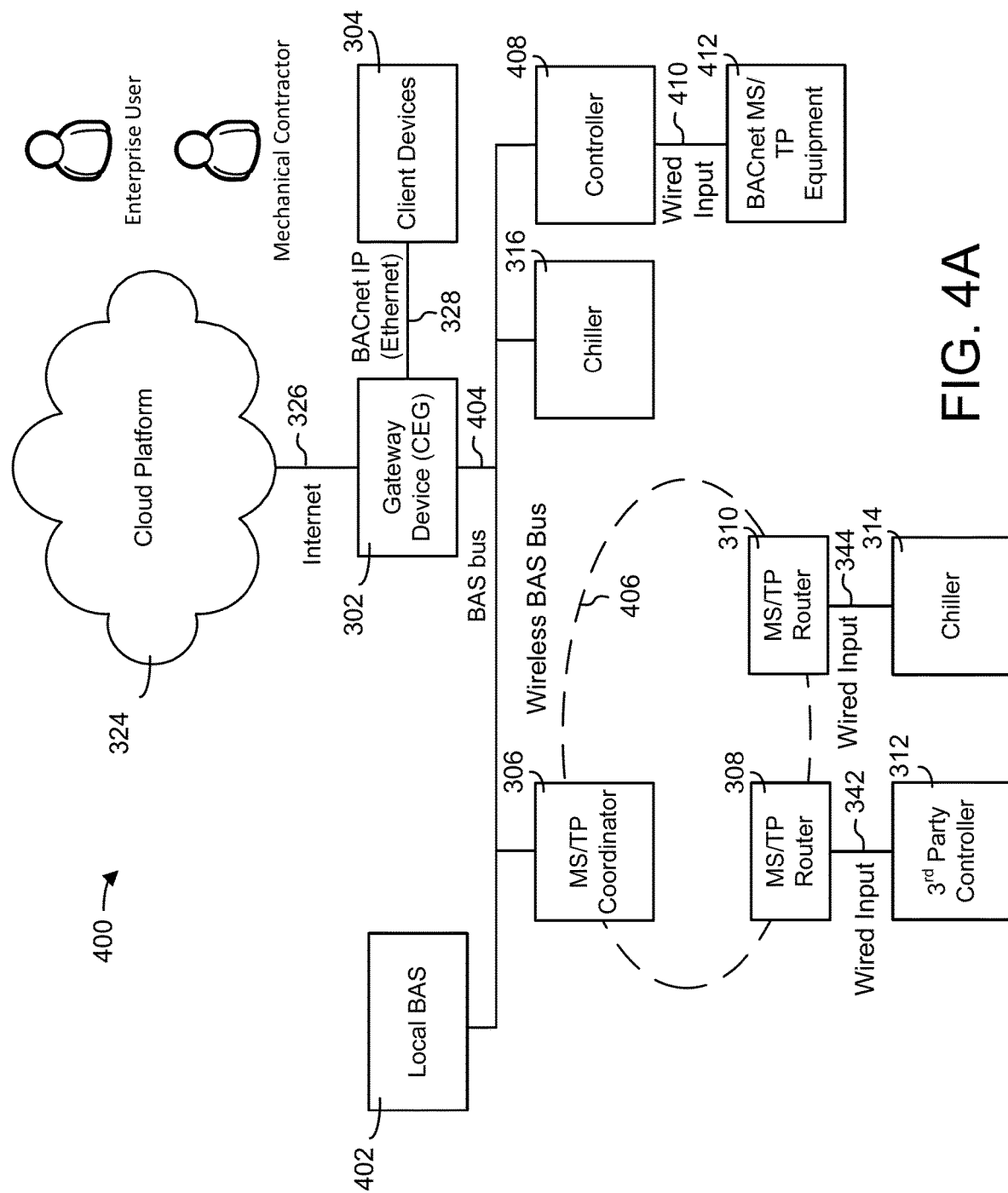
FIG. 4A is a block diagram of a building management system (BMS) with a building automation system (BAS) which can be used to monitor and control the building and HVAC system of FIGS. 1-2, according to some embodiments.

Referring now to FIG. 4A, a block diagram of BMS 400 is shown, according to an exemplary embodiment. In some embodiments, BMS 400 may include some or all of the features of BMS 300, as described with reference to FIG. 3. BMS 400 is shown to include gateway device 302 connected via BAS bus 404 to MS/TP coordinator 306. BMS 400 is shown to also include gateway device 302 connected over BAS bus 404 to chiller 316, and controller 408. MS/TP coordinator 306 can be connected via wireless BAS bus 406 to MS/TP routers 308 and 310. MS/TP router 308 is connected to controller 312 via wired input 342 and MS/TP router 310 is connected to chiller 314 via wired input 344. Controller 312 can act as an intermediary to connect MS/TP router 310 to other building equipment. As explained above with reference to FIG. 3, the MS/TP coordinator 306 and MS/TP routers 308, and 310 create a wireless system bus 332 for connecting the gateway device 302 to controller 312 and chiller 314 as though they were connected to gateway device 302 directly over BAS bus 404. Wireless BAS bus 406 may be transparent so that the gateway device 302 and the chillers 314 are unaware of the wireless connection. In some embodiments, a local building automation system (BAS) 402 is also connected to gateway device 302 via BAS bus 404. Gateway device 302 can connect to devices and local BAS 402 on the BAS trunk (e.g., system bus 330) when a local BAS 402 is present by daisy chaining with any of the MS/TP controllers on the BAS trunk 404 and communicate using the BACnet MS/TP protocol.

Figure 4B:
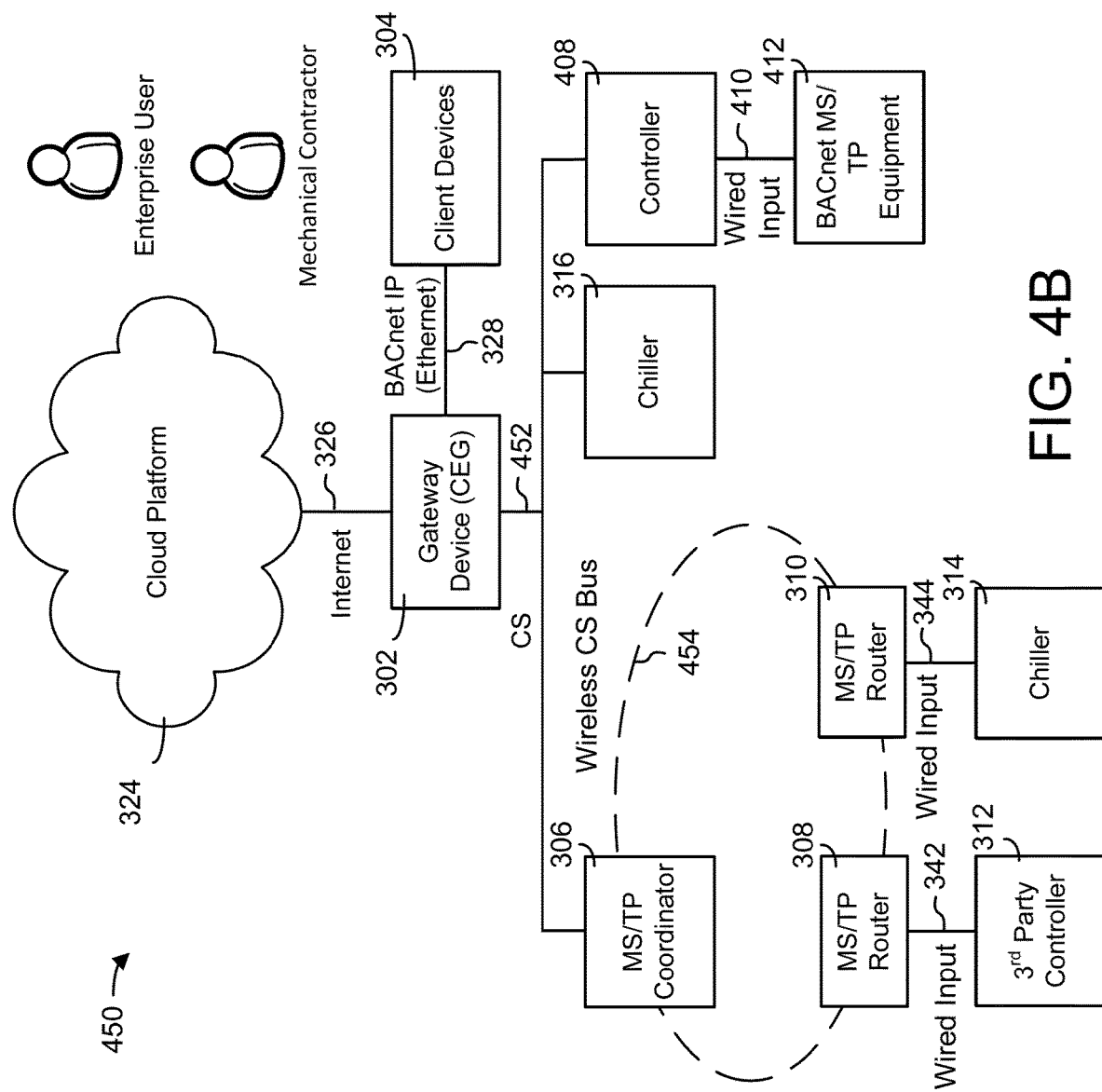
FIG. 4B is a block diagram of a building management system (BMS) which can be used to monitor and control the building and HVAC system of FIGS. 1-2, according to some embodiments.

Referring now to FIG. 4B, a block diagram of BMS 450 is shown, according to an exemplary embodiment. BMS 450 may include some or all of the features of BMS 400 as described above with reference to FIG. 4A. BMS 450 illustrates a BMS without a local BAS. Gateway device 302 may connect to MS/TP controllers on a private connected services (CS) bus 452 instead of BAS trunk 404 as shown in FIG. 4A. BMS 450 can be configured according to the networks provided in U.S. application Ser. No. 17/374,135 filed Jul. 13, 2021 (now U.S. Pat. No. 12,200,043 granted Jan. 14, 2025) and incorporated herein by reference in its entirety.

Gateway Device

Figure 5:
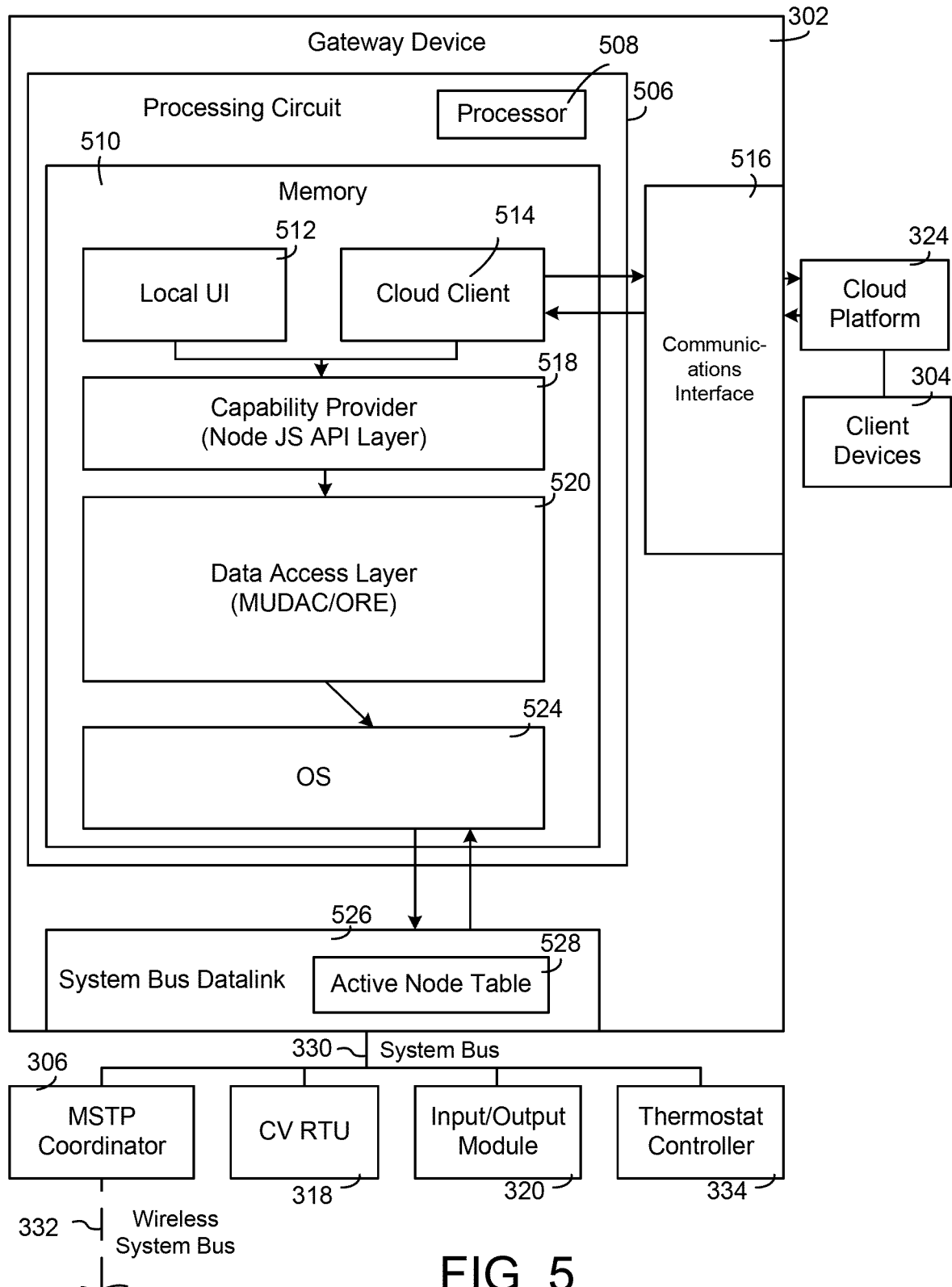
FIG. 5 is a block diagram illustrating a gateway device which can be used in BMS 300 of FIG. 3, according to some embodiments.

Referring now to FIG. 5, a block diagram illustrating gateway device 302 of BMS 300 in further detail is shown, according to an exemplary embodiment. Gateway device 302 is shown to include a system bus datalink 526, a communications interface 516, and a processing circuit 506. System bus datalink 526 can connect to system bus 330 and can be used by gateway device 302 to communicate with various other devices connected to system bus 330 and/or wireless system bus 332. In some embodiments, system bus datalink connects to data access layer 520. In some embodiments, system bus datalink is a component of data access layer 520. System bus datalink 526 can be used to communicate with chiller 316, CV RTU 318, 10 controller 320, and/or thermostat controller 334 via system bus 330. System bus datalink 526 may also connect to MS/TP coordinator 306 via system bus 330, which in turn connects system bus datalink 526 to wireless system bus 332. For example, referring back now to FIG. 3, wireless system bus 332 may connect to MS/TP routers 308 and 310 which in turn connect to wireless system bus devices such as controller 312 and chiller 314, effectively connecting gateway 302 to controller 312 and chiller 314 as if they were connected via system bus 330. In other embodiments, MS/TP coordinator may be directly connected to system bus datalink 526 bypassing system bus 330.

In some embodiments, the automatic equipment discovery is based on an active node tables for system bus 330. Still referring to FIG. 5, for example, gateway device 302 is shown to include active node table 528. In embodiments where MS/TP coordinator 306 is connected directly to gateway device 302 and wireless system 332 is separate from system bus 330, there may be separate node tables for wireless system bus 332 and system bus 330. Referring back to FIG. 5, active node table 528 provides status information for the devices connected to system bus 330 and wireless system bus 332. For example, active node table 528 can indicate which building equipment (e.g., MS/TP devices) are participating in the token ring used to exchange information via system bus 330 and/or wireless system bus 332. In some embodiments, active node table 528 is a table in the form of an array of bytes. The location of each byte in active node table 528 may represent the token ring participation status of a particular node or device. Devices connected to system bus 330 and wireless system bus 332 can be identified by MAC address (or any other device identifier) in active node table 528. Advantageously, active node table 528 can list the MAC addresses of the devices connected to system bus 330 and wireless system bus 332 without requiring the devices to be placed in discovery mode.

The active node table can be stored within one or more devices connected to the system bus 330. For example, as shown in FIG. 5, active node table 528 can be stored within gateway device 302. In some embodiments, active node table 528 includes a change counter attribute. Each time a change to active node table 528 occurs (e.g., a new device begins communicating on system bus 330 and/or wireless system bus 332), the change counter attribute can be incremented by system bus datalink 526. Other objects or devices interested in the status of active node table 528 can subscribe to a change of value (COV) of the change counter attribute. When the change counter attribute is incremented, system bus datalink 526 can report the COV to any object or device that has subscribed to the COV. For example, data access layer 520 can subscribe to the COV of the change counter attribute and can be automatically notified of the COV when a change to active node table 528 occurs. In response to receiving the COV notification, data access layer 520 can read active node table 528 and discover the new device. Data access layer 520 can use the information from active node table 528 to generate a list of devices connected to system bus 330 and wireless system bus 332 (e.g., equipment list). Data access layer 520 can store the equipment list in gateway device 302. In some embodiments, the equipment list can be additionally and/or alternatively transmitted to and stored in cloud platform 324.

The equipment list generated by gateway device 302 can include information about each device connected to system bus 330 and wireless system bus 332 (e.g., device type, device model, device ID, MAC address, device attributes, etc.). When a new device is detected on system bus 330 and/or wireless system bus 332, gateway device 302 can automatically update the equipment list. Gateway device 302 can provide the updated equipment list to cloud platform 324. In some embodiments, if cloud platform 324 is missing an equipment model template for building equipment listed in the equipment list, it may request the equipment model template from gateway device 302. Gateway device 302 can retrieve the equipment model from the device if the device stores its own equipment model. If the device does not store its own equipment model, gateway device 302 can retrieve a list of point values provided by the device. Gateway device 302 can then use the equipment model and/or list of point values to generate an equipment model template for the device. Gateway device 302 may present information about the connected devices on system bus 330 and wireless system bus 332 to a user. Several examples of automatic equipment discovery and equipment model distribution can be found in commonly owned U.S. patent application Ser. No. 16/844,328 filed Apr. 9, 2020, the entire disclosure of which has been incorporated by reference herein.

Still referring to FIG. 5, processing circuit 506 is shown to include a processor 508 and memory 510. Processor 508 can be a general purpose or specific purpose processor, an application specific integrated circuit (ASIC), one or more field programmable gate arrays (FPGAs), a group of processing components, or other suitable processing components. Processor 508 is configured to execute computer code or instructions stored in memory 510 or received from other computer readable media (e.g., CDROM, network storage, a remote server, etc.).

Memory 510 can include one or more devices (e.g., memory units, memory devices, storage devices, etc.) for storing data and/or computer code for completing and/or facilitating the various processes described in the present disclosure. Memory 510 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to processor 508 via processing circuit 506 and can include computer code for executing (e.g., by processor 508) one or more processes described herein. When processor 508 executes instructions stored in memory 510, processor 508 generally configures gateway device 302 (and more particularly processing circuit 506) to complete such activities.

Still referring to FIG. 5, gateway device 302 is shown to include a network interface, shown as communications interface 516. Communications interface 516 can facilitate communications between gateway device 302 and external systems, devices, or applications. For example, communications interface 516 can be used by gateway device 302 to communicate with client device 304 (e.g., a tablet, a laptop computer, a smartphone, a desktop computer, a computer workstation, etc.), monitoring and reporting applications, enterprise control applications, remote systems and applications, and/or other external systems or devices for allowing user control, monitoring, and adjustment to BMS 300 and/or gateway device 302.

Communications interface 516 can include wired or wireless communications interfaces (e.g., jacks, antennas, transmitters, receivers, transceivers, wire terminals, etc.) for conducting data communications with client device 304 or other external systems or devices. In various embodiments, communications conducted via interface 516 can be direct (e.g., local wired or wireless communications) or via a communications network (e.g., a WAN, the Internet). Communications interface 516 can conduct communication using a variety of network protocols (e.g., BACnet MS/TP, BACnet IP, MODbus, etc.). In various embodiments, communications can be conducted over various network types (e.g., a cellular network, Wi-Fi network, ZIGBEE network, etc.). For example, communications interface 516 can include an Ethernet card and port for sending and receiving data via an Ethernet-based communications link or network. In another example, communications interface 516 can include a Wi-Fi transceiver for communicating via a wireless communications network. In another example, communications interface 516 can include cellular or mobile phone communications transceivers. In one embodiment, communications interface 516 is a power line communications interface and/or an Ethernet interface. In some embodiments, client devices 304 can communicate directly to gateway device 302 via communications link 516 without going through cloud platform 324. For example, a user may be able to access gateway device 302 using local UI 512 via communications interface 516.

In some embodiments, the above network interfaces are components of communications interface 516. In some embodiments, the network interfaces require external network adapters to facilitate communicate over various networks. The external network adapters may be detachable network adapters. For example, the external network adapters may be USB "dongles" configured to provide network connectivity over USB to connected devices. Gateway device 302 can be configured to automatically operate a network adapter that is attached. The detachable external network adapters can connect to gateway device 302 via communications interface 516. For example, an external Wi-Fi adapter may connect to Wi-Fi client 690 shown in FIG. 6 of communications interface 516.

Figure 6:
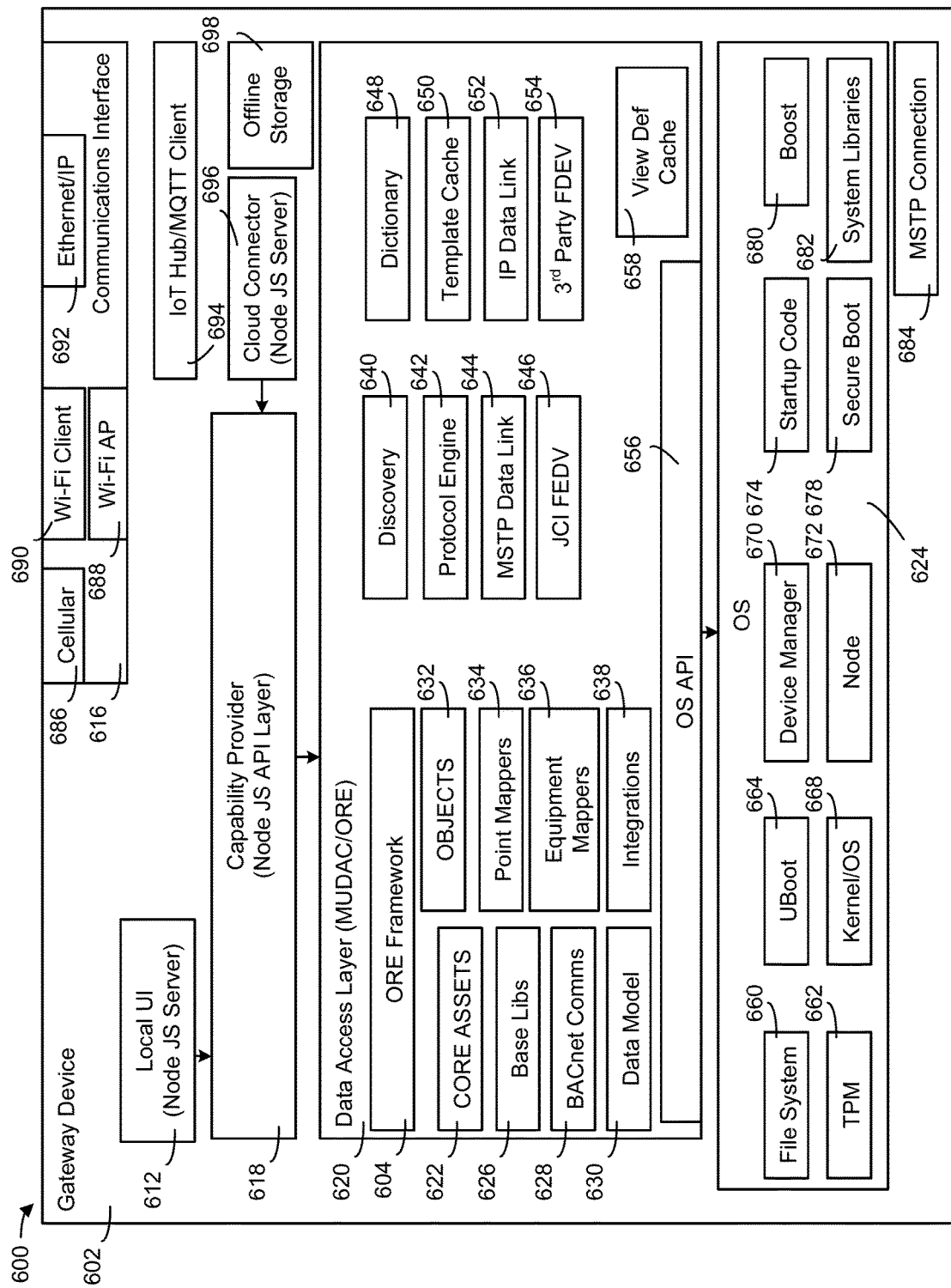
FIG. 6 is a block diagram illustrating select components of gateway device which can be used in BMS 300 in greater detail, according to some embodiments.

Referring now to FIG. 6, a block diagram of a gateway device 602 in greater detail is shown, according to an exemplary embodiment. Gateway device 302 may include all or some of the features and components of gateway device 602. For example, cloud client 514 of gateway device 302 can include IoThub/MQTT Client 694 and cloud connector 696. Data access layer 620 may include objects such as ORE framework 604, core assets 622, discovery module 640, dictionary 648, OS API 656 etc. OS 524 of gateway device 302 can include some or all of the components of OS 624. For example, OS 624 is shown to include various components such as file system 660, and Uboot 644, among others. In some embodiments, system bus datalink 526 shown in FIG. 5 may be a part of communications interface 616.

Still referring to FIG. 6, communications interface 616 is shown to include cellular module 686, Wi-Fi access point (AP) 688, Wi-Fi client 690, and Ethernet/IP module 692. In some embodiments, gateway device 302 is configured with network adapters as components of communication interface 616. Communications interface 616 can include a Wi-Fi client 690 and Wi-Fi access point (AP) 688 for communicating via a wireless communications network. Communications interface 616 can include cellular or mobile phone communications transceivers, shown as cellular module 686 for communicating directly via a cellular network. Communications interface 616 can include Wi-Fi access point (AP) 688 and Wi-Fi client 690. Wi-Fi AP 688 may be used by client devices to connect to gateway device 302. Wi-Fi client 690 may be configured to connect gateway device 602 to a cloud platform. In one embodiment, communications interface 616 includes a power line communications interface and/or an Ethernet interface, shown as Ethernet/IP 692. In some embodiments, MS/TP connection 684 is a component of communications interface 616. MS/TP connection 684 can facilitate communication between gateway device 602 and building equipment on a system bus. In some embodiments, MS/TP connection 684 may include some or all of the features of system bus datalink 526 of FIG. 5.

Communications interface 616 of gateway device 602 allows configuring and operating building equipment of BMS 300 that may each operate on various and possible distinct networks all from a single gateway device. The single gateway can eliminate the need for intermediate controllers associated with specific networks that handle only building equipment on that network. Gateway device 302 can also eliminate the need to connect all building equipment over a wired interface as it combines both a wired and wireless MS/TP connection interface in a single device.

Figure 15A:
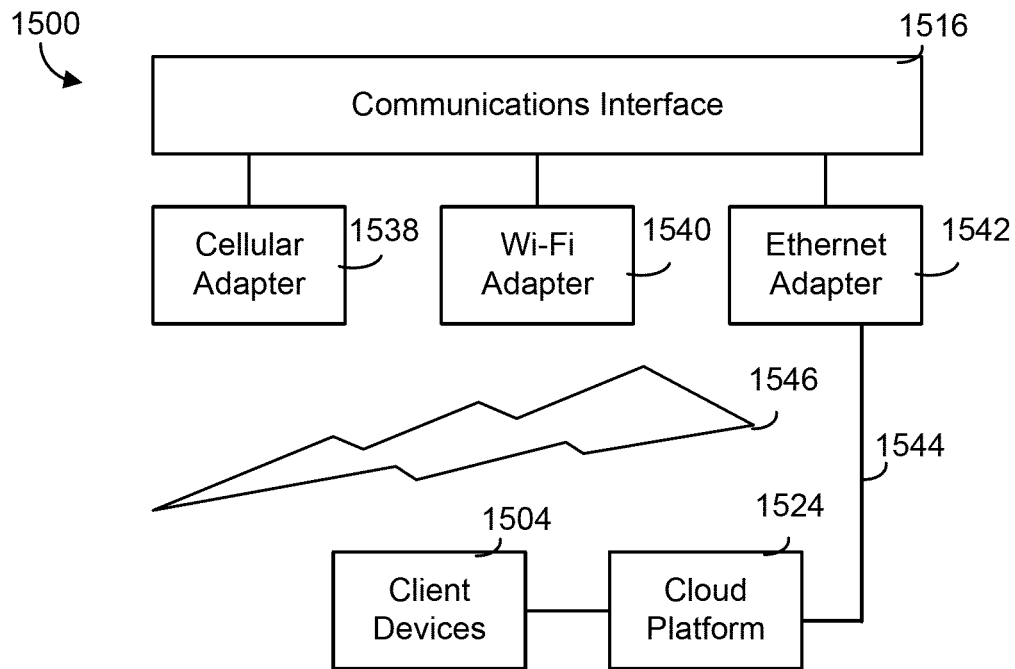
FIGS. 15A and 15B are block diagrams illustrating a communications interface of a gateway device for use in a BMS, according to some embodiments.
Figure 15B:
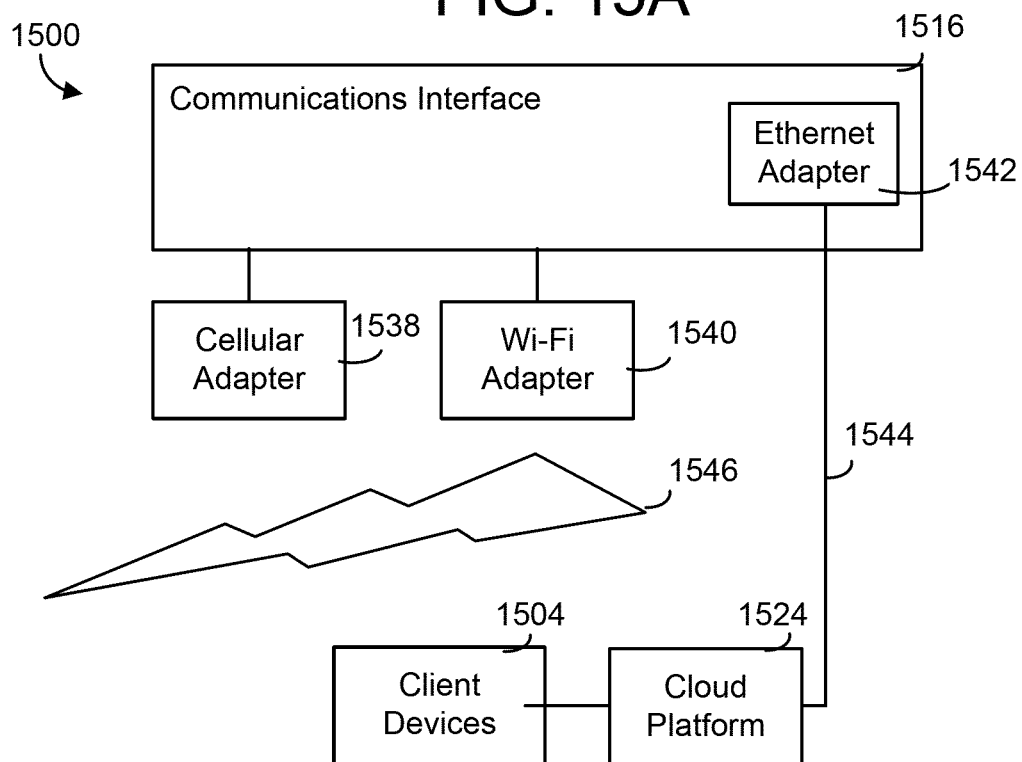

Referring now to FIGS. 15A and 15B, block diagrams of a communications interface for a BMS 1500 are shown, according to exemplary embodiments. Communications interface 1516 may include some or all components of communications interfaces 516 and 616. Communications interface 616 may connect to external, detachable network adapters. The external detachable network adapters may be configured to connect to and/or replace one or more of cellular 686, Wi-Fi client 690, and Ethernet/IP 692 shown in FIG. 6. The detachable network adapters can include cellular adapter 1538, Wi-Fi adapter 1540 and Ethernet adapter 1542. In some embodiments, the external network adapters are connected to communications interface 1516 via wired connections such as USB connections. In some embodiments, communications interface 1516 may also connect to an external detachable network adapter configured to operate over a ZIGBEE network. In some embodiments, each detachable network adapter is configured to provide connectivity over a single wireless network. In some embodiments, a detachable network adapter may provide wireless connectivity over multiple wireless networks (e.g., Wi-Fi, cellular, Zigbee, etc.).

Detachable network adapters allow gateway device 302 to function with over networks in the local region of the BMS which may have regional-specific network protocols. The same gateway device 302 can operate in various regions with independent network protocols by swapping a detachable network adapter configured to operate in Region A with another detachable network adapter configured to operate in Region B. In some embodiments, the detachable network adapters are installed by a local installer or user. For example, the cellular adapter 1538 can be attached to communications interface 1516 by an installer of the BMS. Cellular adapter 1538 may be preconfigured to operate according to regional regulations and protocols that apply to the BMS. Cellular adapter 1538 can be included on a separate device that is configured to connect with communications interface 1516 and operate automatically. In some embodiments, one or more of the network adapters can be included as components of communications interface 1516. For example, referring specifically to FIG. 15B, Ethernet adapter 1542 can be a component of communications interface 1516.

In some embodiments, communications interface 1516 is connected to just a single network adapter. For example, communications interface 1516 can be connected to only Ethernet adapter 1542. In some embodiments, communications interface 1516 can be connected to a plurality of network adapters. For example, communications interface 1516 can include Ethernet adapter 1542 and Wi-Fi adapter 1540. In some embodiments, communications interface can include cellular adapter 1538, Wi-Fi adapter 1540, and Ethernet adapter 1542. It should be understood by those of ordinary skill in the art that any combination of network adapters may be used by gateway device 302. In some embodiments, gateway device 302 is connected to a plurality of network adapters, and a user, either via local UI 512 or cloud platform 324 can direct gateway device 302 to use a specific network adapter. Any network not selected may be disabled. In some embodiments, the Wi-Fi AP 688 may still operate to allow a user to connect directly to the gateway device despite Wi-Fi adapter 1540 being disabled. In some embodiments, a gateway device, such as gateway device 302, automatically chooses a network adapter to operate over. In some embodiments, there may be a pre-installed hierarchy. For example, gateway device 302 can be configured to operate over Ethernet, then Wi-Fi, then cellular in that order. Depending on which detachable network adapters are connected to communications interface 1516, gateway device can operate them in order of priority. In some embodiments, the hierarchy may be set by a user. Still in other embodiments gateway device 302 operates over a chosen network adapter and automatically switches to another network adapter when the connection provided by the chosen network adapter fails.

In some embodiments, gateway device 302 can communicate with via a communications interface, such as communications interface 1516 cloud platform 324 over Ethernet adapter 1542 while communicating with client devices 1504 via Wi-Fi adapter 1540 and/or cellular adapter 1538. In some embodiments, client devices 1504 connect to gateway device 302 via cloud platform 1524 as shown in FIGS. 15A and 15B. Still in other embodiments client devices 1504 connect to gateway device 302 directly through wireless connection 1546. For example, referring again to FIG. 6, clients devices can connect to gateway device 302 via Wi-Fi AP 688 while gateway device 302 is communicating to cloud platform 324 via a different network interface (e.g., Ethernet, cellular, etc.).

Figure 16:
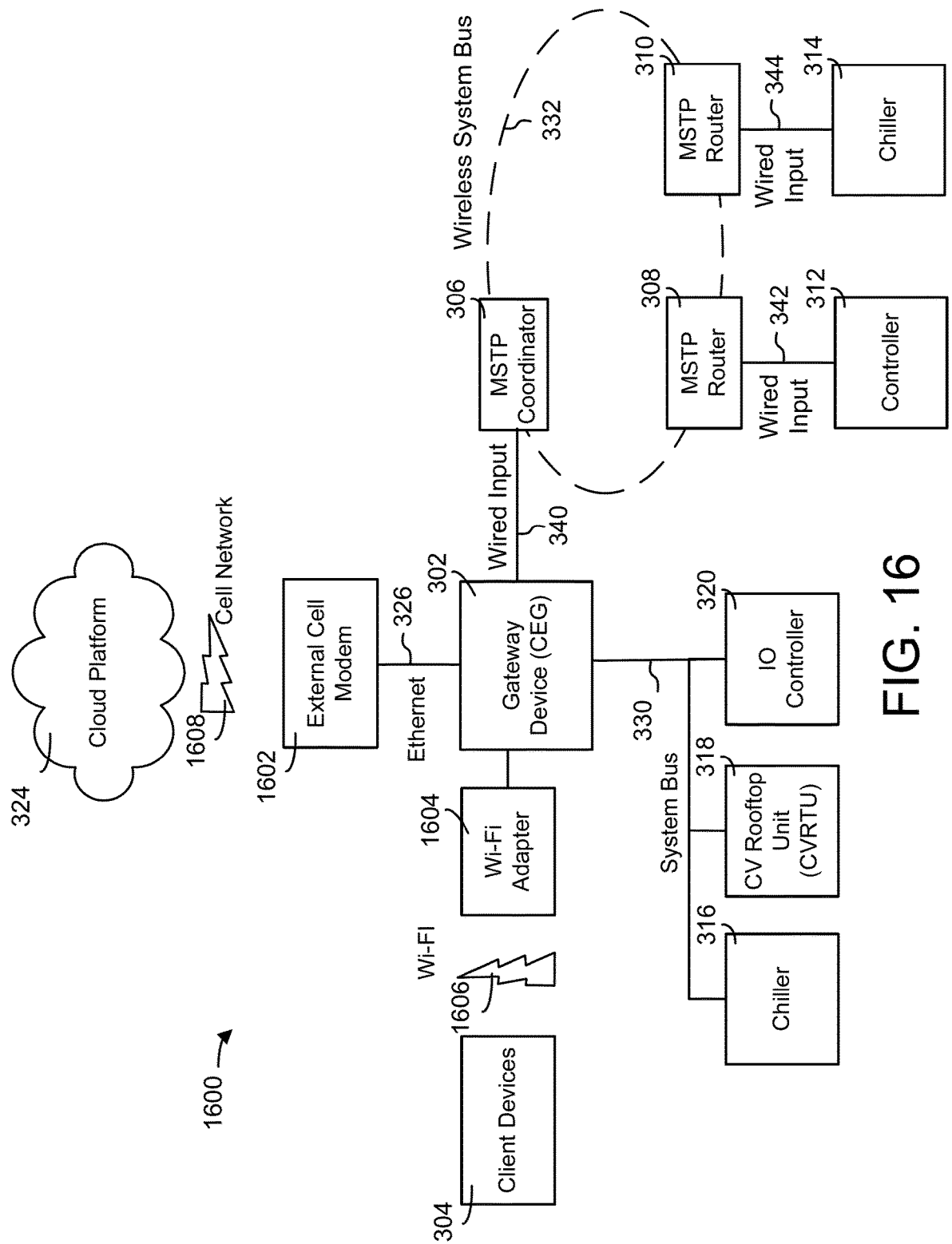
FIGS. 16-18 are block diagrams illustrating a BMS with a gateway device using detachable network adapters which can be used to monitor and control a building, according to some embodiments.

Referring now to FIG. 16, a block diagram of a BMS which can be used to monitor and control the building and HVAC system of FIGS. 1-2 is shown, according to an exemplary embodiment. BMS 1600 may include some or all of the features of BMS 300, as described with reference to FIGS. 3-7. For example, BMS 1600 is shown to include gateway device 302, cloud platform 324, Wi-Fi adapter 1604, system bus 330, wireless system bus 332 and building equipment connected via the system buses to gateway device 302. BMS 1600 illustrates an example BMS that uses Ethernet connection 326 to connect gateway device 302 to cloud platform 324. Gateway device 302 can communicate building data from the connected building equipment (e.g., chiller 314, chiller 316) to cloud platform 324 via Ethernet connection 326. In some embodiments, Ethernet connection 326 connects gateway device 302 to cloud platform 324 via an intermediate external cell modem 1602. Ethernet connection 326 can be configured by local UI 512.

Still referring to FIG. 16, client devices 304 may connect with gateway device 302 over Wi-Fi, using for example Wi-Fi adapter 1604, even while gateway device 302 is communicating with cloud platform 324 using Ethernet 326 may still connect to gateway device 302 via a Wi-Fi adapter 1604 and/or the Wi-Fi AP 688 shown in FIG. 6 as a component of communications interface 616. In some embodiments, BMS 1600 further include other network adapters connected to gateway device 302 (e.g., a detachable cellular adapter, etc.). In some embodiments, the network adapters are detachable network adapters than be swapped in and out by a user and/or installer to provide gateway device 302 with the ability to communicate over additional networks. In some embodiments, Wi-Fi adapter 1604 and and/or any other network adapters not being used to communicate building data to cloud platform 324 are disabled while Ethernet connection 326 is active. In some embodiments, Ethernet connection 326 connects directly to Ethernet/IP client 646. In some embodiments, Ethernet connection 326 connects to a detachable Ethernet adapter, shown as Ethernet 542 in FIG. 15A.

Figure 17:
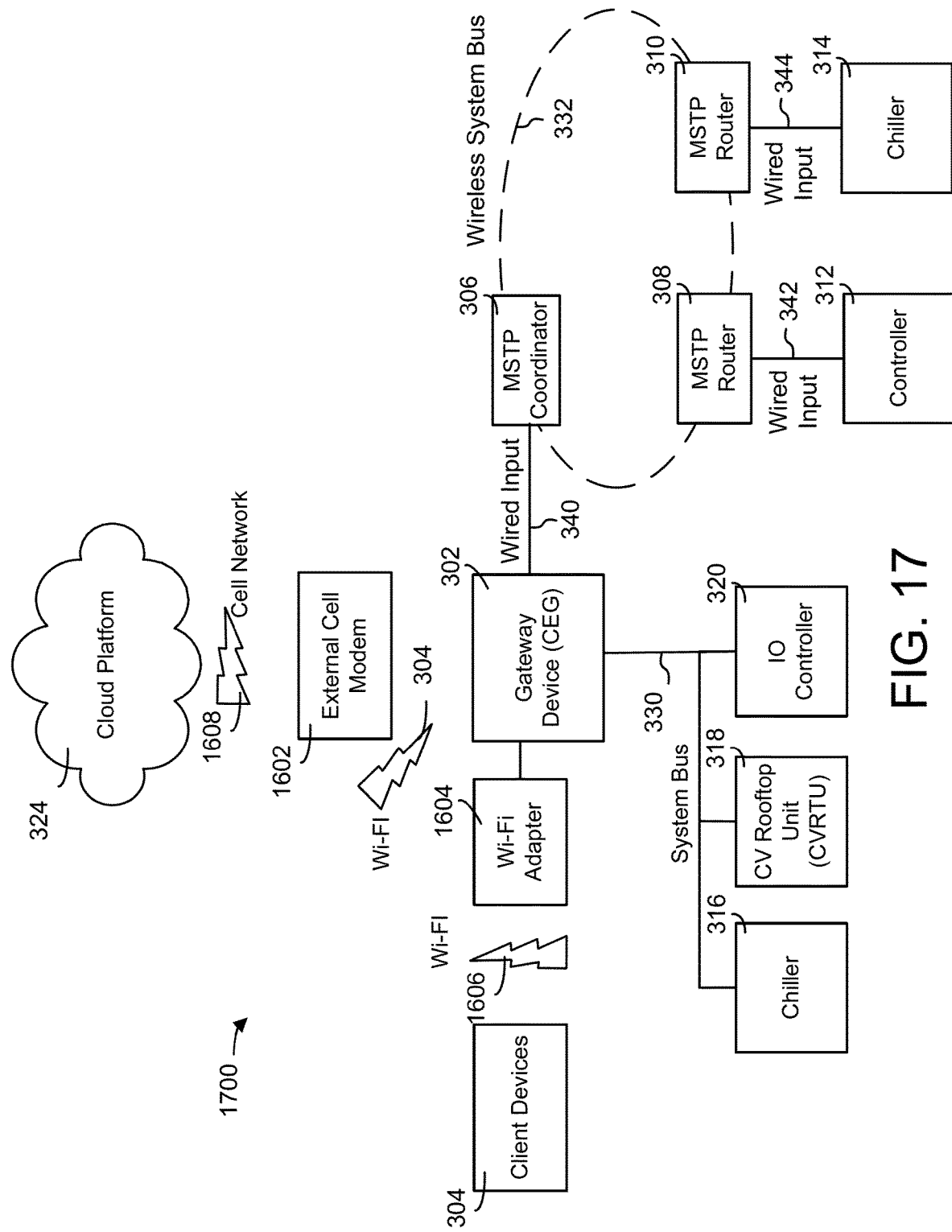

Referring now to FIG. 17, a block diagram of a BMS which can be used to monitor and control the building and HVAC system of FIGS. 1-2 is shown, according to an exemplary embodiment. BMS 1700 may include some or all of the features of BMS 300, as described with reference to FIGS. 3-7. For example, BMS 1700 is shown to include gateway device 302, cloud platform 324, Wi-Fi adapter 1604, system bus 330, wireless system bus 332, and building equipment connected via the system buses to gateway device 302. BMS 1700 illustrates an example BMS that uses Wi-Fi adapter 1604 to facilitate communication of building data from gateway device 302 to cloud platform 324. In some embodiments, Wi-Fi adapter 1604 is a detachable Wi-Fi adapter. For example, Wi-Fi adapter 1604 may be a USB Wi-Fi dongle configured to provide Wi-Fi connection to connected devices.

In some embodiments, Wi-Fi adapter 1604 is connected to external cell modem 1602. External cell modem 1602 can then connect to cloud platform 324 via cell network 1608. In some embodiments, multiple gateway devices of a BMS can connect to a single external cell modem 1602. Using Wi-Fi adapter 1604 and Wi-Fi client 690 (shown in FIG. 6), gateway device 302 can communicate to cloud platform 324 wirelessly via external cell modem 1602 and cell network 1608. In some embodiments, gateway device 302 can use Wi-Fi client 690 to communicate with cloud platform 324 while still allowing client devices 304 to communicate to gateway device 302 over Wi-Fi AP 688. In some embodiments, the Ethernet and cell adapter interfaces are disabled while the Wi-Fi interface is in use.

Figure 18:
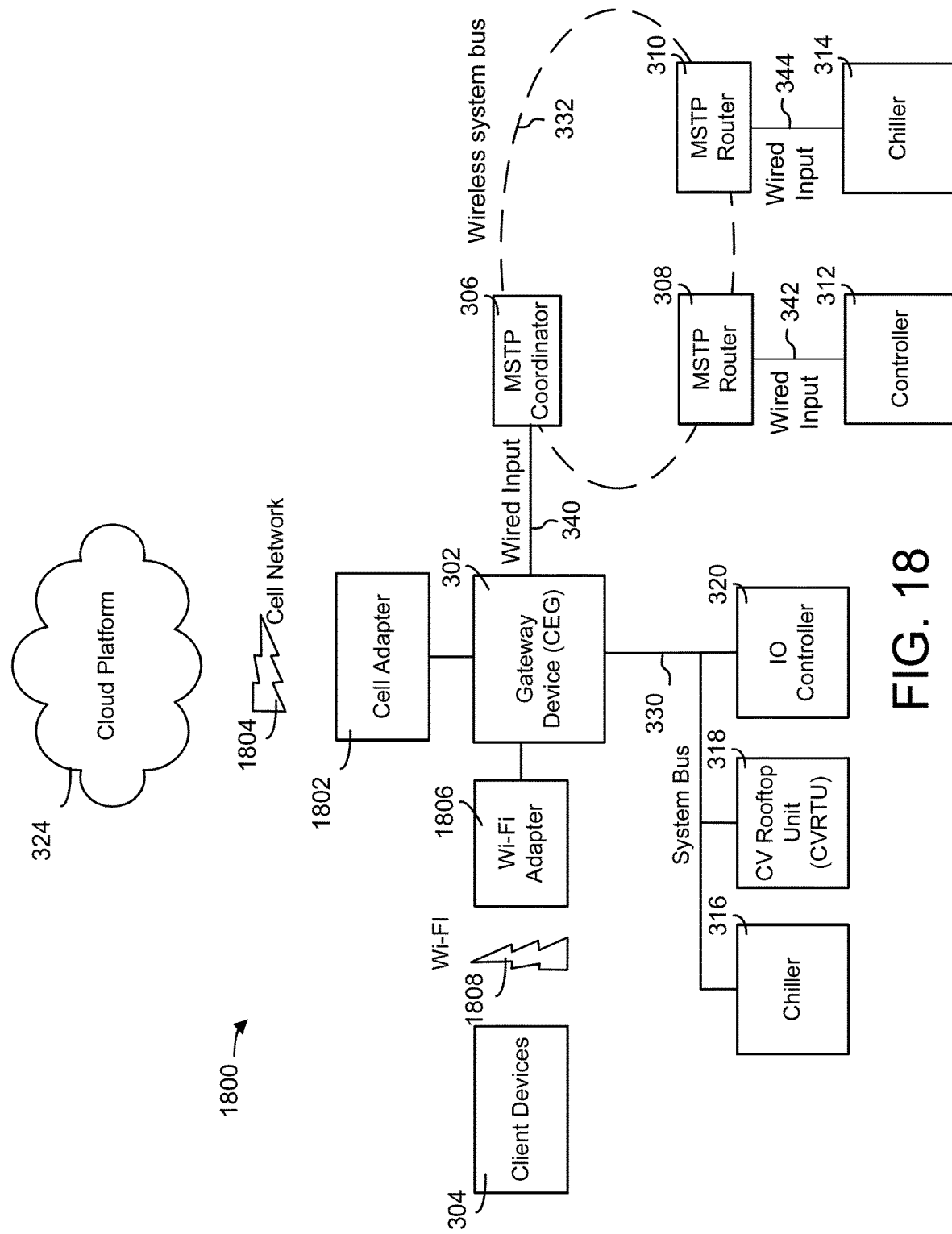

Referring now to FIG. 18, a block diagram of a BMS which can be used to monitor and control the building and HVAC system of FIGS. 1-2 is shown, according to an exemplary embodiment. BMS 1800 may include some or all of the features of BMS 300, as described with reference to FIGS. 3-7. For example, BMS 1800 is shown to include gateway device 302, cloud platform 324, Wi-Fi adapter 1604, cell adapter 1802, system bus 330, wireless system bus 332, and building equipment connected via the system buses to gateway device 302. BMS 1800 illustrates an example BMS that communicates building data directly from gateway device 302 to cloud platform 324 without intermediate external cell modem 1602. BMS 1800 is shown to include gateway device 302 connected to cell adapter 1802. Cell adapter 1802 can be a detachable cellular adapter such as a direct on-board cell modem USB dongle with a SIM card configured to provide cellular internet connectivity to cloud platform 324. In some embodiments, cellular adapter 1802 includes a remote antenna. Gateway device 302 can be configured to operate cellular adapter 1802 automatically. Cell adapter 1802 can be configured via local UI 512 of gateway device 302.

Figure 19:
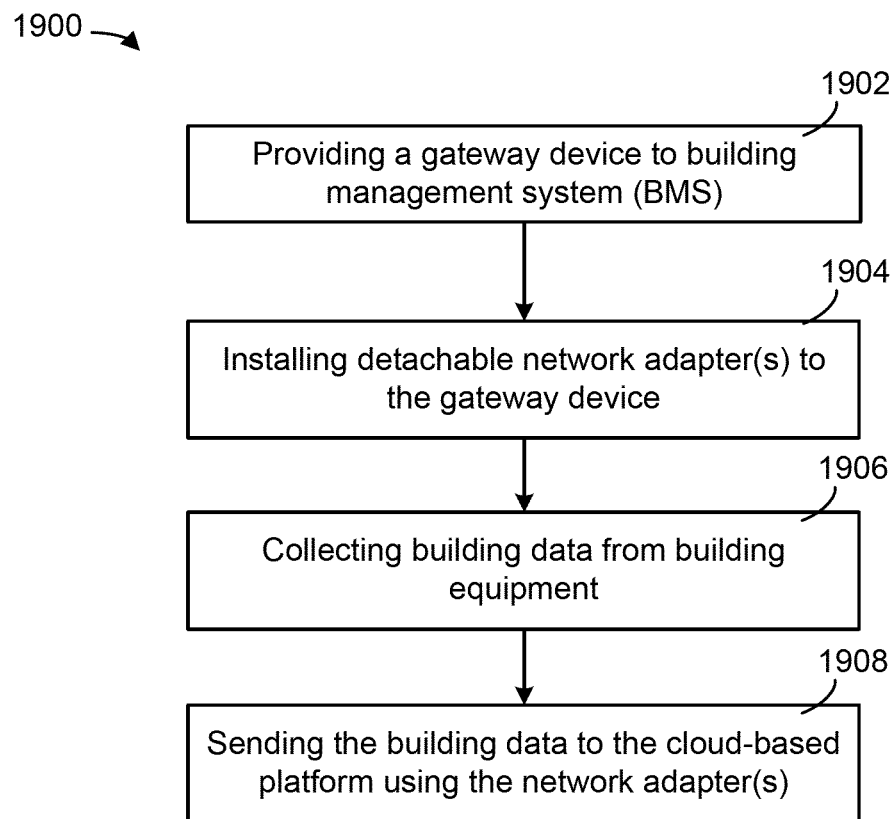
FIG. 19 is a flow diagram illustrating a technique for integrating detachable network adapters which can be performed by the BMS of FIGS. 16-18, according to some embodiments.

Referring now to FIG. 19, a flow chart illustrating process 1900 for operating gateway device 302 with detachable network adapters is shown, according to an exemplary embodiment. Process 1900 can be performed by one or more components of BMS 300. In some embodiments, process 1900 is performed by gateway device 302. Process 1900 is shown to include providing a gateway device to a BMS (step 1902). Multiple gateway devices may be provided to a single BMS. Each gateway device can be connected to distinct sets of building equipment. The gateway devices can connect to building equipment of the BMS over a wired or wireless MS/TP bus. Process 1900 is shown to include installing a detachable network adapter to gateway device 302 (step 1904). In some embodiments, multiple detachable network adapters may be connected to gateway device 302. The detachable network adapters may connect to gateway device 302 via USB. In some embodiments the detachable network adapters each connect gateway device 302 to various networks. For example, a detachable Wi-Fi adapter, a detachable cellular adapter, and a detachable Ethernet adapter may each individually or any combination thereof be connected to gateway device 302. In some embodiments, a single detachable network adapter may facilitate communication over a plurality of networks. The detachable network adapters may be provided by a local user and/or installer. The detachable network adapters may be pre-configured to operate according to the geographic region's network regulations. Accordingly, gateway device 302 can operate in various regions by being connected to various detachable network adapters without having to modify gateway device 302 itself. For example, Region A may operate over a 4G network while Region B may operate over a 5G network. The same gateway device may operate in either region by simply being connected to a detachable network adapter pre-configured for that region.

Process 1900 is shown to include collecting building data from building equipment (step 1906). The building data may include equipment models, BACnet value objects, BACnet point objects, view definitions, COV data, and/or any other data available from building equipment. The gateway device may collect the data over a wired and/or wireless system bus. The system bus may be an MS/TP system bus using the BACnet MS/TP protocol.

Process 1900 is shown to include sending the building data to a cloud-based platform using the attached network adapter(s) (step 1908). Gateway device 302 may stream the collected data to cloud platform 324. In some embodiments, gateway device 302 stores the collected data in a local buffer and sends it periodically. In some embodiments with multiple network adapters attached to gateway device 302, gateway device 302 may send the building data over a single network selected by a user. For example, a user may select a network to use via local UI 512. In some embodiments, the user may select the appropriate network via cloud platform 324.

Data Access Layer

Referring again to FIG. 5, components included in memory 510 may include local UI 512, cloud client 514, capability provider (CP) 518, data access layer 520, and OS 524. Local UI 512 may allow a user to control building equipment connected to gateway device 302. In some embodiments, local UI 512 may generate a web interface (e.g., a webpage) for displaying building data (e.g., equipment model templates, view definitions, data control templates, etc.) to a user. An example of an interactive web interface that can be generated by local UI 512 based on a stored view definition and/or equipment list is described in detail in U.S. patent application Ser. No. 15/146,660 titled "HVAC Equipment Providing a Dynamic Web Interface systems and Methods" and filed May 4, 2016, the entire disclosure of which is incorporated by reference herein. CP 518 may be an application configured to facilitate communication between local UI 512 and cloud client 414 with data access layer 520.

Still referring to FIG. 5, gateway device 302 is shown to include a data access layer 520. In some embodiments, data access layer 520 is comprised of various objects shown in FIG. 6 (e.g., data model 630, point mappers 634, equipment mappers 636, protocol engine 642, etc.). Referring again to FIG. 5, data access layer 520 can be configured to perform the equipment detection and data gathering operations described above. Data access layer 520 can be configured to identify building equipment (e.g., chiller 314, chiller 316, CV TRU 318) in BMS 300 and generate or obtain equipment models for the building equipment. For example, data access layer 520 can discover and collect data from MS/TP coordinator 306 (and associated building devices on wireless system bus 332), CV RTU 318, IO module 320, and thermostat controller 334. Data access layer 520 can also discover data points provided by the building equipment and obtain values for the data points (e.g., building data) from the equipment.

In some embodiments, data access layer 520 can sign up or subscribe to a change in value (COV) of the change counter attribute of active node table 528. In some embodiments, active node table 528 is a part of data access layer 520. When a change to active node table 528 occurs, system bus datalink 526 can provide a COV notification to data access layer 520. In response to receiving the COV notification, data access layer 520 can read active node table 528. Data access layer 520 can use the information from active node table 528 to identify building equipment connected to gateway 302 and generate a list of identified devices (e.g., equipment list). The equipment list can be stored in data access layer 520 and/or provided to cloud client 514 to be pushed to cloud platform 324.

In some embodiments, gateway device 302 can collect and send COV data to cloud platform 324. Throughout this disclosure COV data may also be referred to as "telemetry data." Data access layer 520 can receive from cloud platform 324 a subscription list for the building equipment identified in the equipment list. The subscription list may be included as part of a device twin generated by cloud platform 324. The device twin is explained in further detail below with reference to FIG. 10. The subscription list may include a list of bound properties (e.g., value objects, point objects, etc.) for building equipment in BMS 300 that the cloud platform 324 requests data for. Data access layer 520 may sign up or subscribe to a COV in the subscription list. An example of a subscription list may be found in Appendix A, incorporated here by reference. When a change to bound property occurs, a COV notification can be provided to data access layer 520. In response to receiving the COV notification, data access layer 520 can read the bound property and post a sample of the bound property to cloud platform 324.

In some embodiments, data access layer 520 can provide the collected data to capability provider 518 for use in presenting the data to a user (e.g., via local UI 512) or pushing the data to cloud platform 324 (e.g., via cloud client 514). Capability provider 518 can be configured to function as a feature server for gateway device 302. Capability provider 518 can be connected to data access layer 520, cloud client 514, and local UI 512 and can process the inputs and outputs of gateway device 302 (e.g., both device- and user-oriented). Capability provider 518 can interact with cloud platform 324 to serve various features of cloud platform 324 to gateway device 302. Features of cloud platform 324 served by capability provider 518 can include, for example, time series, alarms, schedules, write property, data model, system settings, and software update. Other features of cloud platform 324 served by capability provider 518 may include interlock, data share, audit, and fault detection and diagnostics (FDD). The features and functionality of cloud platform 324 are described in greater detail below. Several of these features are described further in U.S. patent application Ser. No. 16/844,328 filed on Apr. 9, 2020 the entire disclosure of which has been incorporated by reference herein.

Still referring to FIG. 5, data access layer 520 may receive a request for a view definition from local UI 512. The view definition may identify a set of attributes for a particular device that are core to the functionality of the device. Each device or type of device in BMS 300 may have a different view definition. For example, the view definition for a chiller controller may identify the chiller outlet temperature as an important data point; however, the view definition for a valve controller may not identify such a data point as important to the operation of the valve. In some embodiments, the view definition for a device identifies a subset of the data objects defined by the equipment model for the device. Local UI 512 may use the view definition to dynamically select a subset of the stored data objects for inclusion in a web interface (e.g., a webpage) generated by local UI 512.

In some embodiments, view definitions for all the devices in BMS 300 are stored within gateway device 302. In other embodiments, view definitions can be stored in the devices themselves (e.g., within thermostat controllers, RTUs, etc.). In some embodiments, view definitions are stored in cloud platform 324. In some embodiments, the view definition for a device is a component of the device's equipment model and is provided to gateway device 302 by connected devices along with the equipment models. For example, devices connected to system bus 330 and/or wireless system bus 332 can provide their own view definitions to gateway device 302.

If a device does not provide its own view definition, gateway device 302 can create or store view definitions for the device. If the view definition provided by a particular device is different from an existing view definition for the device stored in gateway device 302, the gateway device's view definition may override or supersede the view definition provided by the device. In some embodiments, the view definition for a device includes the device's user name and description. Accordingly, the web interface generated by local UI 512 can include the device's user name and description when the web interface is generated according to the view definition.

Equipment Model Generation

Figure 7:
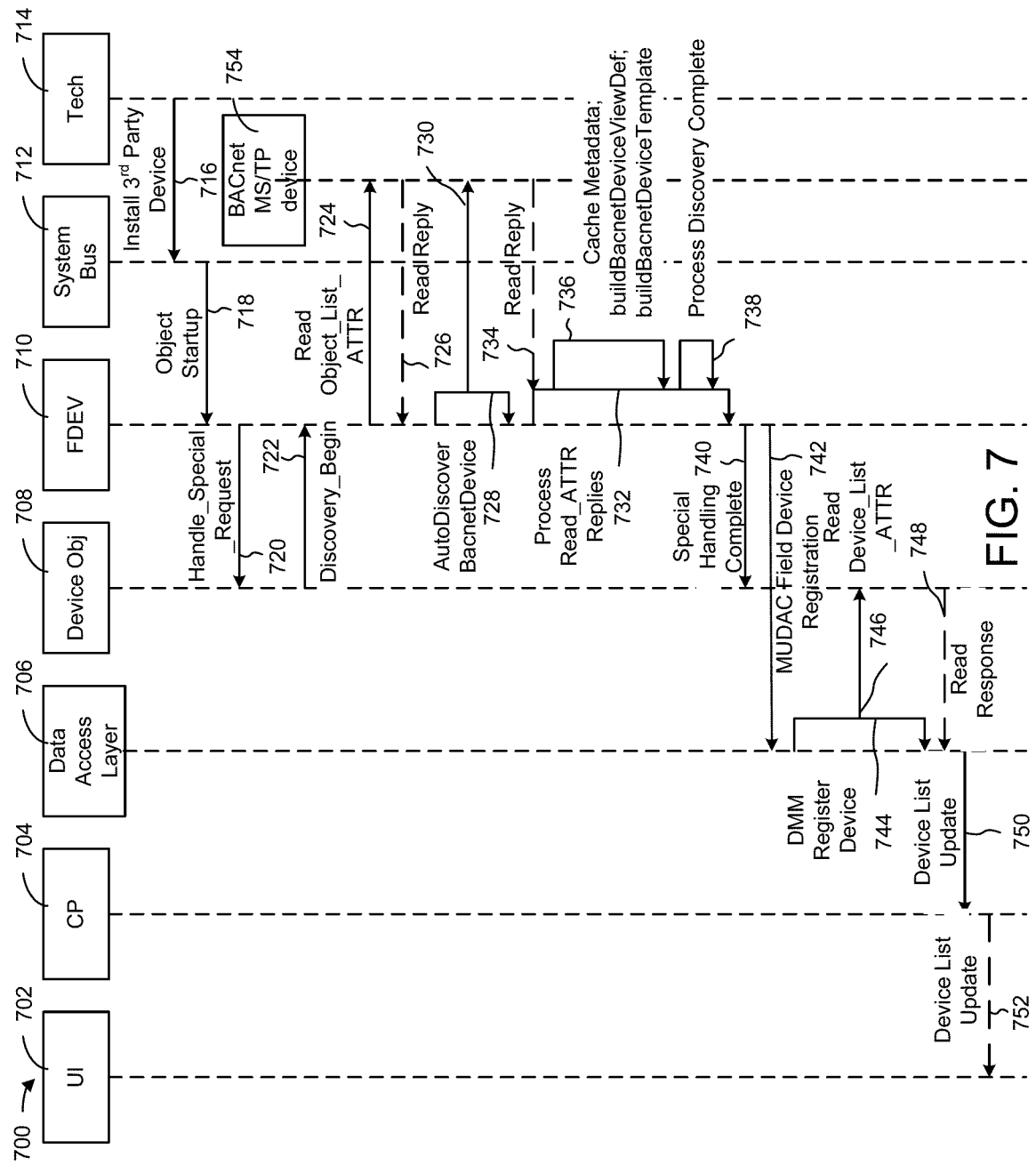
FIG. 7 is a sequence diagram illustrating a process for automatically discovering and generating equipment templates for equipment in a building management system, according to some embodiments.

Referring now to FIG. 7, a sequence diagram illustrating a process 700 for automatically discovering and interacting with equipment in a building management system that does not have a pre-existing equipment model, according to an exemplary embodiment. Gateway device 302 of BMS 300 can automatically discover new equipment connected via system bus datalink 526 to system bus 330 and/or wireless system bus 332 as discussed above with reference to data access layer 520. Advantageously, the equipment discovery can occur automatically (e.g., without user action) and without requiring the equipment to be placed in discovery mode or sending a discovery command to the equipment. An equipment model can be composed of equipment template and a view definition associated with a given MS/TP device. Some devices lack pre-installed equipment models, and process 700 can generate equipment models for the gateway device 302 to operate the devices with. Process 700 can be performed by one or more components of BMS 300 to automatically discover building equipment on system bus 330 and wireless system bus 332. For example, process 700 can be performed by various components of gateway device 302 (e.g., user interface (UI) 702, capability provider (CP) 704, a data access layer 706, device object 708, FDEV 710, system bus 712, BACnet MS/TP device 754) and/or parts of the total BMS 300 system such as tech 714.

Process 700 is shown to include tech 714 installing a BACnet MS/TP device on the system bus 712 (step 716). The BACnet MS/TP device 754 may be a third-party controller, third-party RTU controller and/or any other BACnet device that does not have an equipment model for gateway device 302 to download. The BACnet MS/TP device 754 may be an MS/TP master device. System bus 712 can be a wired MS/TP bus such as system bus 330 and/or wireless such as wireless system bus 332. System bus 712 connects to gateway device 302 and allows gateway device 302 to communicate and/or control building equipment connected to system bus 712. System bus 712 can send an object startup message to FDEV 710 (step 718). FDEV 710 may be a part of data access layer 520 of gateway device 302. FDEV 710 can then communicate with device object 708 to "handle_special_request" (step 720) and device object 708 can send a message to initiate discovery back to FDEV 710 (step 722). In some embodiments, process 700 may also include polling a connected MS/TP coordinator such as MS/TP coordinator 306 to identify new MS/TP devices on a wireless MS/TP bus when one is used. FDEV 710 can then read the object list of BACnet MS/TP device 754. The object list may include the list of all BACnet exposed objects (e.g., value objects, point objects, etc.) BACnet MS/TP device 754 chooses to make available. The objects may include Analog Inputs, Analog Outputs, Analog Values, Binary Inputs, Binary Outputs, Binary Values, Multi-State Inputs, Multi-State Outputs, and Multi-State Values. For some devices such as JCI BACnet equipment, FDEV 710 may read the object list by sending a "GET DEVICE TREE" command to BACnet MS/TP device 754 instead, and receive an object list composed of additional objects not made available using the read command. FDEV 710 then accepts the object list from BACnet MS/TP device 754 (step 726).

Process 700 is shown to include FDEV 710 automatically discovering BACnet device(s) using the object list passed to it (step 728). This process can include reading the metadata for the objects from BACnet MS/TP device 754 (step 730). FDEV 710 can read the "object_list_ATTR" reply from BACnet MS/TP device 754 (step 732) and cache the metadata, build a BACnet device view definition, and build a BACnet equipment model template (step 936) based on the BACnet objects exposed by the BACnet MS/TP device 754. The view definition may be automatically generated using the object list of BACnet MS/TP device 754. The BACnet template can be populated with metadata from the BACnet device, or with pre-defined values based on the data type. The creation of a BACnet view definition and equipment model template is explained further below with reference to FIG. C.

FDEV 710 then ensures the read process 732 is complete (step 738) and informs device object 708 accordingly (step 740). Device object 708 can then send to data access layer 706 a field device registration (step 742). data access layer 706 can register the device in the data model manager (DMM) (step 744) which may involve reading the "Device_list_ATTR" from device object 708 (step 746) and receiving a response (step 748). This process is explained in further detail below with reference to FIG. C. The device list may contain all devices from system bus 712, be they connected over a wired or wireless MS/TP bus, that have been mapped to the system. Data access layer 706 can then send an updated device list to CP 704 (step 750) which can pass it to UI 702 (step 752).

Equipment Model Discovery

Figure 8:
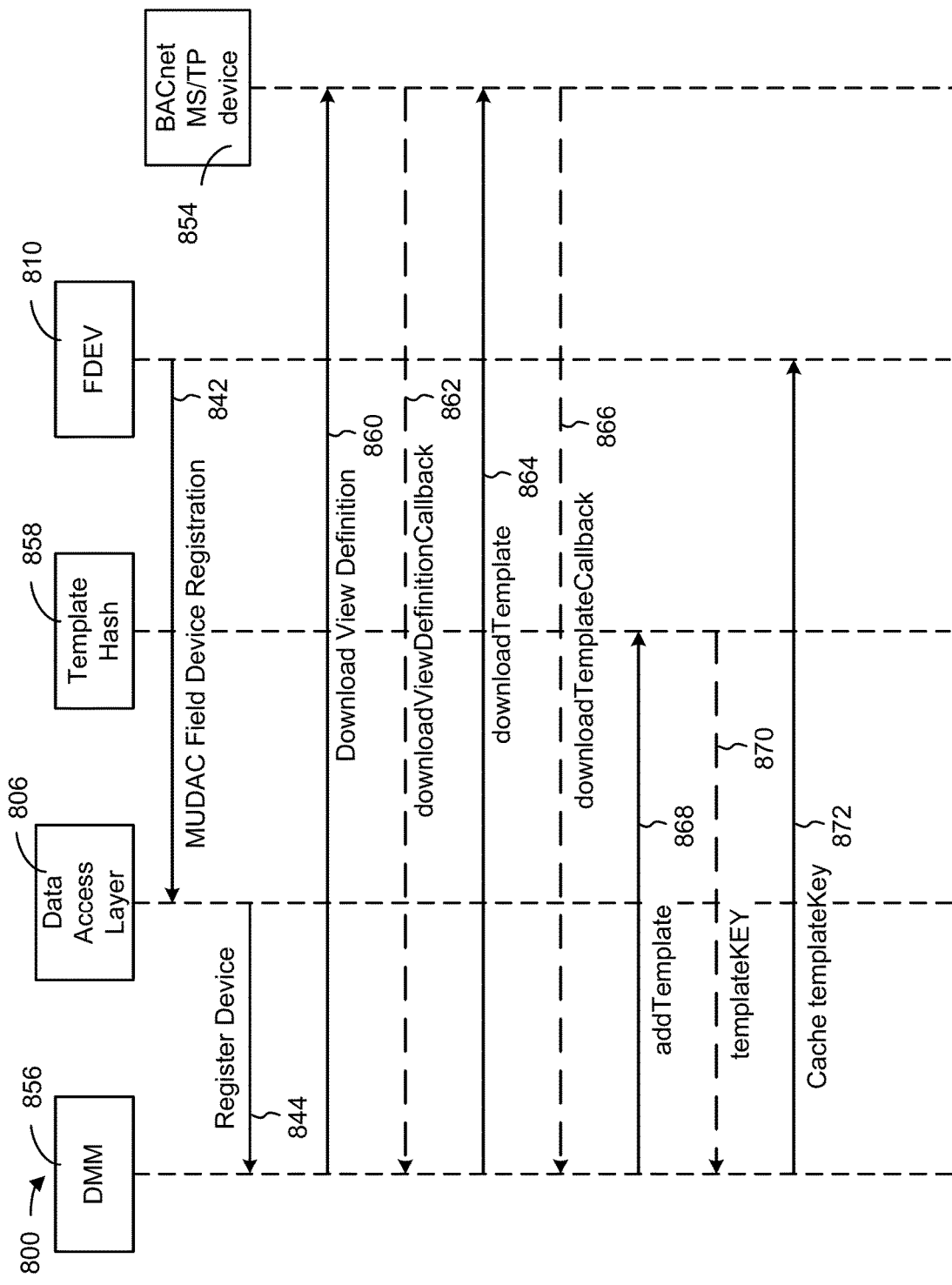
FIG. 8 is a sequence diagram illustrating a process for automatically discovering and interacting with equipment in a building management system, according to some embodiments.

Referring now to FIG. 8, a sequence diagram illustrating process 800 for providing a view definitions and equipment templates from a BACnet device to a gateway device is shown, according to an exemplary embodiment. Process 800 can be performed by one or more components of BMS 300. For example, process 800 can be performed by various components of gateway device 302 (e.g., data module manager (DMM) 856, data access layer 806, template hash 858, FDEV 810, etc.) and BACnet MS/TP device 854. In some embodiments, process 800 is an alternative to process 700. Process 700 is shown to include components of gateway device 302 collecting creating view definitions and equipment model templates for building equipment (e.g., BACnet devices) without pre-existing ones and storing them and/or sending them to cloud platform 1000. In some embodiments, process 800 is an equivalent process for BACnet devices that have pre-existing view definitions and equipment model templates, such as SMART equipment devices manufactured by JCI.

Similar to process 700, process 800 may involve FDEV 810 sending a field device registration message to data access layer 806 (step 842), and further includes data access layer 806 registering the device to DMM 856 (step 844). Process 800 is shown to include DMM 856 requesting to download a view definition from BACnet MS/TP device 854. BACnet MS/TP device 854 can send the view definition to DMM 856 (step 862). DMM 856 is shown to then request to download the equipment model template from BACnet MS/TP device 854 (step 864) and BACnet MS/TP device 854 can respond by sending its pre-configured equipment model template (step 866). Each equipment model template may define a set of properties associated with a given device, and can be populated with metadata that is read from BACnet MS/TP device 854. An example equipment model template can be found in Appendix B, incorporated here by reference. In some embodiments, the components of gateway device 302 performing process 800 may upload the received view definitions and equipment templates to the cloud, such as cloud platform 324. Cloud platform 324 may itself use the templates to fetch the metadata to fill the equipment model template.

DMM 856 can then add the template to template hash 858 (step 868), which can return a templateKEY to DMM 856 (step 870). The template key can then be cached in FDEV 810 (step 872), to be used to recall the equipment model template when needed.

Equipment Model Processes

Figure 13:
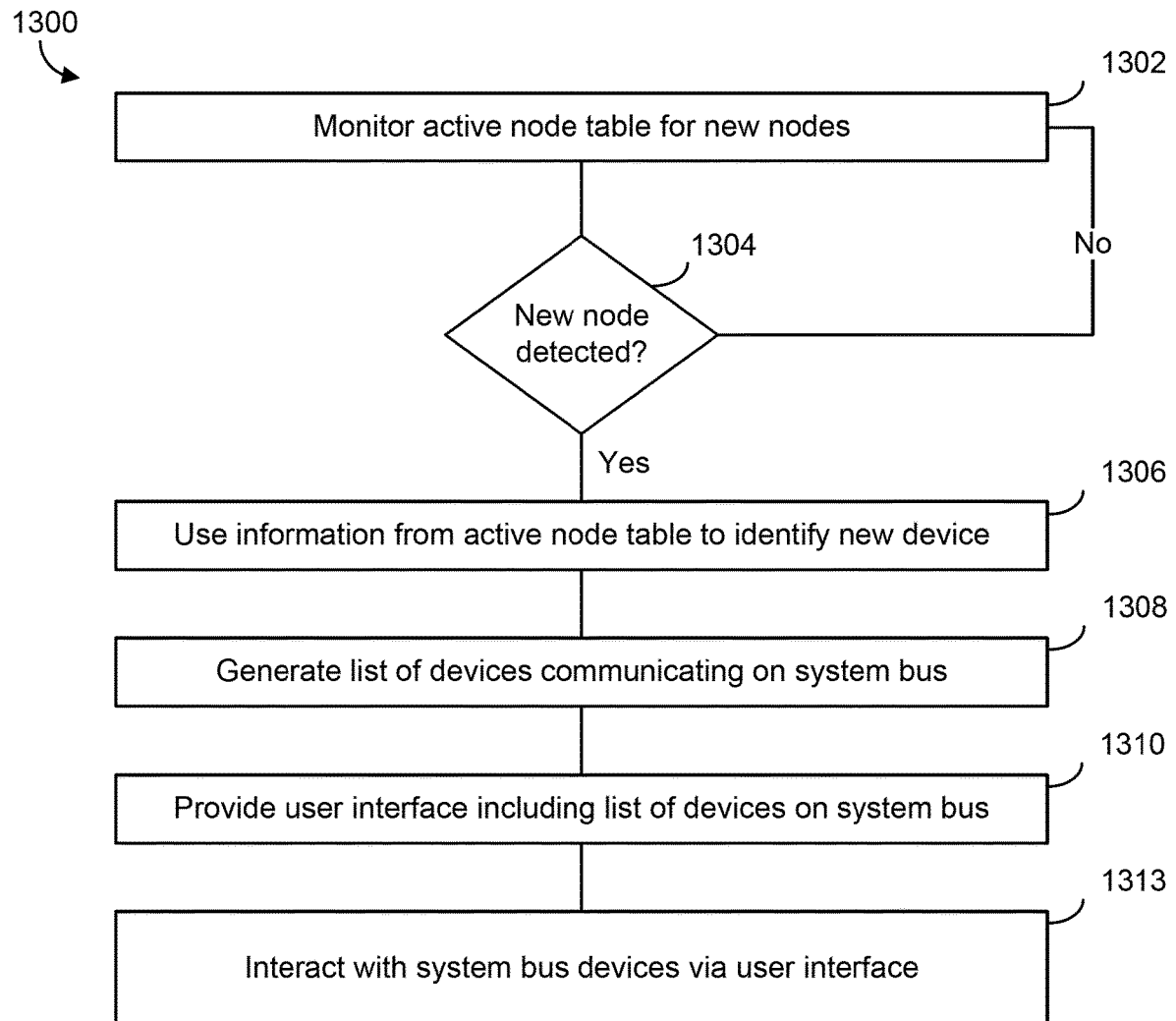
FIG. 13 is a flow diagram illustrating a technique which can be used by the BMS of FIGS. 3-4 to automatically discover and interact with BMS equipment, according to some embodiments.

Referring now to FIG. 13, a flowchart of a process 1300 for automatically discovering and interacting with equipment in a building management system is shown, according to an exemplary embodiment. Process 1300 can be performed by one or more components of BMS 300. In some embodiments, process 1300 is be performed by gateway device 302. Process 1300 can be used to automatically discover devices communicating on system bus 330 and/or wireless system bus 332. Once the devices have been discovered, process 1300 can be used to generate a user interface (e.g., a web interface) which provides information about the devices and allows a user to monitor and control the devices.

Process 1300 is shown to include monitoring an active node table for new nodes (step 1302). In some embodiments, step 1302 is performed by gateway device 302. For example, gateway device 302 can monitor active node table 528 for new nodes. Each node in active node table 528 can represent a device communicating on system bus 330. In some embodiments, gateway device 302 monitors active node table 528 for new nodes by subscribing to a change of value (COV) of a change counter attribute for active node table 528. Each time a change to active node table 528 occurs (e.g., a new device begins communicating on system bus 330), the change counter attribute can be incremented by wired system bus datalink 526. When the change counter attribute is incremented, wired system bus datalink 526 can report the COV to data access layer 520.

Still referring to FIG. 13, process 1300 is shown to include determining whether a new node is detected (step 1304). In some embodiments, step 1304 is performed by gateway device 302. For example, data access layer 520 of gateway device 302 can read active node table 528 in response to receiving a COV notification indicating that active node table 528 has been updated. Data access layer 520 can compare the data from active node table 528 to a previous (e.g., cached) version of active node table 528 to determine whether any new nodes have been added. If a new node has been added to active node table 528, data access layer 520 can determine that a new node is detected (i.e., the result of step 1304 is "yes") and process 1300 can proceed to step 1306. If a new node has not been added, process 1300 can return to step 1302.

Still referring to FIG. 13, process 1300 is shown to include using information from the active node table to identify the new device (step 1306). In some embodiments, step 1306 is performed by gateway device 302. For example, gateway device 302 can use address information (e.g., MAC addresses, network addresses, etc.) from active node table 528 to send a request for information to a new MS/TP bus device. The request can include a request for an equipment model stored within the new MS/TP bus device and/or a request for point values provided by the new MS/TP bus device (e.g., a get device tree request). In response to the request, the new MS/TP bus device may provide information that can be used to identify the device (e.g., device type, model number, types of data points, etc.). Gateway device 302 can identify the new MS/TP bus device based on such information.

Still referring to FIG. 13, process 1300 is shown to include generating a list of devices communicating on the system bus (step 1308). The system bus may include system bus 330 and/or wireless system bus 332. Step 1308 can be performed by data access layer 520 using information obtained from active node table 528 and/or information received from identified system bus devices.

Process 1300 is shown to include providing a user interface including the equipment list (step 1310). In some embodiments, step 1310 is performed by cloud platform 324. In some embodiments, step 1310 is performed by local UI 512 of gateway device 302. In some embodiments, local UI 512 uses a view definition for each device in the device list to determine which attributes of the devices to include in the web interface. In some embodiments, local UI 512 generates a home page for each type of equipment based on a home page view definition for the equipment type. The home page view definition can be stored in gateway device 302 (e.g., in view definition storage). Other view definitions can be stored in gateway device 302 or received from other devices at runtime.

Process 1300 is shown to include interacting with the system bus devices via the user interface (step 1312). Step 1312 can include accessing the equipment models for the system bus devices to obtain data values for display in the user interface. In some embodiments, step 1312 includes receiving input from a user via the user interface. The user input can change an attribute of a device (e.g., device name, setpoint, device type, etc.) presented in the user interface. Gateway device 302 can use the updated value of the device attribute to update the value in the equipment model for the device and/or to provide a control signal to the device.

Figure 14:
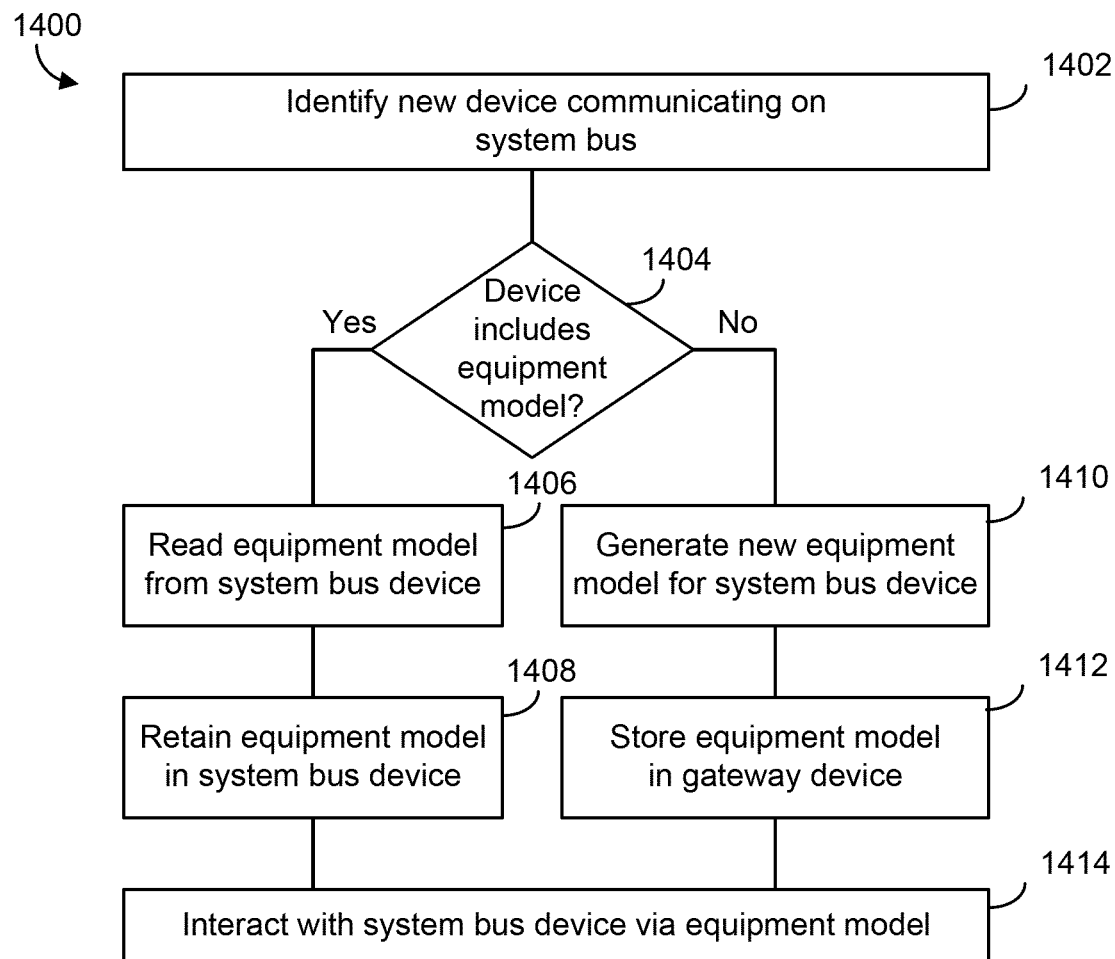
FIG. 14 is a flow diagram illustrating a technique which can be used by the BMS of FIGS. 3-4 to create and use equipment models for system bus devices, according to some embodiments.

Referring now to FIG. 14, a flowchart of a process 1400 for automatically creating and using equipment models for system bus devices (e.g., devices connected to wired system bus 330 devices and/or wireless system bus 332) is shown, according to an exemplary embodiment. Process 1400 can be performed by one or more components of gateway device 302, as described with reference to FIGS. 3-5. In some embodiments, process 1400 is performed by gateway device 302 when new building equipment is detected on system bus 330 and/or wireless system bus 332.

Process 1400 is shown to include identifying a new device communicating on the system bus (step 1402). Step 1402 can include using address information (e.g., MAC addresses, network addresses, etc.) from active node table 528 to send a request for information to a new system bus device. The request can include a request for an equipment model stored within the new system bus device and/or a request for point values provided by the new system bus device (e.g., a get equipment list request). In response to the request, the new system bus device may provide information that can be used to identify the device (e.g., device type, model number, types of data points, etc.). Gateway device 302 can identify the new system bus device based on such information.

Process 1400 is shown to include determining whether the new system bus device includes an equipment model (step 1404). Some devices in BMS 300 present themselves to gateway device 302 using equipment models. An equipment model can define equipment object attributes, view definitions, schedules, trends, and the associated BACnet value objects that may also compose an equipment model template (e.g., analog value, binary value, multistate value, etc.) that are used for integration with other systems. Some system bus devices store their own equipment models (e.g., CV RTU 218, thermostat controller 334). Other devices in BMS 300 do not store their own equipment models (e.g., IO controller 320, third party controller 322, etc.). Step 1404 can include sending a request for an equipment model to the new system bus device or reading a list of point values provided by the new system bus device. If the new system bus device includes an equipment model, the system bus device may present an equipment model to gateway device 302 in response to the request.

If the system bus device includes an equipment model (i.e., the result of step 1404 is "yes"), gateway device 302 can read the equipment model from the system bus device (step 1406). Since the equipment model is already stored within the system bus device, the equipment model can be retained within the system bus device (step 1408). However, if the system bus device does not include an equipment model (i.e., the result of step 1404 is "no"), gateway device 302 can automatically generate a new equipment model for the system bus device (step 1410). In some embodiments, gateway device 302 retrieves a list of point values (e.g., BACnet objects) provided by the device and uses the list of point values to create a new equipment model for the device. The new equipment model can be stored within gateway device 302 (step 1412).

Process 1400 is shown to include interacting with the system bus device via the equipment model (step 1414). Step 1414 can include reading data values from the equipment model and writing data values to the equipment model. If the equipment model is stored in the system bus device, step 1414 can include interacting directly with the system bus device. However, if the equipment model is stored in gateway device 302, step 1414 can include interacting with gateway device 302. Gateway device 302 can then interact with the system bus device. Gateway device 302 can provide a user interface for any system bus device using the equipment models stored within the wired system bus devices and/or the equipment models created by gateway device 302. In some embodiments, gateway device 302 stores a view definition for each type of equipment connected via system bus 330 and uses the stored view definition to generate a user interface for the equipment.

Cloud Client

Referring again to FIG. 5, gateway device 302 is shown to include cloud client 514. Cloud client 514 can be configured to interact with both capability provider 518 and local UI 512. Cloud client 514 serves as the bridge between gateway device 302 and cloud platform 324. Data passed to cloud client 514 may then be communicated to cloud platform 324 via communications interface 516. Communications interface 516 may communicate with cloud platform 324 over an internet connection (e.g., BACnet IP, Ethernet, wired or wireless connection, etc.). Cloud client 514 and communications interface 516 can communicate to cloud platform 324 over HTTPS and/or MQTT protocol. Cloud client 514 can translate gateway device concepts (e.g., Verasys concepts, Metasys concepts) into cloud concepts to allow gateway device 302 to communicate with cloud platform 324. Cloud client 514 can also translate cloud concepts into gateway device concepts to allow data from cloud platform 324 to be received and processed by gateway device 302.

Figure 9:
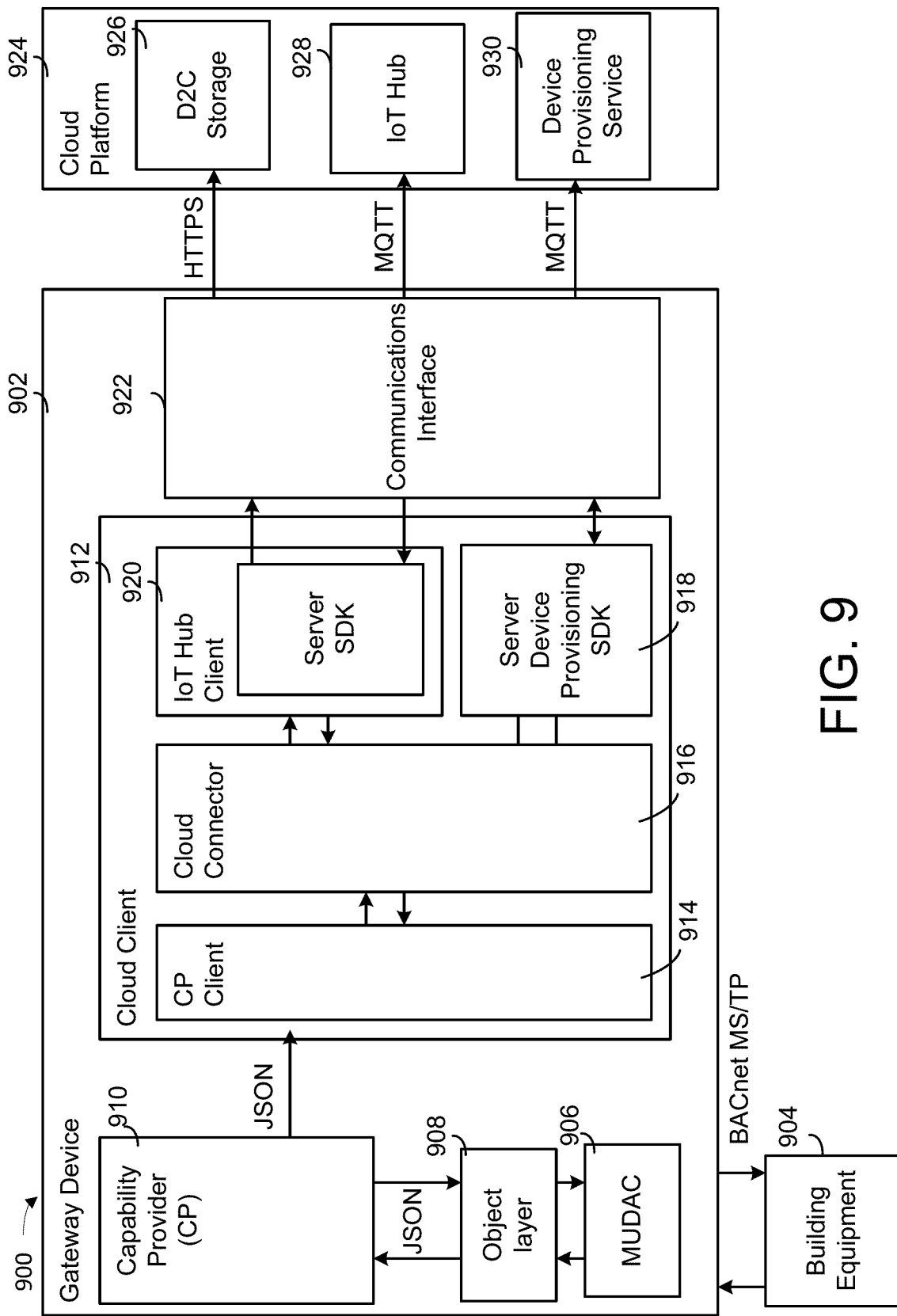
FIG. 9 is a block diagram of a cloud client which can be used with a gateway device of a BMS, according to some embodiments.

Referring now to FIG. 9, a block diagram illustrating cloud client 514 in further detail is shown, according to an exemplary embodiment. BMS 900 is shown to include building equipment 904 (e.g., chiller, CV RTU, thermostat controller, third-party controller, and/or any other BACnet MS/TP device), gateway device 902, and cloud platform 924. Building equipment 904 can send building data (e.g., equipment models, value objects, point values, and/or any other data/points exposed by the building equipment) to gateway device 302 via a BACnet MS/TP protocol. Gateway device 302 may pass the data in MUDAC 906, object layer 908 and capability provider 910. In some embodiments, MUDAC 906 and object layer 908 are the same object. The building data then pass to cloud client 912.

Cloud client 912 can be configured to interact with cloud platform 924. In some embodiments, cloud client 912 includes a feature server client, shown as CP client 914, a cloud connector 916, a server device provisioning software development kit (SDK) 918, and a library that encapsulates an internet-of-things (IoT) hub SDK with a data platform wrapper, shown as IoT hub client 920. Cloud connector 916 can be configured to interact with both capability provider 910 via CP client 914 and IoT hub client 920. Cloud connector 916 can translate gateway device concepts (e.g., Verasys concepts) into cloud concepts to allow gateway device 302 to communicate with cloud platform 924. Cloud connector 916 can also translate cloud concepts into gateway device concepts to allow data from cloud platform 924 to be received and processed by gateway device 302. Cloud client 912 can be configured to understand the endpoints, APIs, and other services provided by cloud platform 324 and can be configured to communicate with cloud platform 324. In some embodiments, cloud client 912 is configured to exchange messages with cloud platform 324 via communications interface 922 using the native messaging format of cloud platform 324 (e.g., JSON).

Cloud Platform

Figure 10:
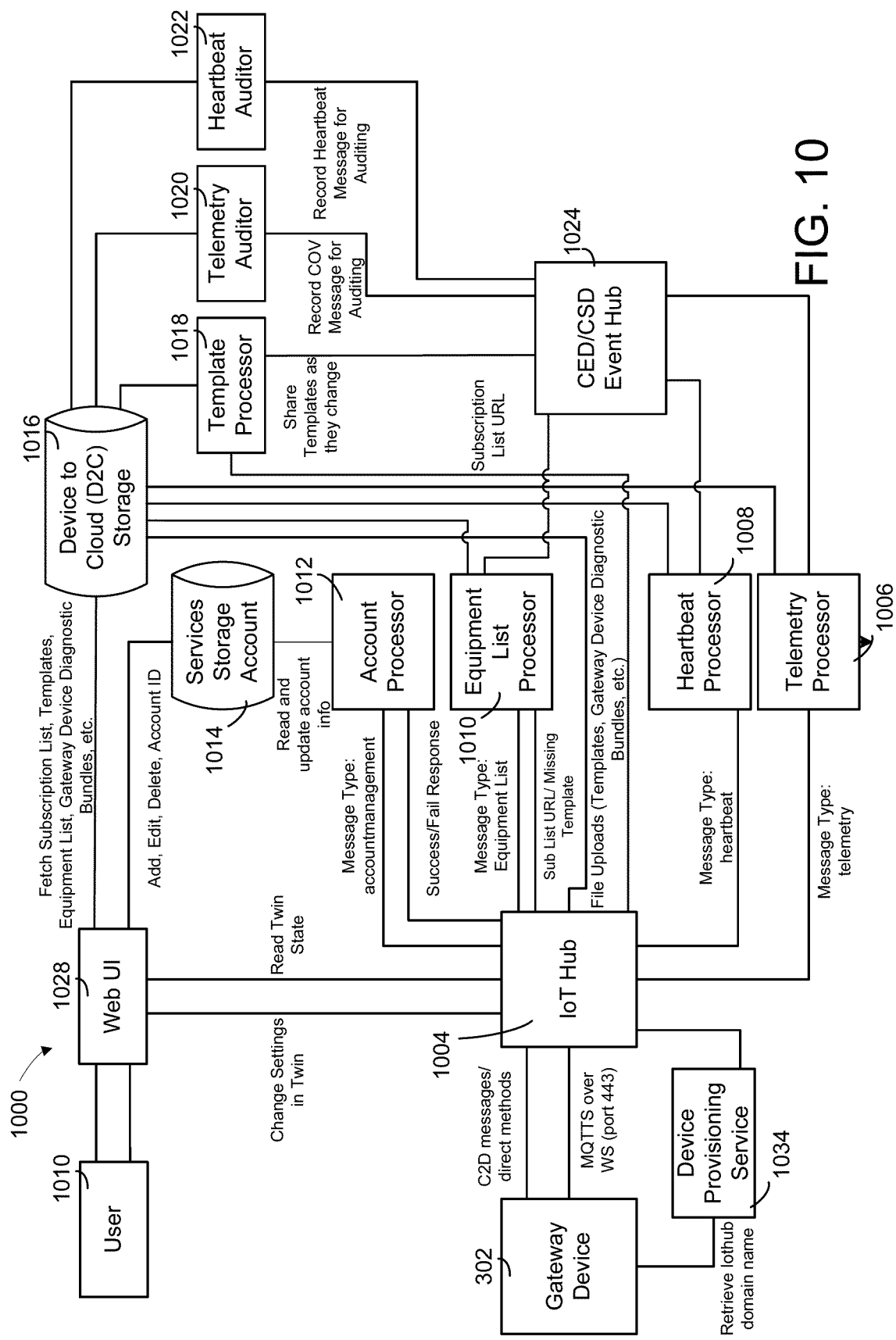
FIG. 10 is a block diagram illustrating select components of a cloud platform which can be used in a BMS, according to some embodiments.

Referring now to FIG. 10, a cloud platform 1000 is shown, according to an exemplary embodiment. Cloud platform 1000 may include some or all of the features of cloud platforms 324 and 724, as described above with reference to FIGS. 3-7. Cloud platform 1000 may be accessed by various users 1030 (e.g., enterprise users, mechanical contractors, cloud application users, etc.) via control applications. Some users can access and interact with gateway device 302 directly via client devices (e.g., via a UI provided by gateway device 302), whereas other users can interact with cloud platform 1000 (e.g., via a UI provided by cloud platform 1000, for example control application CED/CSD event hub 1024). The features of cloud platform 1000 and gateway device 302 are described in greater detail below. Cloud platform 1000 receives data from gateway device 302 and/or processes the data to provide a building data output and sends the data and the output to a control application, such as CED/CSD event hub 1024 in a format that it can accommodate to allow a user to operate the BMS remotely.

Cloud platform 1000 can include a variety of cloud-based services and/or applications (e.g., APIs) configured to store, process, analyze, or otherwise consume the data provided by gateway device 302. For example, cloud platform 1000 may include cloud applications such as a heartbeat service, telemetry (e.g., timeseries, COV, etc.) service, equipment list service, account service, and/or other types of services. In addition to the services (e.g., cloud applications) shown in FIG. 10, cloud platform 1000 can include any of a variety of services configured to process, store, analyze, and perform other operations on the data provided by gateway device 302. For example, cloud platform 1000 can include an asset service, an entity service, an analytics service, an alarm service, a command service, and/or other types of data platform services. Cloud platform 1000 can be configured to provide the data and the result of the various cloud applications (e.g., building data output) to one or more control applications configured to allow a user to review the data and control the operation of the gateway device. The control applications may involve modifying a device twin of the gateway device and/or viewing telemetry data and trends created based on the telemetry data by cloud platform 1000. Several examples of a data platform which can be used as part of cloud platform 1000 are described in detail in U.S. Provisional Patent Application No. 62/564,247 filed Sep. 27, 2017, U.S. Provisional Patent Application No. 62/457,654 filed Feb. 10, 2017, U.S. patent application Ser. No. 15/644,519 filed Jul. 7, 2017, U.S. patent application Ser. No. 15/644,560 filed Jul. 7, 2017, and U.S. patent application Ser. No. 15/644,581 filed Jul. 7, 2017, and U.S. patent application Ser. No. 16/844,328 filed Apr. 9, 2020. The entire disclosure of each of these patent applications is incorporated by reference herein.

Referring still to FIG. 10, gateway device 302 is shown to communicate with IoT hub 1004. Gateway device 302 may send data to IoT Hub 1004 using MQTTS streaming. IoT hub 1004 may be configured to send cloud-to-device (C2D) messages to gateway device 302. IoT hub 1004 can be configured to receive and translate the incoming data messages provided by gateway device 302. In some embodiments, IoT hub 1004 performs various data transformations and other functions specific to gateway device 302. For example, IoT hub 1004 can be configured to create entities for telemetry processor 1006 based on the equipment list and equipment model templates provided by gateway device 302. The equipment list may identify all of the equipment connected with gateway device 302, either directly or indirectly.

IoT hub 1004 and/or other components of cloud platform 1000 such as telemetry processor 1006 can provide plug & play functionality for gateway device 302 by automatically determining which values need timeseries data. Cloud platform 324 can use the equipment list in combination with equipment model templates for the identified equipment to determine which properties (i.e., data points, attributes, etc.) of equipment to bind. Cloud platform 324 can then create timeseries for the identified properties with telemetry processor 1006 and update the a subscription list. The timeseries may initially be empty, but can be updated as data samples are collected from gateway device 302 and/or equipment. In some embodiments, cloud platform 324 updates the twin subscription list to identify all of the properties that cloud platform 324 is interested in receiving change-of-value (COV) updates from gateway device 302 and/or equipment.

Gateway device is shown connected to device provisioning service 1034. Device provisioning service 1034 may be updated prior to installation of gateway device 302 into BMS 300 with the device ID, ID scope, and keys associated with gateway device 302. Device provisioning service 1034 may create the device in enroll gateway device 302 into a specific IoT hub.

IoT hub 1004 is connected to various event hubs and/or services, otherwise known as cloud applications, (shown as telemetry processor 1006, heartbeat processor 1008, equipment list processor 1010, and account processor 1012), and CED/CSD event hub 1024. The gateway device 302 sends all building data (e.g., equipment models, view definitions, COVs for subscribed properties and/or any exposed value and point objects of building equipment) it has collected on system bus 330 and wireless system bus 332 through the IoT hub 1004. IoT Hub 1004 routes all messages to the appropriate event hubs in cloud platform 1000 (e.g., telemetry messages to telemetry processor 1006, heartbeat messages to heartbeat processor 1008, etc.). For example, gateway device 302 may send a heartbeat message to IoT hub 1004, which can direct the heartbeat message to heartbeat processor 1008, which can process and send a signal to CED/CSD event hub 1024. The heartbeat message can also be sent to heartbeat auditor 1022 for storage. Files sent to IoT hub 1004 can be uploaded to the accounts storage container (e.g., services storage account 1014, D2C storage 1016, etc.). Any data received by an event hub (e.g., telemetry processor 1006, heartbeat processor 1008, etc.) can trigger an automatic function to process the data. In some embodiments, the event hubs are associated with corresponding cloud objects (e.g., template processor 1018, telemetry auditor 1020, heartbeat auditor 1022) for recording data. The processed data can be sent to CED/CSD event hub 1024. In some embodiments, there are different functions for different message types (e.g., heartbeat message, telemetry message, equipment list, etc.).

IoT hub 1004 can include components such as a file upload component, IoT device component, and message routing component. The file upload component may include a device diagnostic file and/or an equipment model template. The gateway device 302 may automatically upload an equipment model template when it determines the equipment model template cannot be found on cloud platform 1000.

The IoT devices component can consist of all devices (e.g., BACnet MS/TP devices) connected to gateway device 302 over system bus 330 and wireless system bus 332. The IoT devices component may be based on the equipment list built by gateway device 302 of all BACnet devices it has discovered on system bus 330 and wireless system bus 332.

In some embodiments, cloud platform 1000 is configured to generate and maintain a virtual "twin" for each gateway device 302 that sends data to cloud platform 1000. In some embodiments, IoT hub 1004 creates and maintains the device twin. The twin may function as a virtual service-side representation of a physical gateway device 302. For example, the twin for a given gateway device 302 may be a data object (e.g., a JSON object) that contains attributes indicating the state of gateway device 302. The twin may contain desired properties and reported properties. The reported properties can represent the current state of gateway device 302. The desired properties can represent desired modification made by a user through cloud platform 1000. For example, a user may input a desired modification to gateway device 302 through cloud platform 1000, which can update the desired properties of the device twin of gateway device 302. Gateway device 302 can periodically read the device twin and adjust its local properties to reflect the desired properties in the device twin. In some embodiments, gateway device 302 can then update the reported properties in the device twin so they match the desired properties. This can provide an indication to the user through the cloud platform that the modification has been made. In some embodiments, the updated device twin can be pushed to gateway device 302. An example of a twin for a gateway device 302 is as follows:

```
{
    "Reported": [ ],
    "Bound": [ ],
    "Revision": "1",
    "Hash": "abc"
}
```

Gateway device 302 can be configured to fill in the "Reported" field of the twin with information describing gateway device 302 (e.g., BAS units, time zone, etc.). It should be noted that the "Reported" field is different from the equipment list, which is a separate file. An example of the information which can be specified in the "Reported" field is as follows:

```
"Device Settings": {
    "BAS Units Setting": "IP",
    "Time Zone Setting": "Central"
    "Heartbeat Time Series ID": "HB-TS"
    "Software Version": 1.0
}
```

The "Bound" field of the twin can be filled in by cloud-based event hub (e.g., equipment list processor 1010, telemetry processor 1006, etc.) to indicate the properties of building equipment for which the event hub wants telemetry data. The cloud-based event hub may create a timeseries for the bound properties. The telemetry data may be a component of the building data sent from gateway device 302 to cloud platform 1000. The "Bound" field can include the following information:
 Bound: {[FQR ID, Time Series ID]}
 Organization ID
where the organization ID is used by event hubs to identify the customer associated with gateway device 302. An example of a subscription list is provided in Appendix C, incorporated here by reference. If certain points in the "Bound: field are not physically present, the gateway device 302 can send the "Non-Existent" points list cloud platform 1000, which can delete the non-existent points from the twin.

The "Revision" field of the twin may be incremented each time the twin is modified by either cloud platform 1000 or by gateway device 302. Both gateway device 302 and cloud platform 1000 can update the "Revision" field of the twin each time a change is made. Both gateway device 302 and cloud platform 1000 can also synchronize with the twin to ensure that each has the most recent version of the information provided by the twin. For example, gateway device 302 and cloud platform can periodically read the twin and copy the information contained in the twin if the version of the twin is more recent than the local version of the information. A sample of another device twin may be found in Appendix D, incorporated here by reference.

Data Control Template Info

In some embodiments, the device twin may include properties useful to control the data rate between gateway device 302 and cloud platform 1000. The properties, referred to herein as data control properties, may be modified by a user to control how much data is exchanged between gateway device 302 and cloud platform 1000. The data control properties may be passed to a gateway device as part of the desired properties contained in the device twin as explained above with reference to FIG. 10. The data control properties may be a subset of the properties exchanged between gateway device 302 and cloud platform 1000 via the device twin. For example, data control properties may include a telemetry rate, a heartbeat rate, an equipment list update rate, a subscription list, a data compression setting, and a COV file upload threshold setting. The subscription list may include a fully qualified reference, a COV increment value, and a COV minimum time value. Data control properties may include other properties passed as part of the device twin that control or modify the data rate between gateway device 302 and cloud platform 1000.

Telemetry rate may be the rate at which COV data samples are posted from gateway device 302 to cloud platform 1000. For example, a telemetry rate of 30 seconds may direct gateway device 302 to send COV update values collected from building equipment to cloud platform 1000 every 30 seconds. Modifying telemetry rate can affect the number and rate of messages exchanged between gateway device 302 and cloud platform 1000.

Heartbeat rate may be the rate at which gateway device 302 posts heartbeat messages to the cloud. Heartbeat messages are explained in further detail below with reference to FIG. 36.

The equipment list rate may be the rate at which the equipment list update message are posted from gateway device 302 to cloud platform 1000. The equipment list, as explained above, informs the cloud of discovered MS/TP devices connected to gateway device 302 via wired system bus 330 and/or wireless system bus 332.

The subscription list may be the list of equipment and points (e.g., BACnet point objects, value objects, etc.) that cloud platform 1000 desires COV and/or other data for. The subscription list may contain a fully qualified reference. The fully qualified reference may be a reference to a specific piece of building equipment contained with the equipment list. In some embodiments, the subscription list property within the device twin may include a COV increment. The COV increment may be the minimum amount of change in a subscribed points value required to generate a COV sample to be sent to cloud platform 1000. For example, a thermostat controller may include a temperate object exposed to gateway device 302 and included in the subscription list by cloud platform 1000. A device twin pushed to gateway device 302 may include a COV increment value of 1 degree. Gateway device 302 can be configured not to transmit a new value until the COV value is at least and/or greater than the COV increment value.

The subscription list may also include a COV minimum time point. COV minimum time point may dictate the minimum amount of time that must pass from when gateway device 302 sends a COV message to cloud-platform 1000 before another COV message can be sent. In some embodiments, the COV sent at the end of the COV minimum time point is the most recent COV. In some embodiments, gateway device 302 temporarily stores the COV values and sends them in groups based according to the COV minimum time point.

The data compression setting may be an option in the device twin indicating to gateway device 302 whether or not to compress or encode the collected COV data samples before posting the data samples to cloud platform 1000.

The COV file upload threshold setting may allow gateway device 302 to upload collected COV data samples as a file upload rather than MQTT and/or HTTPS streamed data if the COV data samples exceed a certain size. In some embodiments, a BMS may have a lower telemetry rate data control setting, and accordingly the COV samples data may exceed the MQTT and/or HTTPS threshold. In some embodiments, a gateway device may be offline, and offline data storage of the gateway device may include collected COV data that was not streamed to cloud platform 1000. The collected data can be uploaded as a file if larger than the COV file upload threshold.

In some embodiments, data control properties included in the device twin may be saved as a data control template. The data control template may be stored in cloud platform 1000 and/or gateway device 302. The data control template may be associated with a customer ID, an organization, a geographic location and/or other metadata related to the BMS. In some embodiments, a single data control template can be included in the device twin of multiple gateway devices in a BMS. In some embodiments, a data control template may be set as a default for a user and apply automatically apply to all gateway devices connected to that user. In some embodiments, a BMS may store multiple data control templates. For example, cloud platform 1000 may include a Wi-Fi data control template, a cellular data control template, and an Ethernet data control template. Cloud platform 1000 may automatically select and include in a device twin for a gateway device the data control template associated with the network used by the gateway device to connect to cloud-platform 1000. In some embodiments, a user may select the data control template to be applied to a gateway device.

The data control template is useful for a BMS constrained by monthly internet or data services such as those connected over a cellular network. Data control settings allow a user or contractor to dynamically modify and control the data rate between a gateway device and/or multiple gateway devices and a cloud platform utilizing the existing device twin messaging features of the BMS.

Figure 20:
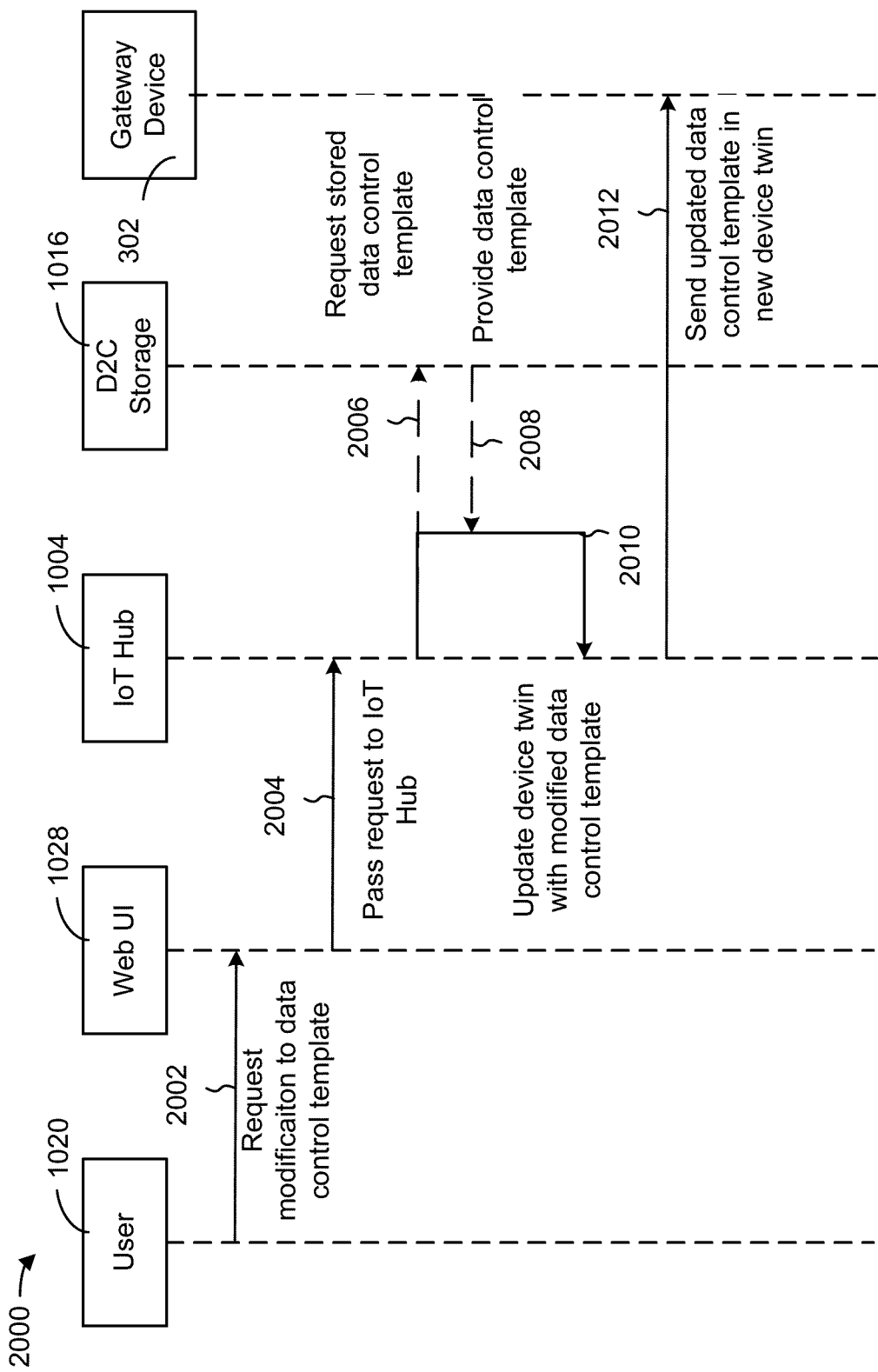
FIG. 20 is a sequence diagram illustrating a process for updating a data control template which can be performed by the BMS of FIG. 3, according to some embodiments.

Referring now to FIG. 20, a sequence diagram illustrating a data control template update process 2000 is shown, according to an exemplary embodiment. Process 2000 can be performed by one or more components of BMS 300 to modify data control properties located within the device twin of a gateway device. For example, process 2000 can be performed by web UI 1028, IoT Hub 1004, D2C storage 1016, and gateway device 302. The data control template may be a component of a device twin stored in cloud platform 1000 and/or gateway device 302. Certain properties in the device twin that control the data rate between cloud platform 1000 and gateway device 302 may be grouped together and saved as a data control template. The data control template may be used to apply data control settings to a variety of BMS devices.

The data control template may control properties of the device twin such as the telemetry rate, the heartbeat rate, the COV increment value, the COV minimum threshold value, and/or other properties that affect the data rate between gateway device 302 and cloud platform 1000. In some embodiments the data control template is populated with default data control property values during device provisioning.

User 1030 may send a request to modify the data control template (2002). In some embodiments, the request may be to modify data control template tied to a single gateway device. In some embodiments, the data control template may be associated with multiple gateway devices. The user request may include altering the data control properties for all gateway devices associated with the data control template. The request may be to web UI 1028. Web UI 1028 may be configured to fetch subscription lists, templates, equipment list, diagnostic information, and data control properties, and/or data control templates stored in D2C storage 10106 and display such things to user 1030 for modification and control of the BMS. Web UI 1028 may pass the modification request to IoT Hub 1004 (step 2004). In some embodiments, web UI may have already retrieved from D2C storage 1016 the data control template. In some embodiments, IoT hub 1004 may request the data control template to be modified from D2C storage 1016 (step 2006) which may then provide the data control template to IoT Hub 1004 (step 2008). IoT hub 1004 may generate a new device twin incorporating the modification to the data control template. The data control template may be one or more properties contained within a device twin.

IoT Hub 1004 may update the data control properties and generate a new/updated device twin for gateway device 302 (step 2010). In some embodiments, the updated properties are contained in the desired properties of the device twin. Gateway device 302 may receive and/or request the updated device twin from IoT hub 1004 (step 2012). In some embodiments, gateway device 302 may be configured to periodically poll IoT Hub 1004 to determine if the device twin has been updated. In some embodiments, the IoT Hub 1004 may push a new device twin to gateway device 302 each one is created. Once gateway device 302 receives the new device twin it may then read the updated data control properties and update its local (e.g., reported properties) in accordance with the new data control properties in the data control template.

Referring back to FIG. 10, cloud platform 1000 is shown to include telemetry processor 1006. Telemetry processor 1006 can be configured to receive building data generated by building equipment such as change of value (COV) via gateway device 302. The telemetry data may be for bound properties listed in the gateway device's twin. Telemetry processor 1006 can be configured as a telemetry service to perform a variety of telemetry processing operations. IoT Hub 1004 can then create timeseries for the identified properties with telemetry processor 1006 and update the twin subscription list (e.g., subscription list) and push the updated twin. The timeseries may initially be empty, but can be updated as data samples are collected from gateway device 302 and/or building equipment. In some embodiments, IoT hub 1004 updates the twin subscription list to identify all of the properties that cloud platform 1000 is interested in receiving change-of-value (COV) updates from gateway device 302 and/or building equipment.

Gateway device 302 can evaluate the subscription list to identify one or more properties specified by the twin. Gateway device 302 can then subscribe to COV updates for any properties specified by the twin and unsubscribe from COV updates for any properties not specified by the twin.

When a COV for a subscribed property occurs, equipment can send a COV notification to gateway device 302. The COV notification may identify the property for which a COV has occurred and may include the current value of the property. In some embodiments, telemetry processor 1006 is configured to perform some or all of the timeseries processing operations described in U.S. patent application Ser. No. 15/644,519 filed Jul. 7, 2017, U.S. patent application Ser. No. 15/644,560 filed Jul. 7, 2017, U.S. patent application Ser. No. 15/644,581 filed Jul. 7, 2017, and U.S. patent application Ser. No. 16/844,328 filed on Apr. 9, 2020. The entire disclosure of each of these patent applications is incorporated by reference herein.

Telemetry Data Process

Figure 21:
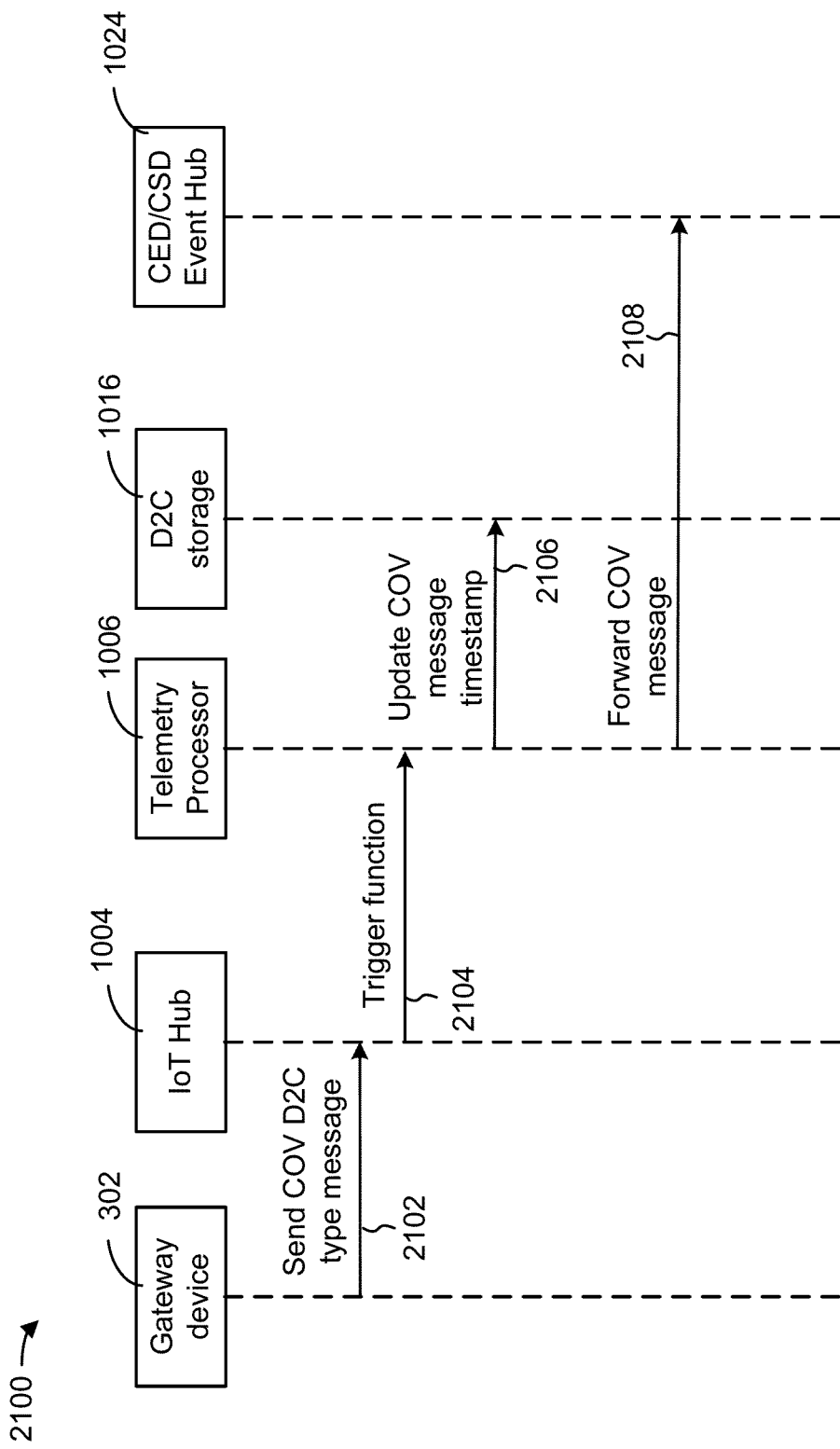
FIG. 21 is a sequence diagram illustrating a telemetry data process for sending COV data to a cloud platform which can be performed by the BMS of FIG. 3, according to some embodiments.

Referring now to FIG. 21, a sequence diagram illustrating a telemetry data process 2100 is shown, according to an exemplary embodiment. Process 2100 can be performed by one or more components of BMS 300 to collect and send telemetry data (e.g., change of value data) to cloud platform 324. For example, process 2100 can be performed by gateway device 302, and/or various components of cloud platform 324 (e.g., IoT hub 1004, telemetry processor 1006, D2C storage 1016, and CED/CSD event hub 1024, etc.).

When a point object in the bound point list generates telemetry data (e.g., COV data), gateway device 302 can receive the telemetry data and the COV data to IoT hub 1004 as a device-to-cloud (D2C) message. The message may include the value of the bound point, and a timestamp. Gateway device 302 can then send the telemetry data to telemetry processor 1006. The telemetry data may include a telemetry ID, a value as a string (e.g., the enumerated string), and a timestamp. telemetry processor 1006 may respond to gateway device 302 acknowledging receipt of the telemetry data. An example of a telemetry message may be found in Appendix E, incorporated here by reference.

Heartbeat Telemetry

Figure 22:
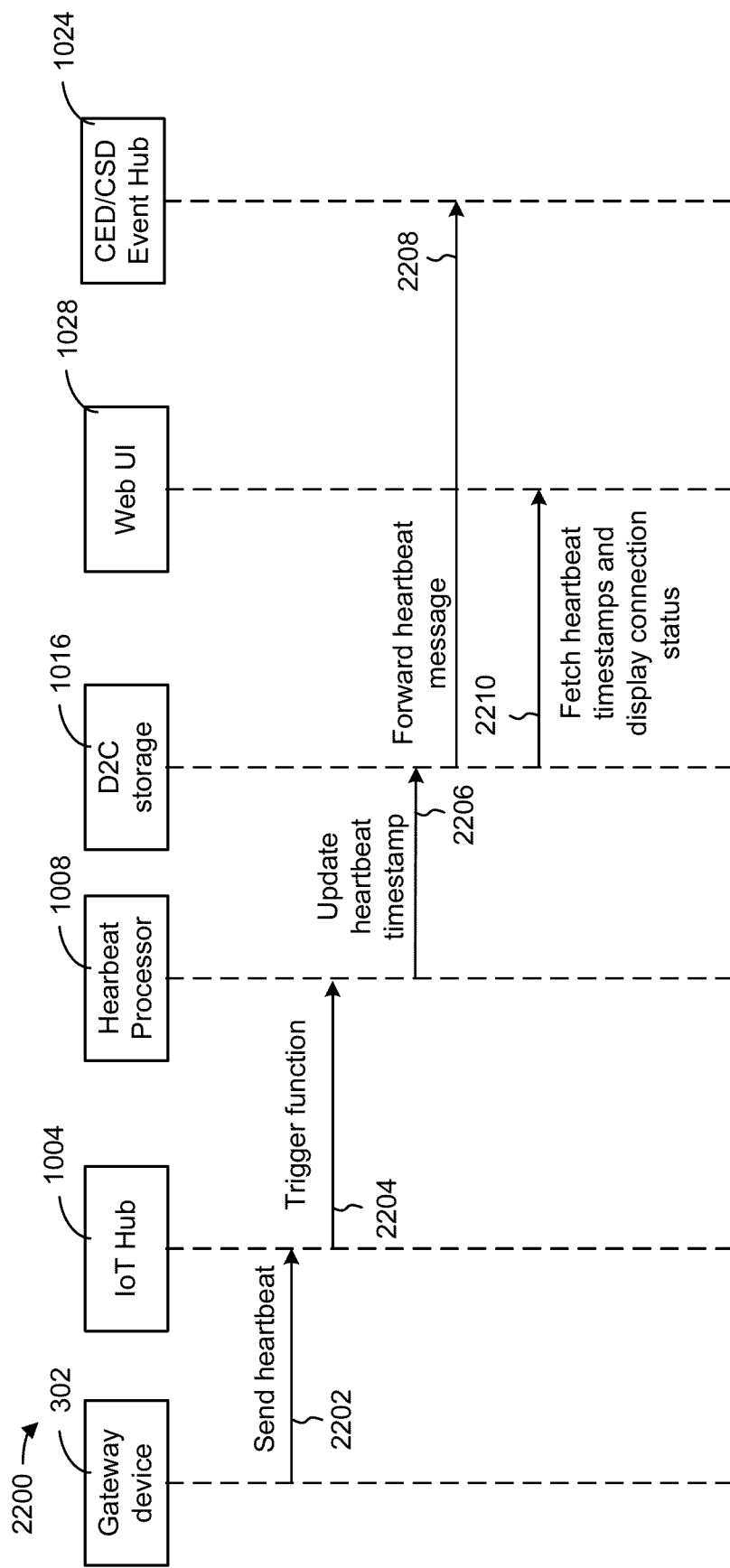
FIG. 22 is a sequence diagram illustrating a process for sending a heartbeat message to a cloud platform which can be performed by the BMS of FIG. 3, according to some embodiments.

Referring now to FIG. 22, a sequence diagram illustrating process 2200 for sending a heartbeat message is shown, according to an exemplary embodiment. Process 2200 can be performed by various components of BMS 300. For example. Process 2200 can be performed by gateway device 302, IoT hub 1004, heartbeat processor 1008, D2C storage 1016, web UI 1028, and CED/CSD event hub 1024. Process 2200 is shown to include gateway device 302 sending a heartbeat message to IoT hub 1004 (step 2202). Gateway device may send the heartbeat message periodically. For example, gateway device may send a heartbeat message every 5 minutes, every 10 minutes, etc. The heartbeat rate can be a point value found in the device twin. The rate can be modified by a user either through the local UI of gateway device 302 or web UI 1028. In some embodiments, the heartbeat rate is a component of a data control template, which can itself be a component of a device twin generated by cloud platform 324.

Process 2200 is shown to include IoT hub 1004 automatically triggering heartbeat processor 1008 (step 2204). Heartbeat processor 1008 can update a heartbeat timestamp based on the latest heartbeat message and store the updated timestamp in D2C storage 1016 (step 2206). Process 2200 is shown to include D2C storage 1016 forwarding the heartbeat message to CED/CSD event hub 1024 (step 2208). In some embodiments, D2C storage 1016 can send the heartbeat message to heartbeat auditor 1022, shown in FIG. 10, for logging. Process 2200 is shown to include web UI 1028 fetching the heartbeat timestamps from D2C storage 1016 and displaying the connection status (step 2210). Examples of a properties and property values contained in a heartbeat message reported by gateway device 302 are as follows: An example heartbeat message may be found in Appendix F, incorporated here by reference.

| Property | Example Value |
| --- | --- |
| "Current Date and Time in UTC" | 01/25/2020 14:34:20Z |
| "CPU Usage (%)" | "45" % |
| "Memory Usage (%)" | "30" % |
| "Ethernet Interface Status" | "Enabled" |
| "Wi-Fi Client Interface Status" | "Enabled" |
| "USB Cellular Interface Status" | "Enabled" |
| "Cell Signal Strength (%)" | "45" % (optional if cell dongle is connected) |
| "TMC signal strength (%)" | "65" % (optional if MS/TP coordinator is connected) |
| "Account ID" | "Customer_8211.ABCD" - |

Equipment List Upload and Subscription List Generation

Figure 11:
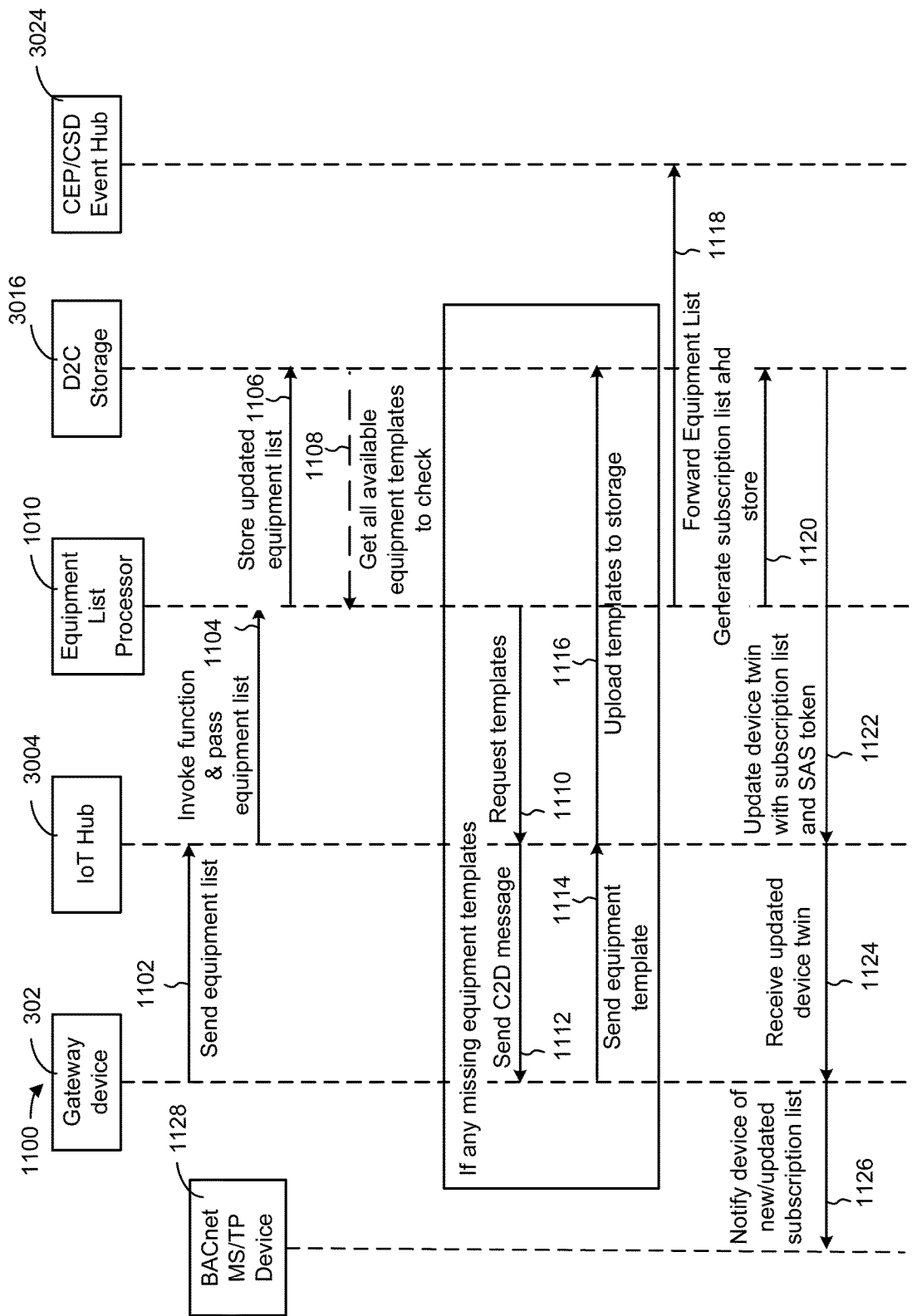
FIG. 11 is a sequence diagram illustrating a process for providing a cloud platform with an equipment list from a gateway device, according to some embodiments.

Referring now to FIG. 11, a sequence diagram illustrating process 1100 for providing a cloud platform with an equipment list from a BACnet device and providing a subscription list of bound properties based on the provided information to a gateway device is shown, according to an exemplary embodiment. Process 1100 can be performed by one or more components of BMS 300. For example, process 1100 can be performed by gateway device 302, IoT hub 1004, equipment list processor 1010, D2C storage 1016, CED/CSD event hub 1024 and BACnet device 1128.

Process 1100 is shown to include gateway device 302 sending an equipment list as a device to cloud (D2C) message to IoT hub 1004 (step 1102). Gateway device 302 may identify building equipment on system bus 330 and generate a report (e.g., equipment list) listing the identified building equipment. In some embodiments, the equipment list is in JSON format. An example equipment list can be found in Appendix G, incorporated here by reference. Gateway device 302 can periodically send the equipment list to the IoT Hub 1004. IoT hub 1004 can be configured to automatically invoke a server function and pass the equipment list format to equipment list processor 1010 (step 1104). Process 1100 is shown to include storing the new (e.g., updated) equipment list in D2C storage 1016 (step 1106). Equipment list processor 1010 can be configured to retrieve from D2C storage 1010 all available equipment templates to check for an equipment template for each building device (e.g., BACnet MS/TP device) in the new equipment list (step 1108). If equipment lists are found for all building devices in the new equipment list, process 1100 can skip to step 1118. If an equipment list is not found, process 1100 is shown to include sending request for any missing equipment templates to IoT Hub 1004 (step 1110).

In some embodiments, the equipment templates may only be sent from gateway device 302 if requested by cloud platform 324. An equipment list may contain a large number of building equipment and it may be prohibitive from a data use stand point to send equipment templates for each piece of equipment every time an equipment list is provided to cloud platform 1000. In some embodiments to conserve data and avoid duplication of equipment templates, gateway device 302 may send the equipment list first and equipment list processor 1010 may be configured to check D2C storage 1016 for equipment templates before requesting gateway device 302 to send them. In some embodiments, D2C storage 1016 is associated with a customer ID and includes equipment templates for all building equipment previously connected to cloud platform 1000. A single building equipment template may associated with multiple pieces of building equipment. By first checking for pre-existing equipment model templates cloud-platform 1000 ensures only a single equipment template is stored, avoiding duplicate meta data.

If an equipment template is not found, equipment list processor 1010 may then request gateway device 302 to provide it (step 1110). IoT hub 1004 can passes the request to gateway device 302 as a cloud-to-device (C2D) message (step 1112). Gateway device 302 can be configured to respond with equipment files (e.g., JSON equipment files) and send them to IoT hub 1004 (step 1114). The process for collecting missing equipment templates from gateway device 302 is explained in greater detail below with reference to FIG. 12. Process 1100 is shown to include IoT hub 1004 receiving the JSON template files (step 1114) and uploading the equipment templates to D2C storage 116 (step 1116).

Process 1100 is shown to include forwarding the new equipment list to the CED/CSD event hub 1024 (step 1118). Equipment list processor 1010 can be configured to use the equipment list in combination with equipment templates for the building devices determine which properties (i.e., data points, attributes, etc.) of equipment to subscribe to (step 1120). The subscribed properties may also be referred to as bound properties throughout this disclosure. Equipment list processor 1010 may generate telemetry data for the bound properties with a timeseries service (not shown). The subscription list can be used to update the device twin including a list of bound properties for gateway device 302 to subscribe too based on the subscription list as an aspect of an updated device twin sent to IoT hub 1004 (step 1122), as explained above with reference to the bound properties of the device twin. Process 1100 is shown to include gateway device 302 receiving the updated device twin (step 1124) and gateway device 302 notifying a device 1128 (e.g., BACnet MS/TP device 754) of the new/updated subscription list (step 1126).

Template Upload

Figure 12:
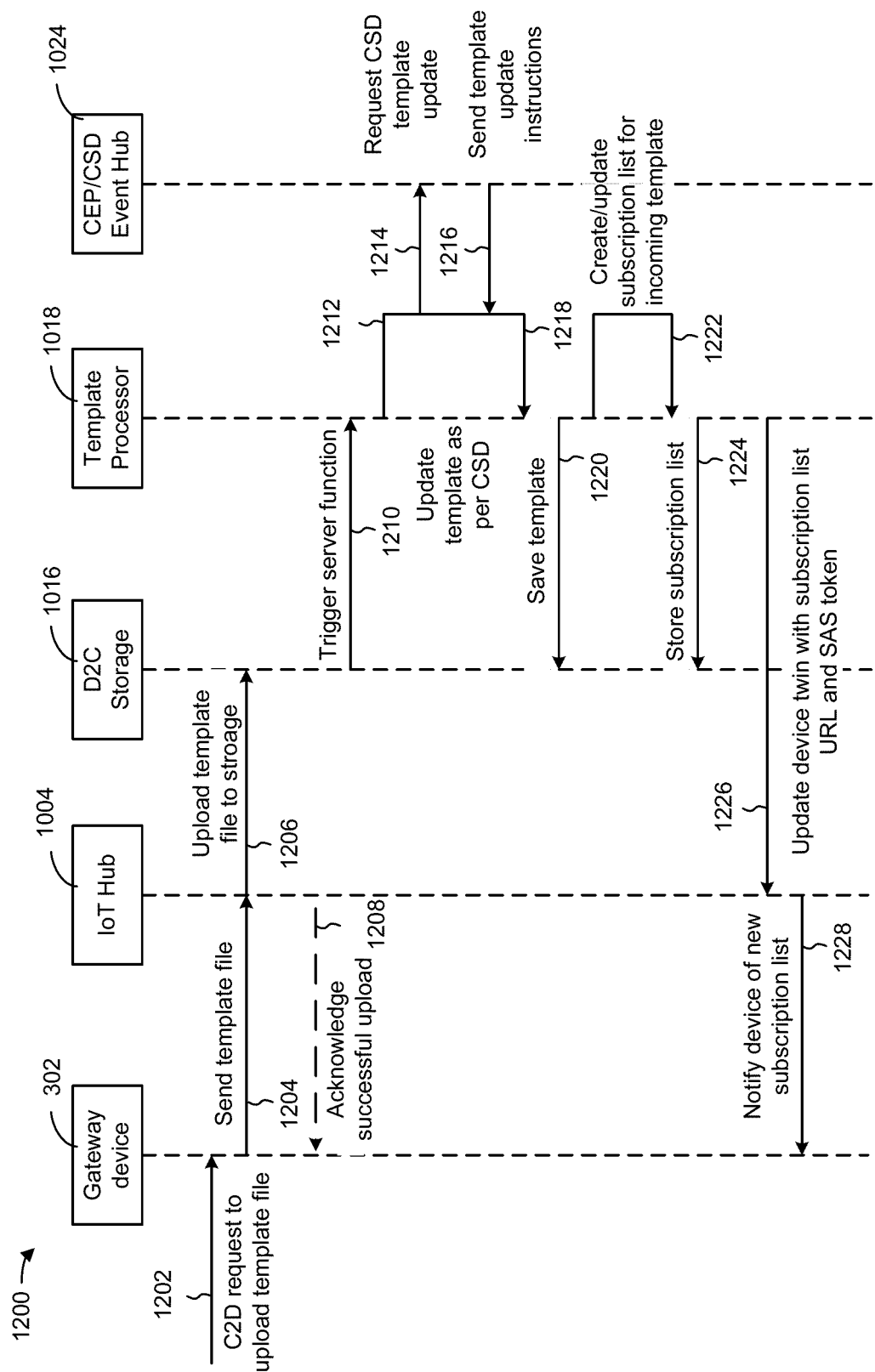
FIG. 12 is a sequence diagram illustrating a process for providing a cloud platform with an equipment template from a gateway device which can be used in a BMS, according to some embodiments.

Referring now to FIG. 12, a sequence diagram illustrating a process 1200 for uploading an equipment template from gateway device 302 to cloud platform 1000 is shown, according to an exemplary embodiment. Process 1200 can be performed by various components of BMS 300. For example, process 1200 can be performed by gateway device 302, IoT hub 1004, D2C storage 1016, template processor 1018, and CED/CSD event hub 1024. In some embodiments, cloud platform 324 may determine it does not have equipment model templates for all building equipment listed in the equipment list. Cloud platform 324 can request the missing equipment model templates from gateway device 302.

Process 1200 is shown to include gateway device 302 receiving a cloud-to-device (C2D) message from cloud platform 1000 requesting gateway device 302 to upload equipment template files (step 1202). For example, the C2D message is the C2D message sent in step 1112 of process 1100. In some embodiments, equipment templates may only be uploaded when a request is sent. In some embodiments, gateway device 302 may upload an equipment template whenever it discovers new building equipment on system bus 330 and/or wireless system bus 332. Gateway device 302 can be configured to send the equipment template file to IoT hub 1004 (step 1204). In some embodiments, the equipment template is sent as a JSON file. Process 1200 is shown to include IoT hub 1004 uploading the equipment template file to D2C storage 1016 (step 1206). In some embodiments, equipment templates can be upload as a file directly to D2C storage 1016, bypassing IoT hub 1004. Process 1200 is shown to include IoT hub 1004 acknowledge the successful upload to gateway device 302 (step 1208).

The uploading of an equipment template to D2C storage 1016 may automatically trigger template processor 1018 to perform a server function with the equipment template file (step 1210). Process 1200 is shown to include template processors 1018 updating the equipment template (step 1218). Template processor 1018 may request CED/CSD event hub 1024 to provide update instructions (step 1214) and may receive update instructions (1216). In some embodiments, template processor 1018 may update the equipment template without requesting instructions from CED/CSD event hub 1024.

Process 1200 is shown to include template processor 1018 saving the updated template to D2C storage 1016 (step 1220). Template processor 1018 can create and/or update the subscription list (e.g., subscription list) in accordance with the newly received equipment template (step 1222). Template processor 1018 can store the updated subscription list in D2C storage 1016 (step 1224). Process 1200 is shown to include template processor 1018 updating the device twin with the subscription list URL and SAS token. The modifying of the device twin to pass configuration settings to gateway device 302 is explained in detail above with reference to cloud platform 1000. Process 1200 is shown to include IoT hub 1004 notifying gateway device 302 of the new subscription list (step 1228). In some embodiments, step 1228 can be a part of the device twin messaging interface implemented by cloud platform 1000.

Time Synchronization

In some embodiments, gateway device 302 will not connect to cloud platform 1000 until it has established a good time basis. Time synchronization process 2300 can be configured to provide gateway device 302 with the latest time in UTC format. Time synchronization process 2300 is important to ensure the timestamps on building data collected from gateway device 302 are not materially different from the actual time the building data was received. Time synchronization process 2300 is also used to ensure gateway device 302 has a secure connection to the cloud platform 1000 via HTTPS. In some embodiments, gateway device 302 does not have a battery-powered clock. Accordingly, time synchronization process 2300 may be used to ensure the device is not left with a poor time basis if unpowered for a period of time.

Figure 23:
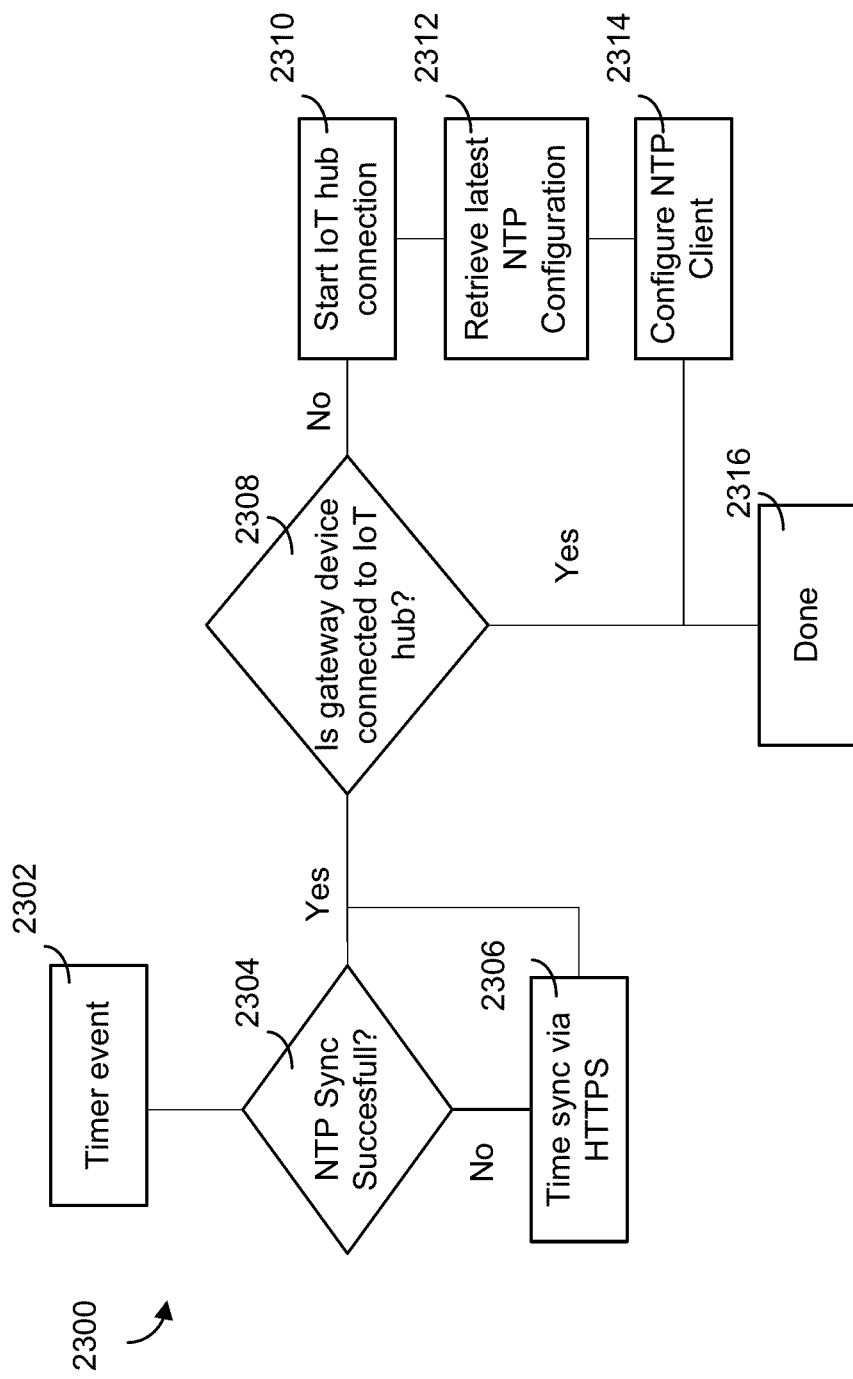
FIG. 23 is a flow chart of a time synchronization process for synchronizing the time on the gateway device which can be performed by the BMS of FIG. 3, according to some embodiments.

Referring now to FIG. 23, a flow chart of a time synchronization process 2300 for synchronizing the time on the gateway device is shown, according to an exemplary embodiment. Time synchronization process 2300 is shown to include a timer event initializing the process (step 2302). The timer event may be a first startup of gateway device 302 by a user or a startup after an extended unpowered state. In some embodiments, the timer event may be initiated by a user, or automatically by cloud platform 1000. Time synchronization process 2300 is shown to include checking if a network time protocol (NTP) sync was successful (step 2304). Gateway device 302 may include an NTP client which can use the NTP protocol to synchronize the system clock. NTP may synchronize devices on a network to a coordinated universal time. In some embodiments gateway device 302 has a hardcoded default NTP server provided. In some embodiments, gateway device 302 receives its NTP configuration from an IoT hub component of cloud platform 1000. If NTP synchronization fails at step 2304 then gateway device 302 will sync time via HTTP (no at step 2306). Gateway device 302 may sync time over HTTP by sending HTTP packet requests to a remote server that is connected to gateway device 302. Gateway device 302 can periodically determine if time has been synchronized over HTTPS and only send data when a good time basis is known. No data will be sent from gateway device 302 if it is not able to retrieve a time.

If time synchronization is successful either at step 2304 or 2306, gateway device 302 may broadcast the time to all devices connected on the system bus, including devices connected over the wired system bus 330 and wireless system bus 332. Time synchronization process 2300 is then shown to include gateway device 302 checking if it is connected to an IoT hub (step 2308). The IoT hub may be a part of cloud platform 324. If gateway device 302 is connected, then the time synchronization process is complete (step 2316). If gateway device 302 is not connected time synchronization process 2300 is shown to include starting an IoT hub connection (no at step 2310). Time synchronization process 2300 is shown to include retrieving the latest NTP configuration from the IoT hub (step 2312). This step is optional, and in some embodiments gateway device 302 may be configured with a hardcoded default NTP server. Time synchronization process 2300 is shown to include configuring the NTP client according to the latest NTP configuration information (step 2314). Time synchronization process 2300 is shown to include completing the time synchronization process (step 2316).

Firmware Update

Figure 24:
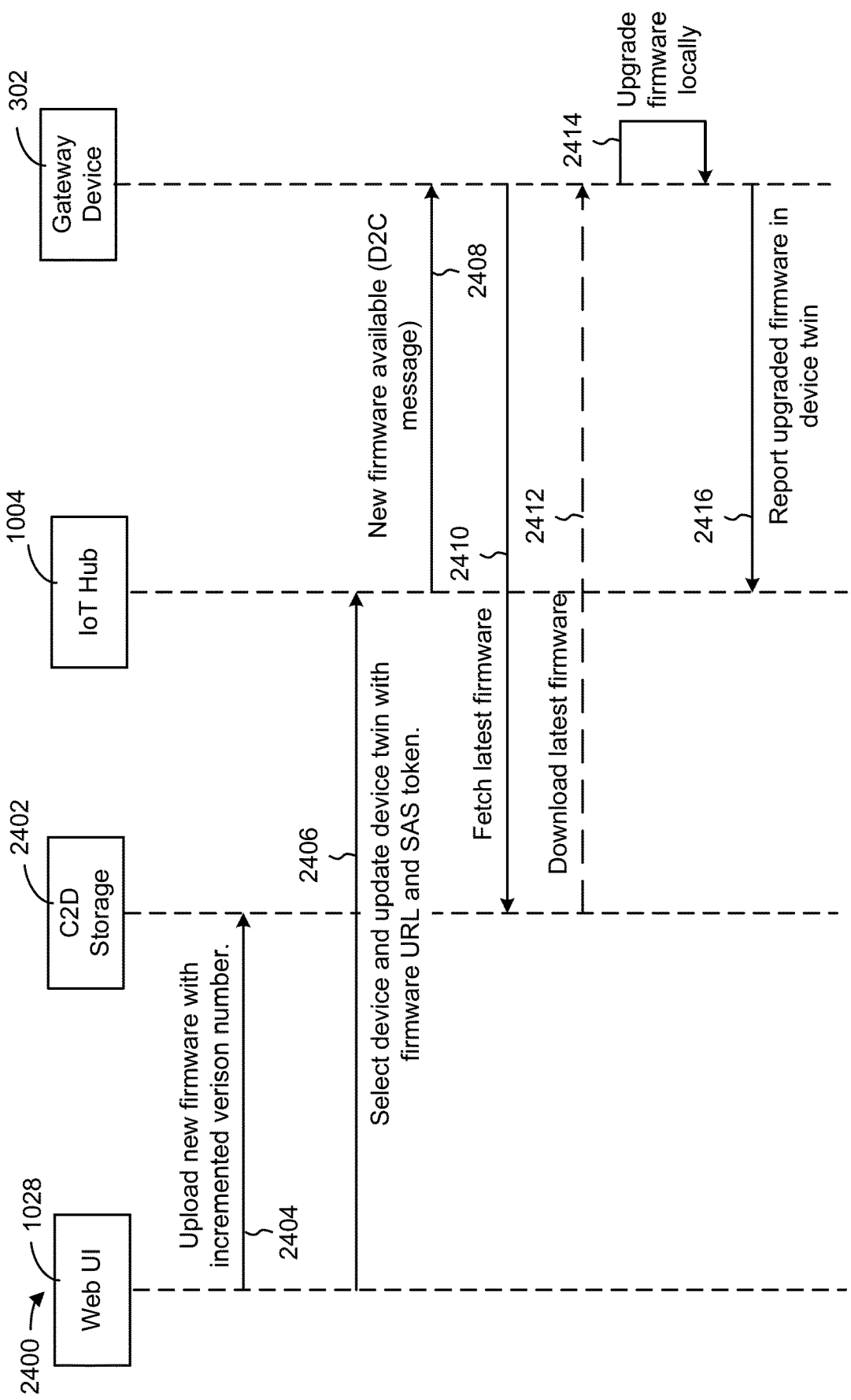
FIG. 24 a sequence diagram illustrating a firmware update process which can be used by a gateway device of FIG. 5, according to some embodiments.

Referring now to FIG. 24, a sequence diagram illustrating a firmware update process 2400 for BMS 300 is shown, according to an exemplary embodiments. Process 2400 can be performed by one or more components of BMS to update the firmware of gateway device 302. For example, process 2400 can be performed by web UI 1028, C2D storage 2402, IoT Hub 1004 and gateway device 302. C2D storage 2402 may be a component of a cloud platform such as cloud platform 1000 for storing C2D messages. Process 2400 is shown to include a new firmware being upload to C2D storage 1016 from web UI 1028 (step 2404). In some embodiments, the firmware is uploaded by a user. Process 2400 is shown to include the web UI 1028 selecting a device and updating the devices associated device twin (e.g., device twin, etc.) with the firmware URL and a shared access signature (SAS) token on IoT hub 1004 (step 2406). IoT hub 1004 can then notify gateway device 302 of the new firmware through the updated device twin, as the gateway device 302 may periodically check the device twin as discussed above (step 2408). Gateway device 302 can then retired the latest firmware from the C2D storage 1016 and download it (steps 2410 and 2412). Gateway device 302 can then update the firmware locally (step 2414). Gateway device 302 can report that the firmware has been updated by altering the device twin (step 2416).

Referring back to FIG. 5, web UI 1028 can be configured to perform a variety of command and control operations. In some embodiments, web UI 1028 is configured to send commands and control signals to gateway device 302. The commands and control signals can then be used by gateway device 302 to control system bus equipment of BMS 300. In some embodiments, web UI 1028 sends command messages as strings, gets response messages as strings, and stores the responses.

In some embodiments, web UI 1028 allows a user to command and control the equipment of BMS 300 by writing data values to gateway device 302. It should be noted that a local user of gateway device 302 can command and control BMS 300 via a local user interface generated by gateway device 302. However, remote users (e.g., technical support, a store manager, an enterprise user, etc.) can command and control BMS 300 via web UI 1028. Web UI 828 can be configured to change any data values including setpoints, configuration parameters, schedules, and other types of data used by gateway device 302 and/or equipment.

In some embodiments, cloud platform 1000 is configured to maintain a manifest for each instance of gateway device 302 that sends data to cloud platform 1000. The manifest may indicate the most recent available version of software for gateway device 302, the installed version of software for gateway device 302, a retrieval URL for the most recent version of software for gateway device 302, and a list of endpoint URLs that define the location of cloud platform 1000. The endpoint URLs may be helpful in the event that gateway device 302 is deployed in a country that requires data to be kept within the country for legal reasons. Accordingly, the URL may be different for each country. If the endpoint URL is left empty, gateway device 302 may not send data to cloud platform 1000.

High Level Process Flow

Figure 25:
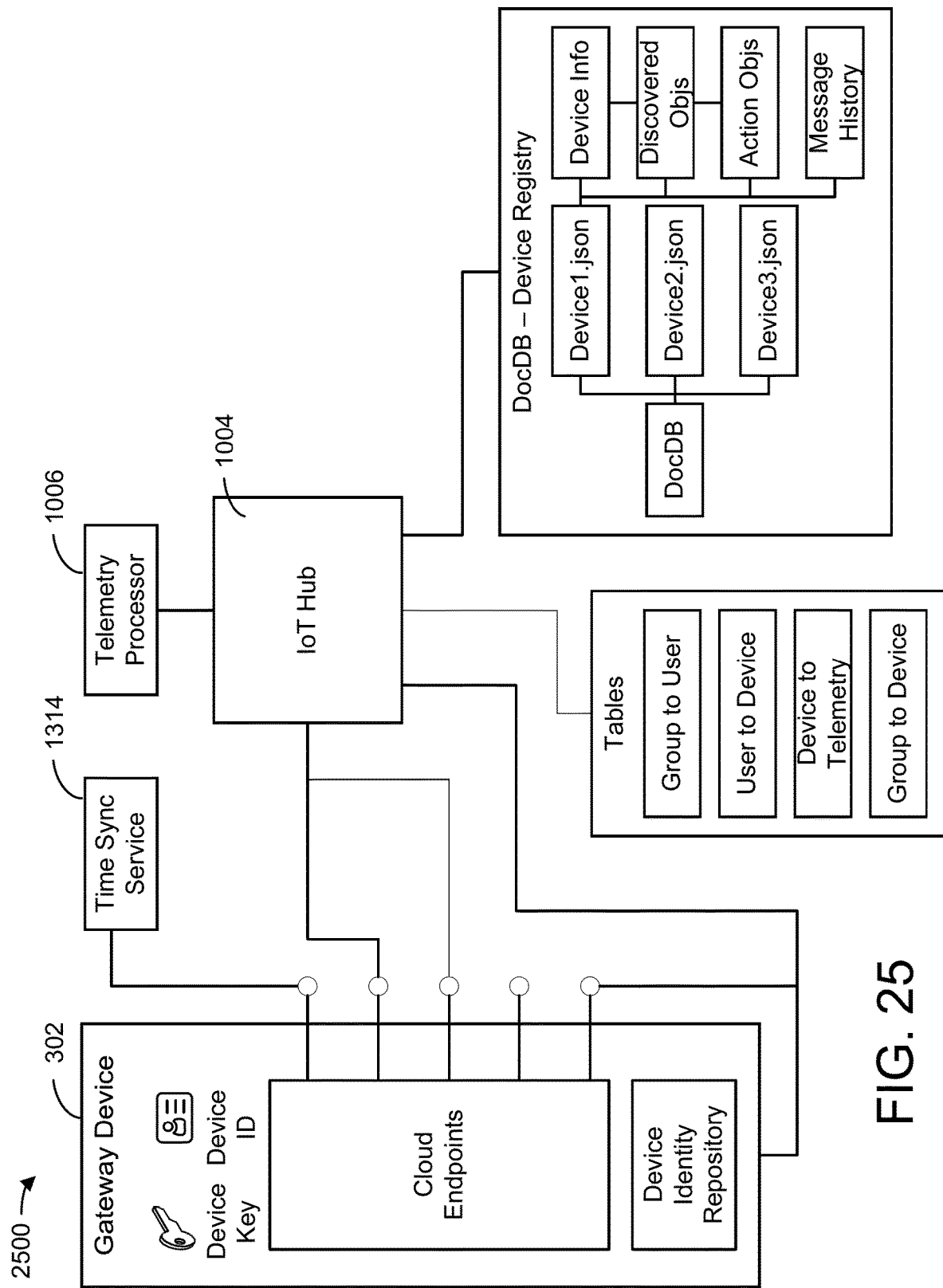
FIGS. 25-26 are block diagrams illustrating a high level process flow performed by the BMS of FIG. 9, according to some embodiments.
Figure 26:
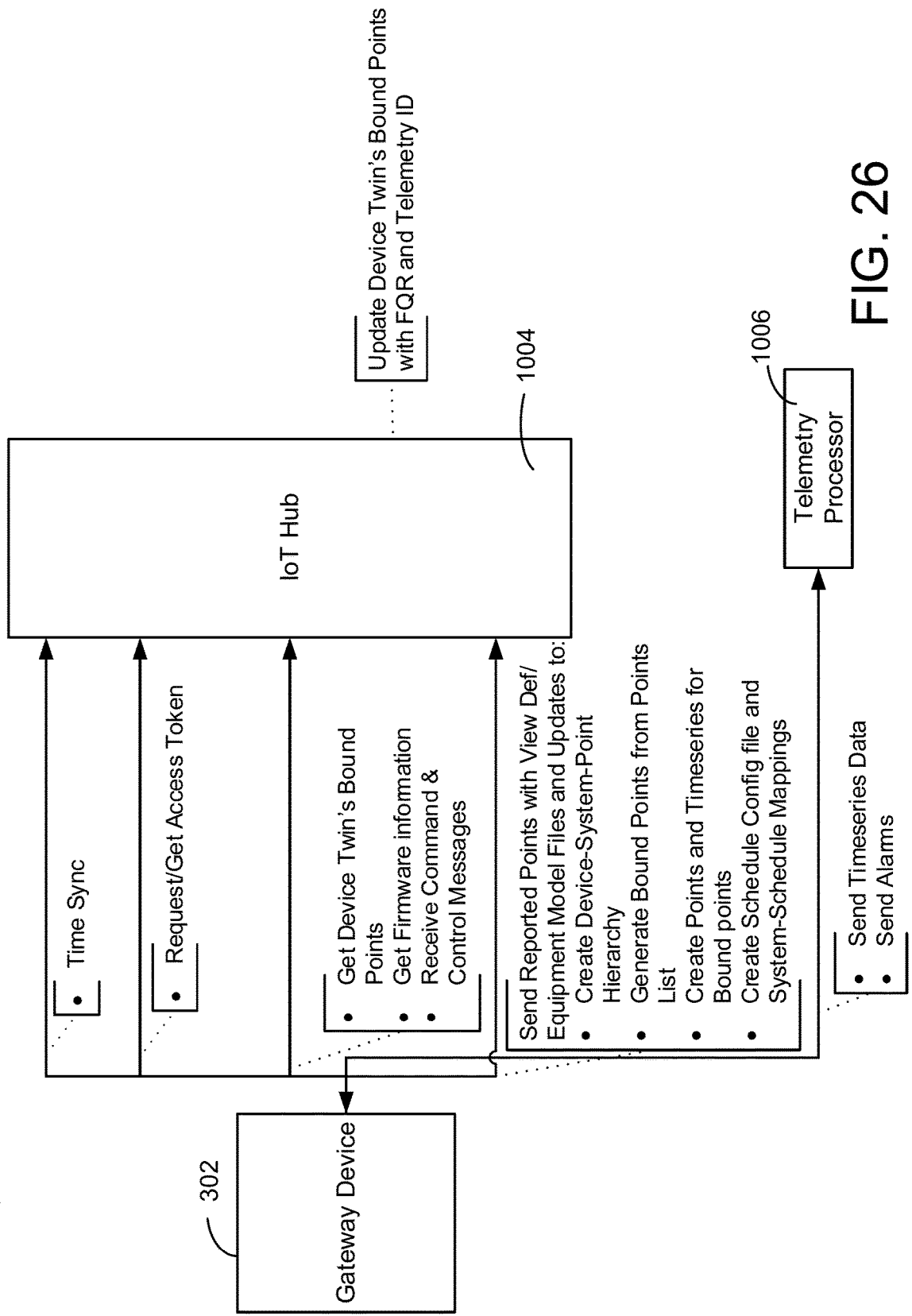

Referring now to FIGS. 25-26, block diagrams 2500 and 2600 illustrating a high level process flow performed by BMS 300 is shown, according to an exemplary embodiment. A manufacturer can log into a manufacturer portal and enter the device ID and get a device key auto-generated from the portal. Once a device ID is created, a device twin gets automatically be created in cloud platform 324 with blank reported and bound points and with a version 0. The manufacturer can embed the device ID and device key into gateway device 302 and can ship gateway device 302 to a customer or supplier. The customer admin can log into an enterprise application (e.g., one of the event hubs in cloud platform 1000) and create a user with the role of installation technician. The customer admin can provide credentials to an installation technician to allow the installation technician to install gateway device 302 at the customer site. To install gateway device 302, the installation technician can log into the enterprise application and adds the device ID to the customer record. The installation technician can then log into the UI of gateway device 302 and setup the local time zone for gateway device 302.

Once connected to the internet, gateway device 302 may initiate a time synchronization with time sync service to get the current time in UTC Format and will store it. An exemplary embodiment of the time synchronization service is shown with reference to FIG. TIME. All future data transmissions will be based on the time and the time zone of gateway device 302. Gateway device 302 can get the twin version from cloud platform 324 and store it locally. Gateway device 302 may request a telemetry ID (e.g., timeseries ID) for device status/heartbeat messages from telemetry service 1016. The telemetry ID can be stored locally in gateway device 302 and in the twin for gateway device 302. Gateway device 302 can be configured to send out "heartbeat" messages at a regular frequency (e.g., every 15 mins) to heartbeat processor 1008 using the status/heartbeat telemetry ID. These messages can be stored for device connection status monitoring and for audit purposes.

Gateway device 302 can discover the building equipment connected to it and generate an equipment list from the discovered systems. Gateway device 302 can send the equipment list to cloud platform 324. Cloud platform 324 can use retrieve internally equipment model template for equipment included on the equipment list. If cloud platform 324 does not have equipment model templates for the equipment it can request them from gateway device 302.

Cloud platform 324 can use the equipment model files and the equipment list to create a reported points list (e.g., point objects). Cloud platform 324 can generate a list of bound points from a default subscription list for each system/equipment. For the bound points, telemetry service 1016 can create telemetry IDs. The point ID to telemetry ID mapping can be stored in cloud platform 324. The bound points along with their telemetry IDs can also be stored in the devices cloud twin and can be updated when changes of value occur. Gateway device 302 can synchronize with the twin by downloading and storing a list of the bound points in local memory. Gateway device 302 may transmit telemetry data for only the points listed in the bound points list.

When additional systems/equipment are connected to gateway device 302, gateway device 302 can discover the new systems/equipment and can update the equipment list. Gateway device 302 can send the updated equipment list to cloud platform 324. Cloud platform 324 can use the updated equipment list to generate an updated bound points list. Cloud platform 324 can generate bound point and telemetry IDs for any new points and can update the device's twin to be synchronized by gateway device 302.

Gateway device 302 can be configured to transmit telemetry data for the points identified in the bound points list. Such data can be sent to telemetry service 1016 along with the timestamp. If the telemetry data contains an enumerated set and an enumerated value, gateway device 302 can store the enumerated values as JSON formatted data strings and pass the strings to telemetry service 1016 with the timestamp.

Command and control messages can be initiated from an enterprise portal and routed to gateway device 302 by cloud platform 324 (e.g., from web UI 1028 and/or CED/CSD event hub 1024). At a scheduled time, gateway device 302 can log into cloud platform 324 and get the latest firmware information for gateway device 302. If the latest firmware information doesn't match the installed firmware version at gateway device 302, gateway device 302 can download the latest firmware from the URL available in the message.

Personnel can log into the web UI 1028 and manually enter the serial number of systems and/or equipment. For some equipment, cloud platform 324 can automatically fetch warranty information from a web service and update the warranty information stored in cloud platform 324. Equipment schedules can be pushed by gateway device 302 and stored in cloud platform 324. The schedules can be updated in the cloud via the enterprise portal and pushed back to gateway device 302. Setpoint changes for the system's bound points can be initiated from the enterprise portal. When a user makes a setpoint change to an item of equipment, the information can be directed to gateway device 302 and a response can be stored in cloud platform 324.

In some embodiments, gateway device 302 includes a device ID and a hashed key for secure communication. The device ID, key, and/or other password can be encoded to generate a SAS token, which can be transmitted over the network during communications with cloud platform 324. For example, the SAS token can be transmitted during telemetry data transmission, equipment alarms transmission, schedule synchronization between gateway device 302 and cloud platform 324, and/or modifying setpoints and configuration parameters.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

A portion of the disclosure of this patent document (including the Appendices) contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Appendix A—Example device Twin Subscription List subscriptionList: {"url": "https://path-so-subscription-list-sas-url", "timestamp": "2021-01-01T00:00:00.000Z"}

End of Appendix A.

Appendix B—Equipment Model Template Example

```
{ "Version": "1.0.0.10_AAA",
  "Template": [
    { "-type": 0,
      "-subtype": 38,
      "-dictionary": "1.0.0.1664",
      "-name": "Advanced Control Status",
      "-description": "Advanced Control Status Template",
      "-ID": "Equipment_Advanced_Control_Status_v1",
      "-presentValueAttributeId": 7000,
      "-Property List": {
        "-Property": [
          { "-ID": 7000,
            "-Required": 1,
            "-WritableFlag": 0,
            "-Name": {
               "-setId": 1675,
               "-value": 574
            },
            "-DataType": 4,
            "-IPUnits": {
               "-setId": 507,
               "-value": 98
            },
            "-SIUnits": {
               "-setId": 507,
               "-value": 98
            }
            "-IPDisplayPrecision": 6,
            "-SIDisplayPrecision": 6
          },
          { "-ID": 7004,
            "-Required": 1,
            "-WritableFlag": 0,
            "-Name": {
               "-setId": 1675,
               "-value": 582
            },
            "-DataType": 9,
            "-StringsetId": 854
          },
```

End of Appendix B.

Appendix C—Subscription list Example

```
{
  "points": [
    { "ref": {
        "networkReference": "Local Field Bus",
        "deviceReference": "JCI-1",
        "equipmentReference": " RTU",
        "objectReference": null,
        "property Id": 7000
      }
    },
    { "ref": {
        "networkReference": "Local Field Bus",
        "deviceReference": "JCI-7",
        "equipmentReference": "York RTU",
        "objectReference": "Fan Control",
        "property Id": 7000
      }
    }
  ]
}
```

End of Appendix C.

Appendix D—Device Twin Example

```
{ "properties": {
    "reported":
    "cegDevice": {
      "modelName": "CEG",
      "cegEncodingType": {
        "set": 575,
        "id": 2
      }
    },
    "ethernet": {
      "mac Address": "00:00:00:00:00:00"
    },
    "bacnet": {
      "mstp": {
        "macAddress": 117,
        "objectIdentifier": 1,
        "maxMaster": 127,
        "networkNumber": 64999,
        "activeBaudRate": {
          "set": 3426,
          "id": 4
        }
      }
    },
    "heartbeat":
      "rateInMs": 60000
    },
      "enabled": true,
      "rate InMs": 30000
    },
    "equipmentList": {
      "enabled": true,
      "rateInMs": 60000
    },
    "subscriptionList": {
      "url": "https://path-to-subscription-list-sas-url",
    },
    "remoteServices": {
      "accountId": "CEG_ACCOUNT_ID"
    }
    "firmware": {
      "package Version": "1.0.0"
      "lastUpdateTime": "2021-01-01T00:00:00.000Z"
    }
  },
  "desired": {
    "heartbeat": {
      "rateInMs": 18000000
    },
    "telemetry": {
      "enabled": true,
      "rateInMs": 30000
    },
    "equipmentList": {
      "enabled": true,
      "rate InMs": 86400000 //24hrs
    },
    "subscriptionList": {
      "url": "https://path-to-subscription-list-sas-url",
      "timestamp": "2021-01-01T00:00:00.000Z",
      "checksum": "ABCDEFGH123",
      "etag": "ABCDEFGH123",
      "contentType": "application/json",
      "contentEncoding": "application/gzip"
    },
    "remoteServices": {
      "accountId": "CEG_ACCOUNT_ID",
      "accountIdLastUpdateTime": "2021-01-01T00:00:00.000Z}
}}}
```

End of Appendix D.

Appendix E—Telemetry Example

```
{ "device": "CEG111111111111111",
  "account": "100_CustomerName. 100_CustomerName-Site1",
  "owner": "100_CustomerName",
  "equipment": [
    { "ref": "/Local Field Bus.JCI-9. York RTU",
      "points": [
        { "ref": "Cooling Control",
          "attr": 7777,
          "samples": [ "ts": "2021-01-01T01:00:00Z", "val": - 0.1]
        }
      ]
    },
    {
      "ref": "Heating Control",
      "attr": 7776,
      "samples": [{ "ts": "2021-01-01T01:00:00Z", "val": - 0.1} ]
    }
    ]
  },
  {
    "ref": "/Local Field Bus.JCI-4. YT3_YK",
    "points": [
      { "ref": "YMC3 Read Data",
        "attr": 7775,
        "samples": [{ "ts": "2020-01-01T00:00:00Z",
          "val": "A string value"}]
      },
      {
        "ref": "YMC3 Read Data",
        "attr": 7002,
        "samples": [{ "ts": "2020-01-01T00:00:00Z", "val": 0} ]
      }
    ]
  }
  ]
}
```

End of Appendix E.

Appendix F—Heartbeat Message Example

{"date": "2021-01-01T00:00:00000Z"}

End of Appendix F.

Appendix G—Equipment List Example

```
{ "timestamp": "2021-01-01T00:00:00.000Z",
  "networks": [
    { "networkReference": "Local Field Bus",
      "devices": [
        { "deviceReference": {
            "networkReference": "Local Field Bus",
            "deviceReference": "JCI-7"
          },
          "name": "SE-RTU",
          "description": "Smart Equipment Stage1 UCB",
          "address": 7,
          "isOnline": false,
          "equipmentModels": [
            { "equipmentReference": {
                "equipmentReference": "York RTU"
              },
              "template": {
                "id": "Equipment_York_RTU_v1",
                "version": "3.4.0.0129"
              },
              "viewDefinition": {
                "version": "3.4.0.1029_SES1"
              }
            }
          ]
        },
        {
          "deviceReference": {
            "networkReference": "Local Field Bus",
            "deviceReference": "JCI-9"
          },
```

```
          "name": "SE-RTU",
          "description": "Smart Equipment Stage1 UCB",
          "address": 9,
          "isOnline": false,
          "equipmentModels": [
            {
              "equipmentReference": {
                "equipmentReference": "York RTU"
              },
              "template": {
                "id": "Equipment_York_RTU_v1",
                "version": "3.4.0.0129"
              },
              "view Definition": {
                "version": "3.4.0.1029_SES1"
              }
            }
          ]
        },
        {
          "deviceReference": {
            "networkReference": "Local Field Bus",
            "deviceReference": "Device-88"
          },
          "name": "device1",
          "description": "Device Description",
          "address": 88,
          "isOnline": true,
          "equipmentModels": [
            {
              "equipmentReference": {
                "equipmentReference": "Device-88-RTU-Open"
              },
              "template": {
                "id": "genericEquipmentModelTemplate",
                "version": "Device-88-RTU-Open_adebe"
              },
              "view Definition": {
                "version": "Device-88-RTU-Open"
              }
            }
          ]
        }
      ]
    },
    {
      "networkReference": "Ethernet IP",
      "devices": [
        {
          "deviceReference": {
            "networkReference": "Ethernet IP",
            "deviceReference": "EthernetDevice123"
          },
          "name": "Ethernet Chiller",
          "description": "Chiller Description",
          "address": "111.111.111.111",
          "isOnline": true,
          "firmware Version": "1.0.0.0",
          "equipmentModels": [
            {
              "equipmentReference": {
                "equipmentReference": "Some BACnet/IP Chiller"
              },
              "template": {
                "id": "Equipment_BAC_IP_CHILLER_v1",
                "version": "1.0.0.0_BACIP"
              },
              "viewDefinition": {
                "version": "1.0.0.0_BACIP"
              }
            }
          ]
        }
      ]
    }
  ]
}
```

End of Appendix G.

What is claimed is:

1. A building management system (BMS) comprising:
a gateway device coupled to building equipment and configured to communicate building data from the building equipment to a cloud-based platform according to a data control template configured to control a data rate between the gateway device and the cloud-based platform;
the cloud-based platform comprising:
a hub configured to:
generate a virtual device twin, the virtual device twin configured to represent the gateway device on the cloud-based platform and comprising the data control template; and
receive the building data;
a plurality of cloud applications, wherein the plurality of cloud applications are configured to receive the building data from the hub and process the building data to provide a building data output;
wherein the cloud-based platform is configured to:
communicate the building data output to at least one of a control application, an analytic application, or a monitor application; and
receive a command from at least one of the control application, the analytic application, or the monitor application based on the building data output;
the gateway device further configured to operate according to the command.

2. The BMS of claim 1, wherein the cloud-based platform is further configured to:
receive a command to modify a property of the data control template from at least one of the control application, the analytic application, or the monitor application; and
update the data control template in the virtual device twin based on the command to modify a property and generate a new virtual device twin containing the updated data control template;
wherein the gateway device is further configured to receive the new virtual device twin and communicate with the cloud-based platform according to the updated data control template.

3. The BMS of claim 1, wherein the data control template comprises control properties configured to control the data rate to and from the gateway device and the cloud-based platform, the control properties comprising at least one property selected from the group consisting of a telemetry rate, a heartbeat rate, an equipment list rate, a data compression setting, a COV file upload threshold setting, and a subscription list, the subscription list comprising a fully qualified reference, a change of value (COV) increment value, and a COV minimum time value.

4. The BMS of claim 1, wherein the cloud-based platform is configured to generate the virtual device twin for the gateway device based on gateway data provided to the cloud-based platform by the gateway device, the gateway data comprising reported properties representing a current operating state of the gateway device.

5. The BMS of claim 1, wherein the gateway device is configured to read the data control template in the virtual device twin and modify local control properties based on the data control template in the virtual device twin.

6. The BMS of claim 1, further comprising:
a second gateway device;
wherein the cloud-based platform is further configured to:
generate a second virtual device twin configured to represent the second gateway device on the cloud-based platform, wherein the second virtual device twin comprises the data control template; and
provide the second virtual device twin to the second gateway device;
wherein the second gateway device is configured to receive the second virtual device twin and communicate with the cloud-based platform according to the data control template of the second virtual device twin.

7. The BMS of claim 1, the cloud-based platform further configured to:
determine a network type the gateway device is configured to communicate the building data over; and
provide the gateway device with a network-specific data control template associated with the network type from a plurality of data control templates associated with a plurality of network types.

8. The BMS of claim 1, the control application further comprising:
a user interface configured to receive an action from a user;
wherein the cloud-based platform is further configured to receive the action from the control application and modify the data control template in the virtual device twin based on the action;
the gateway device further configured to read the modified data control template in the virtual device twin and modify local control properties based on the modified data control template.

9. The BMS of claim 1, the cloud-based platform further configured to:
associate the data control template with a user ID; and
provide the data control template to a plurality of gateway devices associated with the user ID.

10. A method of controlling data rate in a building management system (BMS), the method comprising:
communicating, via the gateway device, building data from building equipment to a platform external to the gateway device according to a data control template configured to control a data rate between the gateway device and the platform external to the gateway device;
generating at the platform external to the gateway device a virtual device twin for the gateway device, the virtual device twin configured to represent the gateway device on the platform external to the gateway device and comprising the data control template:
generating, at a plurality of applications of the platform external to the gateway device, a building data output based on the building data;
receiving, at the platform external to the gateway device, a command based on the building data output from at least one of a control application, an analytic application, or a monitor application; and
operating the gateway device based on the command.

11. The method of claim 10, wherein the data control template comprises control properties configured to control the data rate to and from the gateway device and the platform external to the gateway device, the control properties comprising at least one property selected from the group consisting of a telemetry rate, a heartbeat rate, an equipment list rate, a data compression indicator, a COV file upload threshold, and a subscription list, the subscription list comprising a fully qualified reference, a change of value (COV) increment, and a COV minimum time.

12. The method of claim 10, further comprising:
identifying at the platform external to the gateway device desired points in the building data associated with first building equipment and second building equipment;

generating at the platform external to the gateway device a subscription list based on the building data, the subscription list comprising:
- a subset point from the desired points in the building data;
- a change of value increment, the change of value (COV) increment configured determine when a COV of the subset point in the desired points is large enough to be communicated from the gateway device to the platform external to the gateway device; and
- a COV time threshold, the COV time threshold comprising a minimum amount of time that must pass for the gateway device to communicate a new COV of subset point value to the platform external to the gateway device.

13. The method of claim 10, further comprising:
receiving at the gateway device the virtual device twin; and
communicating at the gateway device the building data to the platform external to the gateway device according to the data control template in the virtual device twin.

14. The method of claim 10,
wherein the command is configured to modify the data control template;
modifying at the platform external to the gateway device the data control template based on the command;
generating at the platform external to the gateway device a second virtual device twin based on the modified data control template;
receiving at the gateway device the second virtual device twin; and
communicating the building data to the platform external to the gateway device according to the modified data control template.

15. The method of claim 10, further comprising:
coupling a user-detachable network adapter to the gateway device, the user-detachable network adapter configured to connect the gateway device to the platform external to the gateway device according to regional network protocols;
communicating the building data to the platform external to the gateway device via the user-detachable network adapter;
the user-detachable network adapter further configured to operate over at least one network selected from the group consisting of an Ethernet network, a Wi-Fi network, and a cellular network.

16. The method of claim 11, further comprising:
forming a multi-point to multi-point network using a plurality of wireless bridge devices;
connecting the building equipment to the gateway device using the plurality of wireless bridge devices, wherein the building equipment and the gateway device are operationally unaware of the multi-point to multi-point network.

17. The method of claim 11, the method further comprising:
providing a second gateway device;
generating at the platform external to the gateway device a second virtual device twin configured to represent the second gateway device on the platform external to the gateway device, wherein the second virtual device twin comprises the data control template; and
providing the second virtual device twin to the second gateway device;
communicating a third building data collected by the second gateway device to the platform external to the gateway device according to the data control template.

18. A building management system (BMS) comprising:
building equipment operable to affect a physical state or condition of a building;
a gateway device configured to identify building equipment coupled to the gateway device and generate an equipment list including the identified building equipment;
a cloud-based data platform coupled to the gateway device configured to determine if an equipment template library stored in the cloud-based data platform includes an equipment template associated with the building equipment listed in the equipment list,
wherein the gateway device is configured to only send the equipment template associated with the building equipment to the cloud-based data platform if the equipment template library does not include the equipment template associated with the building equipment.

19. The BMS of claim 18, wherein the equipment template is associated with a building equipment type, such that a plurality of building equipment of the same building equipment type are associated with the equipment template.

20. The BMS of claim 18, further comprising:
second building equipment of a same building equipment type as the first building equipment, wherein the cloud-based data platform is configured to communicate with the second building equipment according to the equipment template associated with the building equipment.

* * * * *